(12) United States Patent
Paiz

(10) Patent No.: US 8,386,456 B1
(45) Date of Patent: Feb. 26, 2013

(54) CODEX SEARCH PATTERNS

(76) Inventor: Richard Paiz, Suwanee, GA (US)

( * ) Notice: Subject to any disclaimer, the term of this patent is extended or adjusted under 35 U.S.C. 154(b) by 289 days.

(21) Appl. No.: 12/785,122

(22) Filed: May 21, 2010

Related U.S. Application Data

(63) Continuation-in-part of application No. 12/146,420, filed on Jun. 25, 2008, now Pat. No. 7,908,263, and a continuation-in-part of application No. 11/584,941, filed on Oct. 23, 2006, now Pat. No. 7,809,659, and a continuation-in-part of application No. 10/582,394, filed on May 24, 2004, now abandoned, and a continuation-in-part of application No. 10/926,267, filed on Aug. 25, 2004, now abandoned, and a continuation-in-part of application No. 09/514,940, filed on Feb. 28, 2000, now Pat. No. 7,058,601, and a continuation-in-part of application No. 11/223,226, filed on Sep. 9, 2005, now abandoned, and a continuation-in-part of application No. 10/135,493, filed on Apr. 30, 2002, now abandoned, and a continuation-in-part of application No. 11/584,271, filed on Oct. 20, 2006, now abandoned, and a continuation-in-part of application No. 10/926,446, filed on Aug. 25, 2004, now Pat. No. 7,050,813, and a continuation-in-part of application No. 10/603,963, filed on Jun. 25, 2003, now Pat. No. 6,842,511, and a continuation-in-part of application No. 09/544,238, filed on Apr. 7, 2000, now Pat. No. 6,614,893, and a continuation-in-part of application No. 11/085,678, filed on Mar. 21, 2005, now abandoned, and a continuation-in-part of application No. 09/819,174, filed on Mar. 27, 2001, now abandoned, and a continuation-in-part of application No. 12/764,934, filed on Apr. 21, 2010, and a continuation-in-part of application No. 12/778,228, filed on May 12, 2010, now Pat. No. 8,239,229.

(60) Provisional application No. 60/193,160, filed on Mar. 28, 2000, provisional application No. 60/289,033, filed on May 4, 2001, provisional application No. 60/184,537, filed on Feb. 24, 2000.

(51) Int. Cl.
*G06F 7/00* (2006.01)
*G06F 17/30* (2006.01)

(52) U.S. Cl. ........................................ 707/706; 707/741

(58) Field of Classification Search .................. 707/705, 707/706, 711, 736, 741
See application file for complete search history.

(56) References Cited

U.S. PATENT DOCUMENTS 7,103,536 B1 * 9/2006 Kanno ............................ 704/10

* cited by examiner

*Primary Examiner* — Marc Somers
(74) *Attorney, Agent, or Firm* — Gold & Rizvi, P.A.; Glenn E. Gold

(57) ABSTRACT

A search engine optimizer that works independently and in parallel with a browser and search engine supercomputer to gather, analyze, and distill input information interactively. The optimizer reorganizes the input, and providing an optimized version as an output. The optimized version of the input (e.g. output) is sent to the search engine that responds to the end user with search results. The optimizer recognizes each request as a pattern and stores the pattern in an advanced Glyph format. This permits the optimizer to identify a left and ride side checkmate combination required to achieve certitude.

13 Claims, 60 Drawing Sheets

1  [1] Blue and Gray or E1+E2 , Mass = 1.1
   [2] Session or E3, Mass = 1.2
   [3] Union and Confederates or (E4+M1), Mass = 2.1
   [4] War or E5, Mass = 1.1
   [5] Civil War or (E6+E5), Mass = 1.2
   [6] War between the States (E5+D1+E7) = 1.4
   [7] American Civil War or (E8+E6+E5) , Mass = 1.5

2  Keywords belonging to the requests (1 to 7)

3  is a dynamic Superset (I) with Mass     3    2.5    4    65

4  The environment is set to
   E5 "War" is the anchor, Cx "Civil War", Cy "American Civil War" & Cz "War between the States"
   are a triple nested cluster.
   Cx is the primary cluster for (I). Mass = 2.1 + 0.4 for triple cluster (I) or 2.5
   E1 Blue, E2 Gray, E3 Session, E4 Union, M1 Confederates, E6 Civil, M2 States, & E7 American are
   Likely Numbers.

65_Lucky_1_Likely_8_Basis 5  (63.2! – 58.2!) / 5!  or 7,144,895 pages    [L] [R]   5  30% – 60%   6      2

FIG. 20

1  [1] Historical Maps or E1+E2, Mass = 1.2
   [2] Session or E3, Mass = 1.2
   [3] Union and Confederates or (E4+M1), Mass = 2.1
   [4] Military Maps or (E5+E2)+E6, Mass = 2.4
   [5] Civil War or (E6+E7), Mass = 1.2
   [6] War between the States Maps (E7+E8)+E2 = 1.6
   [7] American Civil War Military Map (E9+E6+E7)(E5+E2), Mass = 3.1

Keywords belonging to the requests (1 to 7)

2  [E E E E E E]  3  [⚙]  4  [⚙]
   [E E M E E E]
   [⚙ ⚙ ⚙ ⚙ ⚙ ⚙]
   [⚙]         [⚙ ⚙ ⚙]

3  is a dynamic Set (I,J) with Mass

4  The environment is set to
   E7 War & E5 Military are anchors. From FIG 20 Cx, Cy, Cz are a triple nested cluster.
   Ca "Historical Maps" & Cb "Military Maps" are a dual cluster.
   Cx is the primary cluster for (I) and Cb for (J).
   Mass = 3.1 + 0.2 for triple cluster (I) + 0.2 for dual cluster (J) or 3.5
   (E1, E2, E3, E4, M1, E6, E8, E9) are Likely #s.

55 Lucky 2 Likely 8 Basis 5  (52.2! − 48.2!) / 4!  or 275,041 pages    [L] [⚙] [R] [⚙]    5 [61% 85%]   6 [?]

FIG. 21

1  [1] Historical Maps or  E1+E2 , Mass = 1.2
   [2] Session or E3, Mass = 1.2
   [3] Robert E Lee or (E4+E5), Mass = 1.6
   [4] Military Maps or  (E6+E2), Mass = 2.4
   [5] Civil War or  (E7+E8), Mass = 1.2
   [6] War between the States Maps (E8+E9) +E2 = 1.6
   [7] American Civil War Robert E Lee Military Map (E10+E7+E8) (E4+E5) (E6+E2) , Mass = 5.1

Keywords belonging to the requests (1 to 7)

2  

3  is a dynamic Subset (I,J,K)  with Mass      3   5.5   4   35

4  The environment is set to
   E7 War, E5 Lee & E6 Military are anchors. From FIG 20 Cx , Cy, Cz are a triple nested cluster.
   From FIG 21 Ca & Cb are a dual cluster, Cc is a Single Cluster.
   Cx is the primary cluster for (I), Cc for (J) and Cb for (K).
   Mass = 5.1 + 0.2 for triple cluster (I) + 0.2 for dual cluster (K) or 5.5
   (E1, E2, E3, E4, E8, E9, E10) are Likely #s.

35_Lucky_3_Likely_7_Basis 5  (31.3! − 28.3!) /3! or 4,631 pages       [L]    [R]    5  86% − 95%  6  5

FIG. 22

1. After the first TDR filtering process the Internet is expressed in Millions of Page Ranks 2. Reorganized Association Page

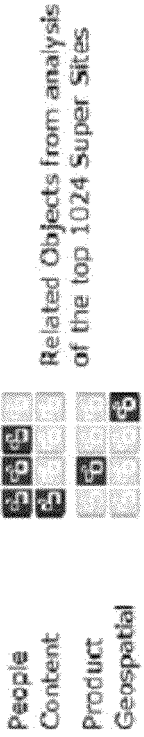

From FIG 24

3. Finding Missing Gaps of Information

People
Content
Product
Geospatial

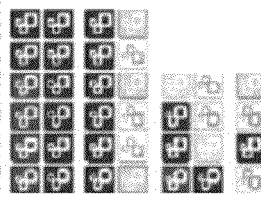

Related Objects from analysis of the top 1,024 Super Sites

4. After finding the Missing Gaps of Information the Internet is expressed in thousands of Page Ranks 5. Correlated Related Objects 6. TDR #2 Hot Cold Analysis of Related Objects 7. After second TDR filtering process the Internet is expressed in 1,024 Page Ranks

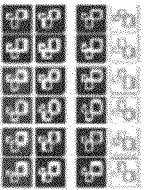 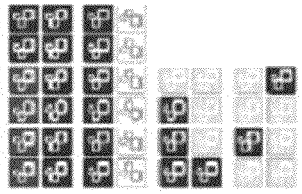 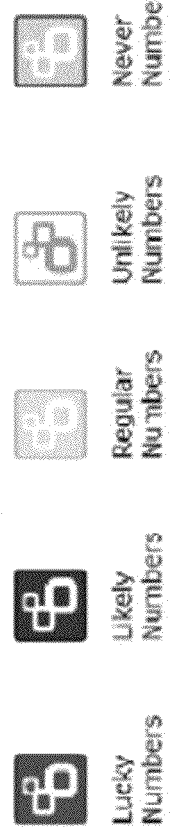

Lucky Numbers | Likely Numbers | Regular Numbers | Unlikely Numbers | Never Numbers

FIG. 31

1  [1] Blue and Gray or E1+E2, Mass = 1.2
   [2] Session or E3, Mass = 1.25
   [3] Union and Confederates or (E4+M1), Mass = 3
   [4] War or E5, Mass = 1.1
   [5] Civil War or (E6+E5), Mass = 1.5
   [6] War between the States or (E5+D1+E7) = 2.9
   [7] American Civil War or (E8+E6+E5), Mass = 3

2  [E01][E02][E03][E04][E05][E06]
   [E07][E08][⊕][M1]
   [⊕] Historical Events.                                    Are related to an Historical Event 3  Hot +Cold Personalized Dynamic FSD or Superset(I) with Mass of       3  [1.0]  4  [60]
4  The environment is set to Primary Relationship -> Historical Event , Anchor is War with Mass = 2
Primary Cluster:    "Civil War"   Secondary Cluster:  "American Civil Weight"
Tertiary Cluster:    "War between the States"
Related Mulligan Keywords: Confederates, Union, Session, Gray, Blue
Unrelated Never Keywords: Mexican, Spanish, Russian 60_Lucky_1_Never_3_likely_8_Basis 5  (55.2! - 50.2!) / 5! or 3,544,943       [L][⊕][R][⊕]  5 [30% - 60%]  6  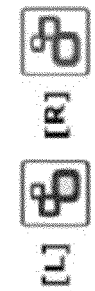

FIG. 32

1
- [1] Historical Maps or (E1+E2), Mass = 1.2
- [2] Military Maps or (E3 +E2), Mass = 2.2
- [3] War Military Maps or E4 (E3+E2), Mass = 3
- [4] Civil War or (E5+E4), Mass = 1.9
- [5] War between the States or (E4+D1+E6), Mass = 2.9
- [6] Robert E Lee Civil War or (E7+E8) (E5+E4), Mass = 3.7
- [7] American Civil War Robert E Lee Military Map Gettysburg or (E9+E5+E4) (E7+E8) (E3+E2) G1 , Mass = 5.9

2  [E] [E] [E] [E] [E] Historical Event  [E] [E] Historical Person

[E] [E] [E] [G] Product Object  [G] Historical Battle  [E] [E] Military Leader

[⌘] (I1) -> Historical Battle  [⌘] (J1) -> Military Leader  [⌘] (K1) -> Exact Product!!!

3  Hot +Cold Personalized Dynamic PSD or Subset(I, J, K)!!! with Mass of     3    7    4    10
4  The environment is set to Primary Relationship -> Exact Product, Secondary Rel. ->Historical Battle, Tertiary Rel. -> Military Leader
Anchor are Exact Data!!! -> Gettysburg & War-> General {Robert E Lee} with Mass = 7.0
Superset Clusters:  "Civil War", "American Civil Weight", "War between the States"
Set Cluster:    General("Robert E. Lee")
Subset Clusters  "Military Maps", "Historical Maps"
Related Keywords: "USA", "PA"
Unrelated Never Keywords: "1861", "1862", "1864", "1865"

10_Lucky_6_Never_4_Basis 5  (0! -0!) / 0! or 1 pages            [L] [⌘] [R] [⌘]    5    100%    6    [7]

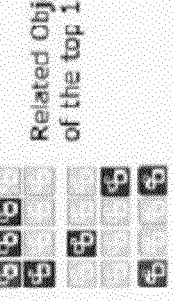
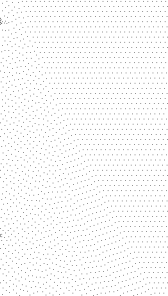
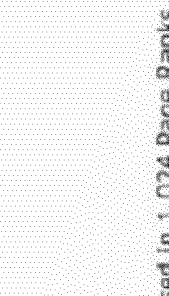
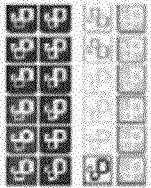
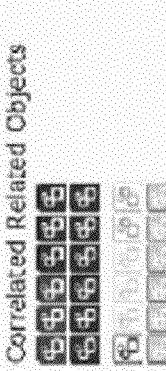

1  After the first TDR filtering process the Internet is expressed in 4,096 Page Ranks.

2  Reorganized Association Page

3  Finding Missing Gaps of Information
   People
   Content
   Product          Related Objects from analysis
   Geospatial       of the top 1024 Super Sites
   Events From FIG 44

4  After finding the Missing Gaps of Information the Internet is expressed in 2,048 Page Ranks 5  Correlated Related Objects 6  TDR #2 Hot Cold Analysis of Related Objects 7  After second TDR filtering process the Internet is expressed in 1,024 Page Ranks Lucky        Likely       Regular      Unlikely     Never
Numbers      Numbers      Numbers      Numbers      Numbers

FIG. 50

1 After the first TDR filtering process the Internet is expressed in 1,024 Page Ranks.

2 Reorganized Association Page    3 Finding Missing Gaps of Information

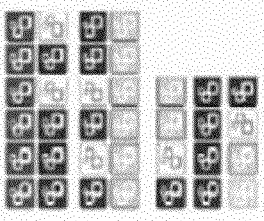

Content
Product
Geospatial

Related Objects from analysis of the top 1,024 Super Sites

From FIG. 47

4 After finding the Missing Gaps of Information the Internet is expressed in 128 Page Ranks 5 Correlated Related Objects    6 TDR#2 Hot Cold Analysis of Related Objects

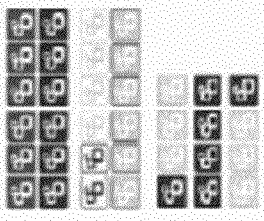

7 After second TDR filtering process the Internet is expressed in 16 Page Ranks

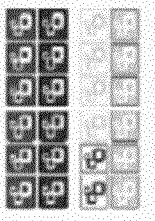  Lucky Numbers    Likely Numbers    Regular Numbers    Unlikely Numbers      Never Numbers

FIG. 53

CODEX SEARCH PATTERNS

CROSS REFERENCE TO RELATED APPLICATIONS

This Continuation-In-Part Utility application claims the benefit of:
a. co-pending U.S. Non-Provisional patent application Ser. No. 12/146,420, filed on Jun. 25, 2008 now U.S. Pat. No. 7,908,263;
b. co-pending U.S. Non-Provisional patent application Ser. No. 12/778,228, filed on May 12, 2010 now U.S. Pat. No. 8,239,229, which claims priority to co-pending U.S. Non-Provisional patent application Ser. No. 12/764,934, filed on Apr. 21, 2010, which claims priority to co-pending U.S. Non-Provisional patent application Ser. No. 11/584,941, filed on Oct. 23, 2006 now U.S. Pat. No. 7,809,659, which claims priority to U.S. Non-Provisional patent application Ser. No. 10/852,394 (abandoned), filed on May 24, 2004, which claims priority to U.S. Provisional Application Ser. No. 60/184,537 filed on Feb. 24, 2000;
c. co-pending U.S. Non-Provisional patent application Ser. No. 10/926,267, filed on Aug. 25, 2004 now abandoned, which claims priority to U.S. Non-Provisional patent application Ser. No. 09/514,940 (now issued as U.S. Pat. No. 7,058,601) filed on Feb. 28, 2000, which also claims priority to U.S. Provisional Application Ser. No. 60/193,160 filed on Mar. 28, 2000;
d. co-pending U.S. Non-Provisional patent application Ser. No. 11/223,226, filed on Sep. 9, 2005 now abandoned, which claims priority to U.S. Non-Provisional patent application Ser. No. 10/135,493 (abandoned), filed on Apr. 30, 2002, which claims priority to U.S. Provisional Application Ser. No. 60/289,033 filed on May 4, 2001;
e. co-pending U.S. Non-Provisional patent application Ser. No. 11/584,271 filed on Oct. 20, 2006 now abandoned, which claims priority to U.S. Non-Provisional patent application Ser. No. 10/926,446 (now issued as U.S. Pat. No. 7,050,813), filed on Aug. 25, 2004, which claims priority to U.S. Non-Provisional patent application Ser. No. 10/603,963 (now issued as U.S. Pat. No. 6,842,511), filed on Jun. 25, 2003, which claims priority to U.S. Non-Provisional patent application Ser. No. 09/544,238 (now issued as U.S. Pat. No. 6,614,893), filed on Apr. 7, 2000, which claims priority to U.S. Provisional Application Ser. No. 60/184,537 filed on Feb. 24, 2000; and
f. co-pending U.S. Non-Provisional patent application Ser. No. 11/085,678 filed on Mar. 21, 2005 now abandoned, which claims priority to U.S. Non-Provisional patent application Ser. No. 09/819,174 (abandoned), filed on Mar. 27, 2001, which claims priority to U.S. Provisional Application Ser. No. 60/193,160 filed on Mar. 28, 2000;
all of which are incorporated herein in their entirety.

FIELD OF THE INVENTION

The present invention relates generally to an Internet Search Engine Optimizer method and system, hereinafter referred as Optimizer. More particularly, the present invention relates to an interface product that works independently and in parallel with a browser client and search engine supercomputer server architecture that gathers, analyzes and distills input information interactively. The Optimizer analyses the end user's input and converts it into a search pattern. For each valid search pattern the Optimizer continuously maintains and updates a pre calculated and pre processed array or collection of best-fit web page responses. The Optimizer simultaneously keeps in existence for each search pattern its corresponding virtual simulation environment that contains all relevant bound web pages. Each virtual simulated environment possesses a relative Master Index. The Codex continuously purifies and synchronizes the plurality of relative Master Index that permits to match/merge and then correlates the Internet's Master Index in real time.

The Optimizer continuously scans and detects the environment in real time for new content with significant difference quality to update each search pattern's virtual environment partition relative Master Index and associated collections of top (n) web pages. The Optimizer heuristically reads the content by page, paragraph, sentence, and grouping of words for each web page. Existing Master Index has an absolute rank value for each web page. The Optimizer rank value is dynamically adjusted by matching independent variables and related keywords belonging to the search pattern to generate a content value. The Optimizer "cherry picks" the best content value web pages as output. The output is forward chained back to the end user's terminal and displayed.

BACKGROUND OF THE INVENTION

The limitations, drawbacks and/or disadvantages of technologies are as follows: Search Engines are based on 'Boolean algebra' eigenvector algorithms that are used to parse and filter information indices until the top page ranks are determined and displayed to the end user. Unfortunately, some specific keywords combinations may be too narrow and confound a search by hiding optimal results. Search Engines are predominately configured to perform one request to one reply search patterns. Each search is processed from the ground up without taking into account many requests belonging to one reply. A session consists of consecutive related and unrelated search requests to reach the final destination.

The Internet environment (U) can be construed as a complex and massive volume telecommunications network with billions of subscribers. The Search engine supercomputer analyzes information from the environment estimated to be billions of unique web pages, and then uses eigenvectors to determine the highest ranked pages from the end user's match criteria.

As explained, in the doctorial dissertation Designing Hot Billing Systems for Large Volume and/or Complex Networks© 1999, hereinafter referred as dissertation, "As the size of the environment increases the level of redundancy and tax burden of a system exponentially increases". For this reason, it will be object of this invention to eliminate the tax burden created by the environment.

The Optimizer converts requests into ideas by eliminating Search Engines dependency on "Boolean algebra" using Caesar=s "divide and conquer" approach that limits reaching the top results. In contrast, the Optimizer using 'deductive reasoning' interprets keyword combinations as being part of an idea being formulated by both the left and the right sides of the brain. When a request is incomplete the Optimizer probabilistically supplies and inserts missing gaps of information. The dissertation teaches that a Vector CDR can be expressed as the summation of a plurality of valid vectors. The Optimizer matches/merges a plurality of partial vectors and then correlates them to create a resultant vector containing a collection of top (n) web pages possessing informational certitude.

In a nutshell, the 'Boolean algebra' mimics Watson like criminal investigation methods for finding the best results. Whereas Optimizer uses Triangulation Deductive Reasoning to convert the end user's typed keywords into a meaningful idea, insert missing gaps of information, perform the steps of: 1) Association, 2) Relevancy and 3) Likelihood to create an optimal environment express in hundreds of web pages and finally 4) 'Cherry Pick', by physically read the content of each web page and then perform probabilistically vector weight comparisons to identify the best response.

Description of the 'HIVE' Supercomputer Dissertation and Intelligent Component Billing System The 'HIVE' is a massive parallel distributed managerial hierarchical structured supercomputer (hereinafter referred as "HIVE") that performs the following:

1) Transform Data:

The 'HIVE' cleans, standardizes and organizes the spaghetti of the environment by gathering, analyzing, distilling, managing, organizing and distributing the huge amount of information with a 'HIVE' that removes redundancy, latency and the organizational tax burden.

2) Synchronize Tasks:

The "HIVE" is also a decentralized parallel clustered large-scale supercomputer consisting of a plurality of nodes, which are specifically arranged in three tiers. The summit tier coordinates and executes global tasks. The middle tier coordinates and executes regional tasks. The lower tier coordinates and executes localized tasks and processes the lion share of non-critical transactions. The summit node of each tier synchronizes tasks by sending command messages that assigns the fuzzy logic state of each node belonging to its chain of command.

3) Lateral and Vertical Synergy:

A tier consisting of groups of nodes that are independent from other groups of nodes. Each tier partition performs mission critical tasks within their domain and works in parallel with other partitions of the same tier. Each node can shunt available resources using lateral and vertical synergy with parent, sibling or subordinate nodes to maximize available resources. Each node continuously analyzes its own environment current conditions and forward chains summary information until reaching the summit. At this point, the summit nodes rearward chain command messages with instructions that regulate priorities, resources availability, and notify each subordinate with coordinated and synchronized tasks constraints taking into account present network conditions to avoid saturation, clog and eliminate the 'spaghetti of the environment'.

4) Removes the "Spaghetti of the Environment":

Applying steps 1 to 3 the "spaghetti of the environment" is eliminated and then the "HIVE" creates command messages that are also known as environment bitmap data. Command messages coordinate and synchronize each node to operate at maximal output capacity. Each node operates without adversely affecting the network flow of data. The "HIVE" maximizes available throughput and limits the exponential rate of growth of complexity as the size of the environment increases.

5) Vector CDR:

Can be expressed as the summation of a plurality of valid vectors. A telecommunication call begins for its origin or Leg A and travels through a call trajectory circuit by circuit until reaching the destination or Leg B. The 'HIVE' assigns for Leg A and for Leg B one node, except when both origin and destination belong to the same circuit and thus the same node. When Leg A and Leg B do not belong to the same circuit, Tandem circuits are then used to bind them, which are expressed as Legs (X, Y, Z).

6) Forward Chaining:

Using SS7 conventions messages that are sent through the managerial hierarchy that originate from subordinates and are sent to their hierarchical superiors are referred as forward chained messages. A request message that originates outside of the domain or environment of the 'HIVE' is also considered a forward chaining message.

7) Rearward Chaining:

Using SS7 conventions messages that are sent through the managerial hierarchy that originate from hierarchical superiors and are sent to their subordinates are referred as rearward chained messages. A response message that is sent outside of the domain or environment of the 'HIVE' derived from a previously received request is also considered a rearward-chaining message.

8) Environmental Bitmap Data:

Also known the summary reports made by each node by the artificial intelligence. Each subordinate of the 'HIVE' during predefined time intervals creates a summary analysis of environment network conditions from its own perspective and also how much throughput is available as buffer. These messages are forwarded chained tier by tier in the managerial hierarchy and each hierarchically superior matches/merges the collective summary analysis of each of its subordinates to know the conditions of the environment of its chain of command, and this process is done until the summit tier has all the necessary information of the exact conditions of the environment, so it can optimally decide, control, manage and instructs and inform its subordinates. The summit tier then rearward chains the (global) environmental bitmap information to its subordinates. Middle Tier nodes control independent environments or regional domains, e.g. fixed, wireless and IP networks, or SE USA, and can also create and update their subordinates by reward chaining (regional) environmental bitmap messages.

9) Artificial Intelligence:

The "HIVE" consists of a plurality of nodes, where each one is programmed with Artificial Intelligence programs to perform predefined ad hoc tasks that are logistical rationalized based on the current conditions of the environment. The 'HIVE' is synonymous with the Superset (U). The cluster is divided into three geospatial tiers: a) Global, b) Regional, and c) Local. Each tier has the following functions:

a) Provisioning
b) Total Quality Management or (TQM)
c) Data Manipulation
d) Management Information Systems (or MIS)
e) Expert Information Systems (or EIS)
f) Inventory Control All nodes work collectively and independently from each other, and still simultaneously and in parallel perform the tasks of analyzing, evaluating, gathering and processing information from the environment in real time. From incipiency upon receiving the fuzzy logic piece of information that triggers a new task or update pending activities.

Each node is assigned to a Superset (I), Set (I, J), or Subset (I, J, K) cluster tier, and is assigned to geospatial domains (X) or global, (Y) or regional, and (Z) local to create sub clusters Elements (I, J, K, X, Y, Z) that help to build the managerial hierarchy as follows:

The Summit Tier coordinates the database used for Business Intelligence and Invoicing via the Internet that allows users to have access to their information in real time. The Middleware Tier manages regional geographical area. The Lower Tier controls a plurality of points of presence and collectively constitutes the workhorse of the system.

Each node synchronizes the latest inventory every predefined cycle, and then the artificial intelligence programming will optimize its organizational management logistics.

Nodes can request to members of the same group any excess buffer resources to complete a task using vertical and lateral synergy. Parent nodes can use their chain of command to coordinate the resources of their subordinates to complete a task. Members of different regional cluster can synergistically share and collaborate to process tasks.

Each node is able to replace and perform the organizational task of at least one node, so that collectively the "HIVE"; engulfs a global supplier.

The "HIVE" has specialized interaction means with the environment to gather, distill, analyze and then standardize and convert the raw information into primed lingua franca data, which in turn is quantified, qualified, organized and transformed, so that Information Entropy is achieved and thus removes the chaos and anarchy or "Spaghetti Phenomena".

Each lingua franca message is primed by the 'HIVE' as single version of the truth vector trajectory containing all pertinent transactional segments information. The vector trajectory assigns a hierarchical owner and activates all nodes related to the transaction so that nodes can communicate amongst themselves via forward and rearward chaining.

Proactively the human resources of the organization can use business intelligence software to send parameters to the 'HIVE'. Enabling individuals to directly control their own network, and then send command instructions with the latest conditions of the environment so the 'HIVE' can optimally analyze, coordinate, prioritize and synchronize throughput.

Middleware and Summit nodes perform data warehouse functions, and are programmed to monitor and control their chains of command. They act as virtual simulation of the organization. Lower nodes are designed to remove redundancy, geographically distribute activities, and then correlate and update information.

The 'HIVE' monitors the limited resources and capacities of the network to avoid taxing available throughput in real time. Each node can create, plot and update purchase orders as soon as new relevant messages from the environment are detected.

Upon receiving environment command instructions each node can manage and organize the flow of information of their subordinates from predefined point A to point B routes to avoid clogs and saturation. Each node via synergy attempts to maximize throughput, and assign, prioritize and shares with other nodes that have substantial buffer resources, since unused resources are considered waste, which is one the confounding variable that is directly related in creating the "Spaghetti Phenomena".

Network traffic is segregated and analyzed by tier as the informational traffic is measured based on the latest command instructions and known routing throughput limitations of each given domain. The summit nodes of each tier performs the non obvious task of removing complexity in order to be a real time system by eliminating data redundancy, filtering, quantifying, qualifying data as good or garbage, and minimizing waste before beginning to transmit the data through the managerial hierarchy system.

Nodes are programmed to remove the "Spaghetti Phenomena" at the point of attack, that is perform one transaction at a time, so that the 'HIVE' can reach Information Entropy at the organizational level to be considered a real time invention.

Summit and Middleware nodes stabilize the flow of financial conditions, inventories, shipping costs and tariffs required for billing, and update the XLDB database with trending statistics that in turn are used to optimize resources and available bandwidth.

Each node is programmed to be autonomous, and through means of the managerial hierarchical synergy, can work in parallel with others nodes to work as a single unit. Each node processes network information and then simulate, plot, map, tract and vector each message to create a virtual instance of the organizational environment.

After the 'HIVE' eliminates the "Spaghetti Phenomena", Informational Entropy is achieved and thus a state of balance, harmony and proportion exists. The 'HIVE' distributed configuration removes the need for a central mainframe. Consequently, a real time solution consists of synergistically synchronizing all the "HIVE" functions.

Each node has its own location identification means and must be assigned to one geospatial specific domain cluster such as local, regional or global. Every single activity and purchase order is processed in parallel, starting from the point of origin and ending at the point of destination. The "HIVE" then rearward chains the routing vector information through the simulation network to the point of origin.

The "HIVE" analyzes, evaluates and synchronizes the best usage of network resources as follows:
 a) Administers, coordinates, controls, manages, and transforms the network.
 b) Uses Business Intelligence to predict when a customer becomes dissatisfied.
 c) Manages the flow of money in real time.
 d) Sends summarized information packets to their organizational subordinates.
 e) Assigns costs to each activity and limiting each resource.
 f) Uses synergy to load balances the demand on the organization=s resources.
 g) Works always at maximal assigned throughput.
 h) Redundant with throughput reserves to compensate for network faults.
 i) Works in parallel with the simulated Legacy System.
 j) Parent nodes create command messages with resource allocation instructions.
 k) Creates partial vectors that measure one independent environment.
 l) Match/merge all partial vectors to create the final billing entity or purchase order.

RELATED ART

UCommerce:

A Computerized system and method for paralleling and simulating an existing network of retailer, supplier and wholesaler organizations and having the capacity of instantaneously generating, plotting, and updating an optimal price and shipping cost trajectory between two geographic locations to enable an end user to locate the lowest FOB, C&F, and CDF shipping cost for goods and services. The system manages production rates for suppliers, by purchasing at optimal cost order quantities and shipping at maximized discount rates. By coordinating the resources of multiple customers through common supplies and financial institutions, the system takes advantage of economies of scale to reduce transactional service charges and obtain the best supplier price for the consumer. The system is comprised of computers configured, linked and otherwise arranged to form a supercomputer, subdivided into multiple hierarchical neural-like subcomponents having neural elements residing at remote sites.

XCommerce:

A method based on UCommerce that simulates the entire superset of potential valid keyword regular expression requests construed during an Internet browser search and converting the results set into a vector based statistical data that enable efficient and accurate searching without requiring existing Browser based search engine supercomputer capabilities.

Search Engine Optimizer:

Is a method and system for simulating Internet browser search capacities that cleans, standardizes, organizes, and transforms the massive amount of data into a lingua franca comprising of valid keywords, keyword patterns for a given language, and unique geospatial patterns contained in the Internet collectively known as patterns that exist in web page. The comprehensive collection of search patterns with their relative Master Index are stored and continuously updated as web crawlers detect changes in the environment.

Each Search Pattern consists of at least one independent variable, e.g. (I), (J), (K), (X), (Y) and (Z). Search Patterns with 0 independent variables use "Boolean algebra" techniques that find the final destination within the massive (U) or Internet environment.

A search engine optimizer (hereinafter referred as Cholti), which works independently and in parallel with a browser and search engine supercomputer to gather, analyze, and distill input information interactively. The optimizer reorganizes the input, and providing an optimized version as an output. The reorganized and improved version of the input (e.g. output) is sent to the search engine, which responds to the end user with the top search results. The optimizer recognizes each request as a pattern and stores the pattern in an advanced Glyph format. This permits the optimizer to identify any left (linguistics) or right (geospatial) side of the brain checkmate combinations required to achieve certitude.

PRIOR ART

The Internet, electronic commerce and online services have become one of the fast growing segments of the economy. These companies gather, validate, verify and exchange end user information in an effort to understand, for example, the kind of products and services the consumers value most, and how and why they make such determinations.

With regard to the electronic trade (or E-Trade) industry, there have long been individual computers loaded with programs for performing online purchasing, inventory control and accounting functions to manage resources. Such systems rely upon the processing power and data within a centralized architecture absent of complex artificial intelligence programming. A problem with these centralized architecture applications has been that more processing power and data access capability is needed, as well as reduced bandwidth usage, coupled with web and virtual world access.

Search Engine accuracy is another important financial issue where many multinational companies spend billions of dollar from the dominance in this Industry. In particular with regards to, which company is the most viable and has the most accuracy. Unfortunately, "Boolean algebra" technologies are limited in their ability to pick the best-fit top pages in a regular basis, and targeted advertisements technologies have room for improvement.

Solutions to large volume and/or complex networks are presented in the published Doctoral Dissertation of the present inventor, entitled Designing Hot billing Systems for Large Volume and/or Complex Network, submitted for the degree of Doctor of Philosophy in Management at California Coast University in November of 1999, the entire content of which is incorporated herein by reference.

Consequently, there is a well-established unmet need for a state of the art Search Engine Optimizer that can deliver the optimal top (n) pages in a consistent basis overcoming the drawbacks and limitations of the prior art.

It is yet another object of the present invention to provide such a computer network that minimizes bandwidth usage by performing scheduled and synchronized calculations and updates throughout the network. This allows the Supercomputer to accurately project future resource requirement trends in order to update end user's software to avoid system congestion. Each Summit Tier functions are provided to update all of the components by sending only summarized information packets to its organizational subordinates.

It is still a further object of the present invention to provide such a network system that maximizes network-processing power by shunting calls from computers momentarily operating at or near capacity, and thus having smaller buffers to less-taxed computers having larger buffers mimicking lateral and vertical synergy in human organizations.

It is yet a further object of the present invention to provide such a network system having the flexibility to operate in conjunction with search engine capacities, such that existing equipment is not wasted and the cost of updating is minimized.

It is still another object of the present invention to provide such a system, which is relatively redundant and inexpensive to assemble and operate.

It is still another object of the present invention to convert all related subject matter to this particular architecture into the "HIVE".

It is still another object of the present invention to partition the overall supercomputer cluster or superset into sets clusters. The sets are partitioned into subsets clusters. The subsets are partitioned into elements clusters comprising several nodes. The superset, set, subset and element clusters are placed in a distributed geographic managerial hierarchical manner for better efficiency and effectiveness of handling tasks.

It is still another object of the present invention to convert all the electronic information of the Internet into an architecture that resembles physical inventory.

It is still another object of the present invention to be able to match/merge a plurality of requests into a session.

It is still another object of the present invention to transform the Summit Tier into a global domain Superset (I) cluster representing independent variable (I), the Middle Tier into a regional domain Set (I, J) cluster representing independent variable (J), and the Lower Tier into a local domain Subset (I, J, K) cluster representing independent variable (K).

It is still another object of the present invention that each node can transform geospatial data using independent variables (X), (Y) and (Z) and then control a discrete number of web pages. Each node has the means to valorize the content of each web page as web crawler in parallel scan, distill, analyze and vector the environment in real time.

It is still another object of the present invention to optimize the search engines dimension using summarized informational site data. Where, said Site data contains an extract of its content so the "HIVE" can insert missing gaps of information when needed.

It is still another object of the present invention to optimize the search engines by storing a partition of the Internet based on independent variable (I), hereinafter referred as Block or Superset (I). Each Block domain has its own relative Master Index that is a subordinate to the Master Index and is updated in real time and can be expressed in millions of web pages.

It is still another object of the present invention to optimize the search engines by storing a hierarchical partition of a Block based on independent variable (J), hereinafter referred as Sub Block or Set (I, J). Each Sub Block domain has its own relative Master Index and is updated in real time and can be expressed in thousands of web pages.

It is still another object of the present invention to optimize the search engines by storing a hierarchical partition of a Sub Block based on independent variable (K), hereinafter referred as Mini Block or Subset (I, J, K). Each Mini Block domain has its own relative Master Index that is updated in real time and can be expressed in hundreds of web pages.

It is still another object of the present invention to optimize the search engines by storing a sub partition of a Mini Block based on independent variable (X), hereinafter referred as Element or Subset (I, J, K)!, having its own relative Master Index and is updated in real time.

It is still another object of the present invention to optimize the search engines by storing a sub partition of a Subset (I, J, K)! based on independent variable (Y), hereinafter referred as Element or Subset (I, J, K)!!, having its own relative Master Index and is updated in real time.

It is still another object of the present invention to optimize the search engines by storing a sub partition of an Element or Subset (I, J, K)!! based on independent variable (Z), hereinafter referred as Subset (I, J, K)!!!, having its own relative Master Index and is updated in real time.

It is still another object of the present invention that each Block, Sub Block, Mini Block and Element has a best fit inventory in a database structure or Z_Price Bitmap that is directly related to a given Managerial Hierarchical Relationship Indices.

It is still another object of the present invention that each Managerial Hierarchical Relationship Indices has its own visible environment, which is a partition of the Internet, and from its own perspective has a relative Master Index that is a subset of the Master Index.

It is still another object of the present invention that each Managerial Hierarchical Relationship Indices having at least 2 independent variables is a partition of its superior relative Master Index. All relative Master Indices are subordinate to the Master Index.

It is still another object of the present invention that each relative Master Index can be directly associated to its chain of command.

It is still another object of the invention that each Block, Sub Block, Mini Block, and Element is stored in a database structure or Codex Page.

It is still another object of the invention that each Codex Page has a plurality of Z_Price Bitmap with the top (n) results from each valid dynamic Search Pattern.

It is still another object of the present invention that each Z_Price Bitmap is continuously updated as web crawlers identify changes in the Internet environment.

It is still another object of the present invention to integrate a database that controls, coordinates, partitions, replicates and maintains the vector search pattern information.

It is still another object of the present invention to convert all physical and electronic information of the Internet into multi dimensional and geospatial inventory.

It is still another object of the present invention to purify, clean and standardize the Internet=s environmental spaghetti by storing the geospatial information of links and their associated content, converting all the data into a superset X.

Superset X=(0, I, ~I, J, ~J, K, ~K, T, ~T), where I, J, K consist of the independent variables and T refers to time.

It is still another object of the present invention to associate, coordinate, control, optimize and synchronize a plurality of independent searches request without saturation, with Informational Entropy and minimal latency or system tax burden. ~I, ~J and ~K are eliminated as the system creates Superset (I), Set (I, J) and Subset (I, J, K) Search Patterns structures that quantify and qualify with certitude the value of the content of a link. ~T is also eliminated once the system is able to comprehensively gather, distill and analyze in real time all the events of the environment.

It is still another object of the present invention to analyze and evaluate the Internet=s environmental spaghetti to associate, coordinate, control, optimize and synchronize a plurality of independent search requests as Codex Pages.

It is still another object of the present invention to teach how to build a Superset (I), Set (I, J) and Subset (I, J, K) search engine valorization method for keywords, clusters and/or search patterns.

It is still another object of the present invention to teach how to assign each independent variable to a common denominator category.

It is still another object of the present invention to teach how to vector and then match/merge two independent variables that have directly relevant categories, and then probabilistically correlate them into a single event.

It is still another object of the present invention to teach how to build a Subset (I, J, K)!, valorization method for search patterns having one event, a Subset (I, J, K)!!, valorization method for search patterns having two events, and a Subset (I, J, K)!!!, valorization method for search patterns having three events.

It is still another object of the present invention to teach how to build a Z_Price Bitmap database structure with the optimal top (n) results web pages to validate, valorize, analyze, read and distill the actual content of each web page when picking the best response.

SUMMARY OF THE INVENTION

The present invention overcomes the aforementioned limitations of the prior art, and accomplishes the above-stated objectives as well as others, as may be determined by a fair reading and interpretation of the entire specification.

The "HIVE" is provided to incorporate a plurality of artificial intelligence programmed independent nodes, also referred to herein as Intelligent Components, which uses business rules to determine, limit and restrict, based on traffic volumes and available resources. Each node can match/merge raw data and then correlates it into primed data. Each Intelligent Component dependent on traffic volumes and known throughput make decisions on their own using business rules, permitting them to perform complex tasks. After receiving all messages to a particular transaction a Vector CDR is built having all the Partial Vector segments components, permitting subordinate Intelligent Components to complete most non-critical tasks.

Summit nodes have the ability and authority to create summary data and command instructions that coordinate, synchronize and prioritize their chain of command, and then gathers, distills and disseminates the network wide data, so it can assign, control, coordinate and synchronize directives to their entire organization to process tasks. Using a 3D mentality the organization managerial hierarchy is rendered as Pyramid like structure.

The "HIVE" works in an organized managerial hierarchical manner to simulate all the Internet web pages and their associated content and the massive transactional traffic volumes derived from the interactions with the environment.

The "HIVE" receives each request and breaks it into keywords and identifiable clusters, and then transforms them into statistical data structures known as Glyphs, which store vector values. The "HIVE" determines how many independent variables are present in a request and then stores information as a Search Pattern.

The "HIVE" is programmed to understand dynamic Search Patterns based on at least one request belonging to a session. Then based on the number of independent variables (I, J, K) from the left side of the brain and (X, Y, Z) from the right side of the brain it can find, forecast and derive the best-fit maximal domain size. Otherwise, when no independent variables are present the entire Internet or (U) is visible consisting of billions of web pages.

Superset (I):

When one independent variable is present (I), the search is restricted to a Superset (I) domain that is a partition of the (U) and is referred to a Block that possesses all the relevant Sites consisting of million of web pages.

Set (I, J):

When two independent variables are present (I, J), the search is restricted to a Set (I, J) domain that is a partition of the Superset (I) and is referred to a Sub Block that possesses all the relevant Sites, consisting of thousands of web pages.

Subset (I, J, K):

When three independent variables are present (I, J, K), the search is restricted to a Subset (I, J, K) domain that is a partition of the Set (I, K) and is referred to a Mini Block that possesses all the relevant Sites, consisting of hundreds of web pages.

The "HIVE" uses Triangulation Deductive Reasoning hereinafter referred as TDR that mimics the brain's deciphering process. The Optimizer uses the Left Brain that analyzes with linguistics, and the Right Brain that measures geospatial information to determine from the collection of keywords typed what is the end user's idea.

The Optimizer immediately determines, which keywords or clusters are independent variables and converts, reorganizes, and correlates the request into a managerial hierarchical probabilistic vector. Each relevant Glyph is probabilistically associated to an information category, e.g. person or product.

Independent Variables:

The "HIVE" can identify from the Left Brain independent variables (I, J, K) and from the Right Brain (X, Y, Z). Left brain determines first the Superset (I), Set (I, J) and Subset (I, J, K). Right Brain can replace Left Brain independent variables when null or below a limit.

Events:

The Optimizer creates event by match/merging independent variables from both sides of the brain [L+R]. E.g. (I) and (X) are merge to (I!), (J) and (Y) to (J!) and (K) and (Z) to (K!). For each identifiable event the Search Pattern receives an exclamation or (!) that represents better informational entropy. E.g. Subset (I, J, K)!!!, means the request is exact, and the Optimizer with certitude will reach the final destination.

Association:

The "HIVE" performs the first step of TDR, known as Association, by using the rules of association and transitivity and then expanding the Glyph equation by attaching additional keywords and clusters related with the set of Glyphs typed by the end user.

Relevance:

The "HIVE" performs the second step of TDR, known as Relevance, using the Hot & Cold valorizations means to expand the Glyph equation by finding missing gaps of information, and then assigns each independent variable to a Category.

Likelihood:

The "HIVE" performs the third step of Deductive TDR, known as Likelihood, using the Likely & Unlikely probabilistically weights the final value of each web pages, and improves the Glyph equation by adding 'Related Objects', and then determines if two independent variables can become an Event.

"Cherry Picking":

The "HIVE" final step of TDR is known as "Cherry Picking", where the best responses are selected after reading, inspecting and matching in behalf of the end user the content of the top (n) valued web pages to create a dynamically weighted content value that replaces page rank as a means in determining the optimal solution.

Storing Search Patterns into Codex Pages:

Each Search Pattern is stored and updated in their particular Codex Page that corresponds to a particular and unique relationship of independent variables.

Codex:

Is a comprehensive collection of Search Patterns that are stored in a managerial hierarchical manner. The 'HIVE' lingua franca consists of a plurality of concurrently operating Block domains, and the sum of all the Blocks is the Internet.

STATEMENT OF THE PROBLEM

Search Engine problems are associated to the Master Index that arranges from lowest to highest each web page. The Master Index is an aggregate Power Method eigenvector that includes at a given time interval a snapshot of the Internet and the content of each web page, and if not updated in real time becomes incomplete and confounded.

Unfortunately, to normalize the Master Index and continuously synchronize the content of each web page for such a complex and/or large volume computer network is a tall order. Change in the environment is a constant, and due to the geometric rate of growth of the Internet can be quantified in the millions per day, and thus integrating the latest results in real time clogs and exceeds the computer network's critical mass throughput.

SOLUTION

The solution is to eliminate clog and saturation and thus the 'spaghetti phenomena'. The "HIVE" has the ability to update the plurality of Block simulations of web pages belonging to the environment. The "HIVE" continuously updates, inserts, deletes and purifies each Block, Sub Block, and Mini Block by using the quality levels of each Site, and the Z_Price Bitmap valorization algorithm to always keep the calculations of: Blocks in the millions, Sub Blocks in the thousands, and Mini Blocks in the hundreds. The "HIVE" purifies from the bottom to top all Mini Blocks and their parent Sub Blocks and their grandparent Blocks relative Master Index and the Master Index are updated in real time.

Once the Managerial Hierarchy is purified, then the Codex and its plurality of relative Master Indices and Master Index are also clean and ergo up to date. Thus, eliminates the Master Index inefficiencies, which is the primary source of inaccuracy and confounding results. The Master Index relies on past information. The "HIVE" relative Master Indices are updated as change is encountered in real time making the Master Index obsolete.

Search Patterns
Mathematical Fundamentals

This section explains the statistical model for validating a Lottery Grid based on software I wrote while getting my Bachelor's degree in Mathematics. At that time, a French mathematician said "that if you played 100 numbers using a pattern for 100 weeks it would increase dramatically the odds of making money out of playing the lottery". Lucky people that use the system have won the lottery more than 1 time. I personally bet 1 dollar and cherry pick my Lucky Numbers. While, the lottery has no direct relationship with random surfing the Internet, the math behind both is exactly the same, thus the mathematical fundamentals are also the foundation to Codex Search Patterns calculations.

To valorize a grid consisting of six numbers of a Lottery lets say of 50 numbers using the traditional method it would be as follows: $(50!-(50-6)!))/6!$ or $(50*49*48*47*46*45)/(6*5*4*3*2*1)$ or 15,890,700 or Lottery_50_Basis. This means that exactly 15,890,700 permutation or different number combinations can be created exhaustively. All figures presented in this section are based on US Dollar, or USD.

Consequently, if you purchase a lottery grid the odds of winning with a $1 dollar ticket is 1/Lottery Basis. Everything would be OK, if you would play to infinity, over time your numbers would eventually be selected.

Limited Resources:

In this case, the player=s limited resources consists of time and money. Assuming the end user wanted to gamble $10,000, but instead of gambling all in one shot divides them into 100 bets for 100 weeks playing Saturdays only, or 50 weeks playing both Wednesdays and Saturday.

Let suppose, the player wants to increment his odds of playing by taking into account some basic statistical concepts, and then takes some additional predefined risks that if correct will increment the odds of successfully winning the lottery, and substantially decrement if they fail to occur.

Lucky Numbers:

Lucky Numbers are also known as hot numbers. If you follow the trending of numbers it seems that some number appear to fall more that 1/50 of the time, for example in the State of Florida the number 48 was almost falling 1/25 of the time for a period. The measurement of a discrete amount of occurrences is called trending. The players 100 bet for the next 100 lottery draws qualify as a discrete sample subject to the principles of trending. Even if the player played the 10,000 grids at once the odds of successfully, winning would be minimal or 10,000/(50_Lottery_Basis or 15,890,700) or 1 in 15,890.7. The first Lucky number is always considered to be the power ball number, since it is the one that most distinctly shrinks the environment.

In this case, money would also be another variables, since the draw purse increases as no one wins e.g. from 7 to 9 to 12 to 15 to 21 to 28 to 35 to 48 to 62 to 83 to 100 to 125 to 160 to 200 million USD, and then reset to 3 million once someone has a lottery winner. Furthermore, the actual draw purse increases as the number of bets are performed. The 'greed factor', where many players don't bother if the purse is less than 25 million, and play more once the purse exceeds 100 million.

Redundancy:

The value of a ticket is further adjusted by the total number of winning tickets that is influenced by the total # of bets. Let us assume that for each draw at least 7,945,350 bets are made. Thus, there is a 50% chance that a winner exists each week. Not necessarily so, since most people by coincidence play the same numbers, which is known as redundancy. If three people independently purchase tickets with the following number (7, 12, 21, 34, 37, 48) and those are the Lucky Numbers then the purse is split equally amongst the three winners. If the lottery draw purse were $21,000,000, then each lucky winner would win $7,000,000.

Unique Numbers:

To find the number of unique numbers is quite another story, as redundancy increases geometrically as the volume increases, for example it is possible that even if 100,000,000 bets are made none of the lottery tickets has the Lucky or Unlucky Numbers of (1, 2, 3, 4, 5, 6) as explained later.

Using the following over simplifications, the reader will have an idea of how redundancy occurs. To simplify the quantity of unique numbers we will assume that the Lottery_50_Basis of 15,890,700 is actually 16 million and the weekly minimum draw is also adjusted from 7,945,350 to 8 million. If the draw purse is less than 20 million, the actual numbers of bets is (draw purse/4+8) million, and when it exceeds 20 million it is (draw purse/2+8 million) and when it exceeds 100 million it is (draw purse*2)+16 million.

Approximately for every lottery basis range or in this case 16,000,000 million bets one half of the unique numbers combinations are eliminated. Thus 32 million bets eliminate 3/4, 64 million bets eliminate 7/8, and 128 million bets eliminate 15/16 and 256 million bets eliminate 31/32 of the valid permutations. Thus, when people going into a frenzy bet collectively for a given purse a total of 256 million bets this leaves about 1/32 or 500,000 lottery grid permutations without a bet. E.g. (1, 2, 3, 4, 5, 6) is one of those lottery grids.

Numerical Redundancy:

Also, most winners will most likely find out that they have to share the winner with other betting players. For a 120 million draw purse with a total numbers of 256 million bets the estimated number of winners is (total # of bets/lottery basis)/2 or exactly eight independent betting players. Thus, due to numerical redundancy a total of eight players won the lottery, and split the purse, and just win (120 million USD/8) or 15 million USD.

Numeric Distribution

Based on the software five distinct classes of numbers exist:

Lucky Numbers:

Are also referred as hot numbers, and consist of a discrete amount of numbers that will directly affect the random select numeric distribution on each grid. When the end user wants a Lucky number to appear then each grid will have them. Otherwise, each Lucky number has a probability of randomly appearing.

Using the following numeric distributions based on the number of independent variables as follows: 0: use 1. 1: use 1-1. 2: use 1-2-1. 3: use 1-3-3-1. 4: use 1-4-6-4-1. 5: use 1-5-10-10-5-1. 6: use 1-6-15-20-15-6-1.

When three Lucky Numbers (I, J, K) appear in each grid we use 1-3-3-1 numeric distribution as follows:

a) 0 Lucky Numbers: $(0.3*0.3*0.3)$ or 0.027 or 2.7%
 b) 1 Lucky Number: $3*(0.7*0.3*0.3)$ or 0.189 or 18.9%
 c) 2 Lucky Numbers: $3*(0.7*0.7*0.3)$ or 0.441 or 44.1%
 d) 3 Lucky Numbers: $(0.7*0.7*0.7)$ or 0.343 or 34.3%
 Add a) to d) (2.7%+18.9%+44.1%+34.3%)=100% or 1)

Gambling Strategies

One (1) Lucky Number Strategy:

When creating Lottery Grids the numbers are sorted in ascending order and no duplicates are permitted. Assuming, a player creates 100 grids, and then uses the same grid for the next 100 consecutive draws, and (1/50) normal probability per number exists. 100 draws times (1/50) normal probability means that in two drawings (I) should appear. What are the odds of winning in this case? Once one (1) Lucky number or independent variable (I) is known the gambling strategy pays off: From: (50!−(50−6)!))/6! or (50*49*48*47*46*45)/ (6*5*4*3*2*1) or 50_Lottery_Basis or 15,890,700. To: (49!−(49−5)!))/5! or (49*48*47*46*45)/(5*4*3*2*1) or 1,906,884 or 50_Lottery_Lucky__1.

Two (2) Lucky Numbers Strategy:

Once two (2) Lucky Numbers or independent variables (I, J) are known the odds of winning significantly increase as follows: From: 50_Lottery_Basis or 15,890,700. To: (48!−(48−4)!))/4! or (48*47*46*45)/(4*3*2*1) or 194,580 or 50_Lottery_Lucky__2.

Three (3) Lucky Numbers Strategy:

Should one of the draws fall within three (3) Lucky Numbers or independent variables (I, J, K) the odds of winning significantly increases as follows: From: 50_Lottery_Basis or 15,890,700. To: (47!−(47−3)!))/3! or (47*46*45)/(3*2*1) or 16,215 or 50_Lottery_Lucky__3. Each grid will be guaranteed to win $3 to $5 by being (3/6) winners, most grids will be (4/6) winners, some grids may be (5/6) winners, and knowing that each grid has the probability of (100/16,215) or 0.616% of having a (6/6) winner!

Four (4) Lucky Numbers Strategy:

Should the user pick four (4) Lucky Numbers or independent variables (I, J, K, L) the odds of winning are huge!!! From: 50_Lottery_Basis or 15,890,700. To: (46!−(46−2)!))/2! or (46*45)/(*2*1) or 1,035 50_Lottery_Lucky__4. Each grid will be guaranteed to win $12 to $35 by being (4/6) winners, some grids may be (5/6) winners, and knowing that each grid has the probability of 100/1,035 or 10% of having a (6/6) winners!

Gambling strategies using Lucky Numbers techniques directly apply to the Optimizer ability to find with certainty the best fit web page when improving over existing search engine technologies. "Boolean algebra" technologies accuracy can be represented as Search Patterns with three (3) or four (4) Lucky Numbers or independent variables that yields 1,035 good results. For simplicity the 1035 figure is rounded down to 1,000. Then another round of analysis and filtering occurs so the top 10 instances can be displayed by eliminating the worst 98% web pages. From the best 2%, which consist of 20 web pages, the top (n) results have a 50% or (10/20) probability of being the most accurate.

Fundamental Mathematics Simplifications

The examples included in this specification uses fundamental mathematics simplifications, which uses rounded and whole numbers, even though the reader can recalculate at their leisure with the exact values when applicable.

When comparing existing Search Engines technologies against the Optimizer the accuracy of the top (n) results will be the benchmarked in determining the level of precision. Yes, when an end user types a direct request having an exact regular expression that yields the final destination, it is similar to saying the Search Pattern has five (5) or six (6) independent variables. Such good quality of information will improve existing technologies 'Boolean algebra' searches to yield an environment size of 128. For simplicity, we will use 100. By eliminating the worst 98%, the probability that the final destination is the top ranked web page is (2) or 50%, and that it belongs to the top two ranked web pages is 98%, and that it belongs to the top (n) results is probabilistic virtually guaranteed.

Codex Search Patterns

The Optimizer attempts to reach the final destination immediately for each request or session not relying on the end user's gray matter. The Codex is a massive book that stores the billions of valid and plausible Search Patterns.

Static Requests:

Each Codex Pages stores the Super Glyph equation and the top (n) responses.

Dynamic Requests:

Each Codex Pages stores for dynamic requests sessions stores the independent variables used to yield the optimal sized environment, and then the remainder of the Super Glyph equation is used to decipher the top (n) results from the end user's vector values Never Numbers:

Are also referred as cold numbers, which consists of a discrete collection of numbers that are used by the gambling strategy to determine if a grid is valid.

Disqualifying Grids:

In a gambling strategy that a Never number will not appear, it will disqualify any grid that possess at least one Never number.

Probabilistically Disqualifying:

Otherwise, the quantity of Never Numbers determines the probability to disqualify a grid. For example, if a grid has no Never Numbers they are approved, otherwise based on the quantity of Never Numbers present in the grid a random roll is made, and if any random number is greater the valid value the grid is disqualified.

Using Lucky Numbers and Never Numbers gambling strategy techniques will improve Search Patterns. The Codex uses Hot and Cold Algorithm to measures discrete sized trends for an end user search session. A search session is defined as 1 to 20 continuous non-duplicate requests to reach a particular final destination within a predefined time interval. Perception of a Search Engine is based on customer satisfaction. Dissatisfaction geometrically grows as the number of requests and time spent required to reach the final destination increases.

Now let us, see how the environment shrinks when applying Never Numbers. If the end user selects one Never Number that will not be included, the amount of permutations is lower. When a grid of fifty numbers has one Never Number the amount of permutation is (49!−(49!−6!))/6! or 13,983,816 and if twelve Never Number are select the amount of permutation becomes (38−6)!/6! or 2,760,681.

Thus when combining the Hot and Cold algorithms together a natural reduction of the environment occurs from both the optimistic and the pessimistic perspectives. For Example, a player determines to rotate three (3) Lucky Numbers and have each grid with at least one, and also decides to select 12 Never Numbers as part of the gambling strategy. If the end user's gambling strategy is successful in a draw that accurately forecasted 1 Lucky number and 12 Never Numbers, then the amount of permutation is calculated as follows:

Hot & Cold Algorithms Reductions

If one (1) Lucky Number is accurately selected the environment is 50_Lucky__1 or 1,906,884 unique permutations. From: (49!−(49−5)!))/5! or (49*48*47*46*45)/(5*4*3*2*1) and, further reduced by including the 12 Never Numbers. To: 50_Lucky__1_Never__12 or ((49−12)!−(49−12−5)!/5! or (37!−32!)/5! or 435,897.

If four (4) Lucky Numbers are accurately selected and 12 Never Numbers do not appear the environment shrinks from 50_Lottery_Basis or 15,890,700 to 50_Lucky__4_Never__12 or (46−12)!−(46−14)!))/2! or (34*33)/(2*1) or 561. Each grid will be guaranteed to win $12 to $35 by being (4/6) winners, some grids may be (5/6) winners, and knowing that each grid has the probability of (100/561) or 17% of having a (6/6) winners!

If you compare the value of 50_Lucky_2 gambling strategy as a dollar amount, and then compare it against the value of 50_Lucky_2_Never_12 gambling strategy the rate of return is significantly higher, with a minimal risk. The secret is to select the Lucky Numbers.

The 'HIVE' Uses Independent Variable

The Hot & Cold algorithm measures end user trending and helps rationalize an idea from the optimist and the pessimist perspectives. The Hot & Cold algorithm removes patterns that will hide the final destination, and elucidates those that will show the final destination. Using TDR: each Lucky Number represent one independent variable of significant difference, e.g. (I, J, K) and (X, Y, Z).

Left Brain independent variables (I, J, K) are linguistic patterns and Right Brain independent variables (X, Y, Z) are geospatial patterns.

Cholti Uses Both Sides of the Brain

Each side of the brain left [L] and right [R] can have up to 3 independent variables or Lucky Numbers that become checkmate combinations that create optimal environments that are used to find where the final destination resides.

Regular Numbers:

Consists of any regular occurrence number or in the case of a lottery consisting of 50 unique numbers each will have 1/50 probability.

Likely Numbers:

Consists of a discrete amount of numbers that have twice the probability of Regular Numbers of appearing.

Unlikely Numbers:

Consists of a discrete amount of numbers that have half the probability of Regular Numbers of appearing.

When Lucky Numbers Act as Likely Numbers:

Cholti may treat Lucky Numbers as Likely Numbers, and gives each Lucky Numbers a probability five times higher of appearing in a grid than Likely Numbers.

When Never Numbers Act as Unlikely Numbers:

Cholti may treat Never Numbers as Unlikely Numbers, and gives each Never Numbers a probability one fifth (1/5) lower of appearing in a grid than Unlikely Numbers. When these options are used by Cholti to make calculations all the grids are based from a draw basis of 50, still Lucky Numbers will appear 10 times more often than Regular Numbers and Never Numbers will appear in one tenth less often than Regular Numbers.

Consequently, the Optimizer never eliminates any page from the environment when performing a search, instead assigns Never Numbers and Unlikely Numbers values to web pages that while valid if selected will confound the final destination. Thus, the entire environment (U) is always valid and used, yet a web page must be visible to be taken into consideration. A search pattern creates a partition rendering most web pages irrelevant.

Basic Patterns

Lucky Numbers Patterns

We will use the following numerical patterns as a basis:
a) 60_Lottery_Basis is (60!−(60−6)!)/6! or 50,063,860
b) 60_Lucky_1 is 59!−(59−5)!/5! or 5,006,386
c) 60_Lucky_2 is (58!−(58−4)!)/4! or 424,270
d) 60_Lucky_3 is (57!−(57−3)!)/3! or 29,260
e) 60_Lucky_4 is (56!−(56−2)!)/2! or 1,540

Combining Lucky & Never Numbers Patterns:

When including twelve Never Numbers as part of a gambling strategy the total number of combinations belonging to the environment considerably shrinks to:
a) 60_Lottery_Never_12 is 48!−(48−6)!/6! or 12,271,512
b) 60_Lottery_Lucky_1_Never_12 is 47!−(47−5)!/5! or 1,533,939
c) 60_Lottery_Lucky_2_Never_12 is 46!−(46−4)!/4! or 163,185
d) 60_Lottery_Lucky_3_Never_12 is 45!−(45−3)!/3! or 14,190
e) 60_Lottery_Lucky_4_Never_12 is 44!−(44−2)!/2! or 946

Odd-Even Patterns:

This numeric pattern measures the winning draw by successfully sampling the number of odd and even numbers included in the final draw. For example, the Lottery grid (1, 2, 3, 4, 5, 6) has a three (3) odds pattern, whereas Lottery grid (2, 4, 6, 8, 10, 12) has a zero (0) Odd numbers pattern.

Odd-Even Distribution:

Odd-Even uses a 1-6-15-20-15-6-1 distribution for 60 numbers as follows:
a) 0 odd numbers: (60_Lottery_Basis*1/64) or 782,247
b) 1 odd number: (60_Lottery_Basis*6/64) or 4,693,486
c) 2 odd numbers: (60_Lottery_Basis*15/64) or 11,733,717
d) 3 odd numbers: (60_Lottery_Basis*20/64) or 15,644,925
e) 4 odd numbers: (60_Lottery_Basis*15/64) or 11,733,717
f) 5 odds numbers: (60_Lottery_Basis*6/64) or 4,693,486
g) 6 odd numbers: (60_Lottery_Basis*1/64) or 782,247

Decimal Patterns:

This numeric pattern only measures the winning draw by successfully sampling the numbers of unique decimals that appear in the final draw. E.g. the Lottery Grid (1, 2, 3, 4, 5, 6) has a pattern of 1 Decimal, and for the Lottery Grid (2, 4, 6, 8, 10, 12) the pattern is 2 Decimals.

Decimal Distribution:

Of a sixty number Lottery Grid combinations is as follows:
a) 60_Lottery_Decimal_1 is 1260
b) 60_Lottery_Decimals_2 is 575,100
c) 60_Lottery_Decimals_3 is 9,562,500
d) 60_Lottery_Decimals_4 is 25,425,000
e) 60_Lottery_Decimals_5 is 13,500,000
f) 60_Lottery_Decimals_6 is 1000000

Digit Patterns:

This numeric pattern only measures the winning draw by successfully sampling the number unique digits included in the final draw. For example, the Lottery Grid (1, 2, 3, 4, 5, 6) the pattern is six (6) Digits, and for the Lottery Grid (2, 12, 22, 32, 42, 52) the pattern is 1 Digit.

Digit Distributions:

Of a sixty number Lottery Grid combinations is as follows:
a) 60_Lottery_Digit_1 is 8,307
b) 60_Lottery_Digits_2 is 601,812
c) 60_Lottery_Digits_3 is 6,860,700
d) 60_Lottery_Digits_4 is 20,548,080
e) 60_Lottery_Digits_5 is 18,125,856
f) 60_Lottery_Digits_6 is 3,919,104

Weight Patterns:

This pattern only measures the overall weight or summation of all the number in a grid and compares them against the average weight for six numbers in this case ((1+60)/2)*6 or 183 is the average value. The Lottery Grid (1, 2, 3, 4, 5, 6) has a weight of 21 that belongs to the lowest weight category, and the Lottery Grid (55, 56, 57, 58, 59, 60) has a weight of 345 that belongs to the highest weight category and (3, 14, 25, 42, 49, 50) has a weight of 183 that belongs to the average weight category.

Weight Distributions:

Of a sixty number Lottery Grid using a bell shape curve that takes into account the summation of the numbers belonging to a Lottery Grid as follows:
a) (21-99) is 934,307
b) (100-121) is 2,375,466 c) (122-143) is 5,181,699.
d) (144-222) is 33,080,976.
e) (223-244) is 5,181,699.
f) (245-266) is 2,375,466.
g) (267-345) is 934,307.

Cholti Basic Patterns

Now, let us integrate the concept of basic patterns into Cholti styled glyphs Search Patterns, in an environment consisting of numbers from 1 to 60. E.g. the environment consists of 13 visible geospatial keywords G0 to G12. G0 or USA is implicit and is within the environment domain comprising all the numbers from 1 to 60. G1 or 7 represents Florida or FL, G2 or 33 represents California or CA, and G3 or 48 represents Texas or TX.

Geospatial Keyword Values:

The remainder Geospatial Keywords Cities represents any information that is located within the Zip Code range area contained in a lookup table as an address or IP source. The location of a web page is assigned a weight as follows:
 a) Jacksonville or JAX, FL (21-99)
 b) Orlando or ORL, FL (100-121)
 c) Miami or MIA, FL (122-143)
 d) San Diego SAN, CA (144-160)
 e) Los Angeles LAX, CA (161-195)
 f) San Francisco or SFC, CA (196-222)
 g) Dallas or DAL, TX (223-244)
 h) Houston or HOU, TX (245-266)
 i) El Paso or ELP, TX (267-345)

Enumerating Geospatial Data:

The enumerated values of each geospatial keyword is as follows: JAX is (G4 or 3), ORL is (G5 or 11), MIA is (G6 or 18), SAN is (G7 or 25), LAX is (G8 or 32), SFC is (G9 or 39), DAL is (G10 or 42), HOU or (G11 or 50), and ELP is (G12 or 59).

Thus a request comprising of the keyword combination "USA+FL" would be represented as G0+G1 with the following facts: 1) A visible grid will have the number 7, since it must be bound to G0 or USA. 2) A visible must have a weight between (21 and 143), since it must also be visibly bound by FL or (G1 or 7), lowering the size of the environment from 60_Lottery_Basis or 50,063,860 web pages to 60_Lottery_Lucky__1 or 5,006,386 web pages. Using 'deductive reasoning' we know that only grids with a weight between 21 and 143 are visible shrinking the environment to 1,592,931 web pages.

Using the Hot algorithm, assuming the end user further improves the quality of the search in a session by adding Miami or (G6 or 18) to the next request as follows: "USA FL Miami" or G0+G1+G6 where G6 represents a plurality of valid Cities and their corresponding Zip Codes. G6 can also be North Miami Beach, Aventura, or Kendall.

In this case, the environment is filtered to a 60_Lottery_Lucky__2 or 424,270 for G0+G1+G6, where the 2 independent variables are (G1 or FL or 7) and (G6 or MIA or 18), and by applying the Weight pattern between 122 and 143 the size of the environment shrinks to 93,785.

Using Deductive Reasoning to Find Never Numbers:

Cholti can also imply that a certain geospatial searches can be exactly in one location, thus in our example, the web pages can be in FL, CA or TX. If FL is the location of the search, then JAX, ORL and MIA are relevant and SAN, LAX, SFC, DAL, HOU and ELP are irrelevant. Thus (33 or CA or G2, 48 or TX or G3, 25 or SAN or, 32 or LAX, 39 or SFC, 42 or DAL, 50 or HOU, and 59 or ELP) which can be simplified to the numbers (25, 32, 33, 39, 42, 48, 50, 59) are Never Numbers and the geospatial keywords (G2, G3, G7, G8, G9, G10, G11, G12) are not part of the search criteria.

The equation that creates the visible environment is "G0 G1 G6 AND NOT(G2|G3|G7|G8|G9|G10|G11|G12) is 60_Lottery_Lucky__2_Never__8 with an environment size of 230,030, and by applying the Weight pattern between 122 and 143 the size of the environment shrinks by half to 53,973.

The Hot and Cold algorithm has uses Odd-Even, Decimal, Digit and Weight patterns to distill and shrink the overall size of the environment. To this point all filters used 'Boolean algebra' techniques. In contrast, Cholti gives a quality value to each web pages of the environment, and also uses the aggregate weight of each visible Super Site based on the top (n) web pages quality values in order to generate an optimal environment or Block. Remember from the related art Search Engine Optimizer, a Super Site is expressed by its related top (n) web pages, where n=32.

Valorizing Steps

Each number belonging to a Lottery Grid will be assigned a value as follows: Never ever numbers=1, Never Numbers=10, Unlikely Numbers=20, Regular numbers=100, Likely numbers=200, Lucky Numbers=1000, and always Lucky Numbers=10000.

The valorizing steps are used to determine, which elements of the reduced environment have the highest value. E.g. the lottery strategy quantifies what variables maximize return. Cholti uses the same principals to find the optimal responses.

A session consists of a plurality of associated consecutive requests that satisfy the end user's intent to reach the final destination. Thus, a session is the continuous process of an end user to randomly surf the Internet by developing "an idea" through trial & error method to reach the final destination. Grouping a plurality of Super Glyph to generate the mathematical equation to perform the following optimizations:

1) Reorganize the end user's request.
2) Shrink the environment into a Block, Sub Block or Mini Block.
3) Use the Hot Algorithm determines the most pertinent patterns.
4) Use the Cold Algorithm determines which patterns inhibit.
5) Use association and transitivity determine the end user's idea.
6) Remove confounding patterns as Mulligan.
7) Assign Likely values to relevant patterns.
8) Assign Unlikely values to irrelevant patterns.
9) Use deductive reasoning to vector the likelihood of each visible web page.
10) "Cherry Pick" the optimal solution based on content. The Optimizer also performs single request sessions or direct search, where a single request is used to always reach successfully the final destination.

Confounding Elements of Accuracy:

Presented as an example, an end user want to find the complete roster of the team that won the 2006 FIFA World Championship, the answer is, the Italian National Team. FIFA owns the tournament and inside it's official site in theory the final destination should reside. After searching within the site, the best answer or final destination is http://www.fifa.com/worldcup/archive/germany2006/teams/team=43954.html.

What is accuracy? When talking about accuracy and what is not. To reach the final destination an end user may just type the keyword FIFA and then within the site perform a trial and error sub search until the final destination is reached. Using existing search engine capacity you get some good answers, including the official page www.FIFA.com at the top. While the response seems to be viable in actuality it is inaccurate, since the logical assumption that www.FIFA.com is the best site for this information is wrong. When the end user types a collection of keywords that yields the final destination then navigation is optimal. Nevertheless, direct requests only count when it does not require from the end user extensive interaction with a given site.

Direct Requests:

Is when an end user types a plurality of keywords that optimally yields the final destination on the first attempt. A Direct Request is certain, it possess all the necessary independent variables to reach information entropy, and thus always satisfies the end user. The Optimizer attempts to recreate the Direct Request approach by replicating and deciphering human thought patterns that trigger checkmate combinations. The Optimizer checkmate combinations are mathematical interpretations of the end user's keyword combinations, based on their dynamic interaction with a search engine.

Search Engine Flaws:

Presented as an example, a person wants to call someone, and already has the exact data, and chooses a Search Engine over direct communication means. Notwithstanding, the person enters a plurality of exact keywords that yields the final destination and this fact translates into awesome search capabilities would be a flaw. It would be more effective for the person to make a direct call. Absent of knowing first hand an exact idea that reaches directly with certitude the final destination the Optimizer must perform the TDR valorization steps and procedures.

Deductive Reasoning

Valorization Steps and Procedures

Using the following Session as a "Boolean algebra" Search example, where keywords are converted into Glyphs:
1) [G3+G10]±[E1]
2) [G3+G10]+[E2]
3) [G3+G10]+[E3]
4) [G2+G8]+[E4+E5]
5) [G1+G6]+[E4+E5]
6) [G1+G6]+[E4+E5]
7) [G1+G6]+[E6+E7]
8) [G1+G6]+[E4+E5] [E6+E7]
9) [G1+G6]+[E4+E5][E6+E7]+[E8]
10) [E9+E10]+[E8]+[G1+G6]*Optimal request of the session.

Keywords Typed
1) Dallas Tex. Inventor
2) Dallas Tex. Entrepreneur
3) Dallas Tex. Mathematician
4) Dallas Tex. Software Developer
5) Los Angeles Calif. Software Developer
6) Miami Fla. Software Developer
7) Miami Fla. Business Solutions
8) Miami Fla. Software Developer Business Solutions
9) Miami Fla. Software Developer Business Solutions Cholti
10) IBS Technologies Cholti Miami Fla.

Legend:

[E]=English, [G]=Geospatial, and [C]=Cluster. English Language Keywords: E1 or Inventor, E2 or Entrepreneur, E3 or Mathematician, E4 or Software, E5 or Developer, E6 or Business, E7 or Solution, E8 or Cholti, E9 or IBS and E10 or Technologies. From previous examples that used [G] geospatial data: G0 or USA, G1 or Florida, G2 or California, G3 or Texas, G4 or Jacksonville, G5 or Orlando, G6 or Miami, G7 or San Diego, G8 or Los Angeles, G9 or San Francisco, G10 or Dallas, G11 or Houston, and G12 or El Paso. With the following [C] clusters: C1 or Software Developer, C2 or Business Solutions, C3 or IBS Technologies, and Z1 or Cholti is a Zero cluster.

Using TDR Cholti can imply that keyword E9 is a mixed keyword, and E8 or Cholti, the name of the Mayan lingua franca is a Zero Cluster! Also, G0 or United States or USA is also implied in all the requests of the session.

IBS Technologies or E9+E10, is directly linked to Super Site www.ibstek.com, which permits the system to assign up to 2 likely keywords for each Lucky Keyword.

Basic Patterns

Understanding the Basic Patterns of the environment:
1) 60_Lottery__2_Lucky+8 Never+1 Likely keywords
2) 60_Lottery__2_Lucky+8 Never+1 Likely keywords
3) 60_Lottery__2_Lucky+8 Never+1 Likely keywords
4) 60_Lottery__3_Lucky+8 Never+1 Likely keywords
5) 60_Lottery__3_Lucky+8 Never+1 Likely keywords
6) 60_Lottery__3_Lucky+8 Never+1 Likely keywords
7) 60_Lottery__3_Lucky+8 Never+1 Likely keywords
8) 60_Lottery__4_Lucky+8 Never+2 Likely keywords
9) 60_Lottery__4_Lucky+8 Never+3 Likely keywords
10) 60_Lottery__5_Lucky+8 Never+1 Likely Keywords Adjusting the Size of the Environment The quantity of visible permutations is adjusted by request as follows:
0): 60_Lottery_Basis or 50,063,860
1-3): 60_Lottery__2_Lucky__8_Never or 53,973
4-7): 60_Lottery__3_Lucky__8_Never or 4,815
8-9): 60_Lottery__4_Lucky__8_Never or 188
10): Will yield an exact answer.

Partitioning the Internet:

Request [0], the Optimizer using deductive reasoning determines the end user has an idea that is located in the USA. The search will consist of six variables (a, b, c, d, e, f) with an environment that size of 50,063,860 web pages.

Cholti figures out two (2) Independent Variables: Requests [1-3]: the end user has an idea that is located in Dallas, Tex. or (4, 42), with a likely keyword in each case. 30=inventor, 32=Entrepreneur, 37=Mathematician. The two independent variables limit the environment to 53,973 web pages as follows:

Request [1]: (42, 48, c|30, d, e, f)
Request [2]: (42, 48, c|32, d, e, f)
Request [3]: (42, 48, c|37, d, e, f)

Cholti figures out three (3) Independent Variables: Requests [4-6], the end user has a better idea that is located in a geospatial location with an associated Lucky number pair such as Dallas Tex. with (42, 48), Los Angeles with (33, 39) and Miami, Fla. with (7, 11), and each cluster is associated with a Lucky Number in this case C1 or Software Developer: is associated with 25 and each related keyword is associated with a likely keyword in each case. 30=inventor, 32=Entrepreneur, 37=Mathematician. When the Optimizer figures out three independent variables limit the environment to 5,815 visible web pages as follows:

Request [4]: (25, 42, 48, d, e, f)
Request [5]: (25, 33, 39, d, e, f)
Request [6]: (7, 11, 25, d, e, f)
Request [7]: (7, 11, 13, d, e, f)

Cholti Figures Out 4 Independent Variables:

Request [7-9]: these requests can be solve by knowing that they are related to Miami, Fla. that is associated with the Lucky Number pair (7, 11), and each cluster is associated with a Lucky Number: C1 or Software Developer with 25, C2 or Business Solution with 13, C3 or IBS Technologies with 42. Zero Cluster Cholti can be associated with the Lucky pair (20, 22). When the Optimizer figures out 4 independent variables limit the environment to 188 visible web pages as follows:

Request [8]: (7, 11, 13, 25, e, f)
Request [9]: (7, 11, 13, 25, e|30, f|20|22)

Cholti Finds a Zero Cluster:

The Optimizer determines that the Z1 or Cholti is directly related with cluster IBS Technologies or 42 and Super Site www.ibstek.com or 33. In this example the three (3) Likely Numbers are 20, 22 and 33.

Cholti Figures Out Five (5) Independent Variables:

Request [10] can be solved from geospatial data G1 or 7, and G4 or 11 from (a, b, c, d, e, f) to (7, 11, c, d, e, f), and cluster IBS Technologies E9+E10 or C3 or 42. From Left Brain Zero Clusters the keywords with values (20 and 22) can be implied, changing the Glyph equation from (7, 11, c, d, e, f) to (7, 11, 20, 22, 42, f).

Cholti Figures Out the Final Independent Variable:

The final variable f can be solved since IBS Technologies, Miami Fla. and Cholti are all directly related to www.ibstek.com or 33. Once the final variable is known certitude is achieved. From: (7, 11, 20, 22, 42, f) to (7, 11, 20, 22, 33, 42). Once the Optimizer finds and places independent variables (a, b, c, d, e, f) the size of the environment is set to one (1) and Cholti has certitude or complete informational entropy.

Valorizing Blocks

Defining the Size of the Internet (U)

The Blocks generated by Cholti can be described as a managerial hierarchical structure, that consists of the Internet environment that is estimated to be (20*2^30) or 21,474,836,480 unique entries and can be expressed as 200_Lottery_Basis.

Keywords Determined by Mass:

The managerial hierarchical structure performs a partial simulated environment based on a valid independent variable keyword. Each keyword has a Mass. If the assigned Mass is less than 1 the keyword becomes a dependent variable or 'linguistic join'.

Superset (U):

U is the Internet environment that consists of a request with valid keywords that are dependent variables such as "AND", "FOR", "THE", and/or any combination of determinants. These 'linguistic joins' serve as constant filters that can be used to distill the size of the environment, and are assimilated if part of a cluster. All Join Pyramid elements have a Mass less than 1. When doing calculations Cholti performs vector math using magnitude that in turn becomes Mass. For simplicity, in this specification all vector based math will be based on simplified Mass equations.

Superset (I):

Consisting of a Search Pattern having (I) as an independent variable. These types of Search Patterns are able to elucidate, some basic characteristics of what is 'the idea' the end user has in mind, so that Cholti can quickly find the final destination. Superset (I) has a Mass of 1 to 3 and serves as the primary filter. From related art the Simple Pyramids or Superset (I) or Blocks are partial differential equations of the content.

Superset (I) English Language Priorities

1) Cluster:

The end user types a valid English or Mixed cluster consisting of 2 to 4 keywords that are identified as a filter. The cluster will be considered the filter that shrinks the size of the environment. E.g. E1+E2 or Stock Market has a Mass of 1.5.

2) Primary Keyword:

The end user types a valid English or Mixed Keyword that has a Mass. For Example E1 or Stock has a Mass of 1.4.

3) Anchor:

Consists of the highest English language keyword Mass belonging to the Superset (I). E.g. E1 or Bank from M1+E1 or Wachovia Bank has a Mass of one (1).

Superset (I) Geospatial Priorities:

1) Country Data:

When no valid Left Brain linguistic information is available, then geospatial information will be used to fill managerial hierarchy of sets. E.g.: Country data will fill the Superset (I!), State data will fill the Set (I, J!), and City or Zip Code will fill the Subset (I, J, K!). E.g.: G1 or USA has a Mass of one (1).

Chess Notation:

The exclamation points or (!) are based on chess moves, where a good move is denoted with (!) and an excellent move with (!!) and an optimal checkmate combination with (!!!). Requests that possess confounding keywords or patterns can also receive question mark or (?) that denotes blunder or (??) dire blunder.

Using Both Sides of the Brain (Left Brain) Linguistic and (Right Brain) Geospatial:

The Superset (I) has a valid Keyword, Anchor, and/or Cluster, and the "HIVE" uses the Country data to shrink the environment. When the Superset (I) has an anchor belonging to the Subset (I, J) the Country data becomes the primary filter. For example, from Wachovia Bank USA the anchors are G1 or USA and E1 or Bank with Mass of 1.5.

Set (I, J) Patterns:

Consisting of a Search Pattern having (I) and (J) as an independent variable. These types of Search Patterns find the best fit Sub Block are able to elucidate what is 'the idea' the end user has in mind, so Cholti can find the final destination. Set (I, J) has a Mass of 3.01 to 5.00 and serves as the secondary filter. From related art Hybrid Pyramids are the second partial differential equation of the environment with the same functions as Simple Pyramids. Note: independent variable (I) can be null.

When a request has a null Superset (I) and a valid Set (I, J) the best fit combination of keywords with the highest mass between 1.00 to 3.00 becomes the Superset (I), in the event a keyword of Mass greater than 3 is the only possible solution the keyword will be set to have a Mass limit of 3.00*.

Subset (I, J, K) Patterns:

Consisting of a search pattern having (I), (J), and (K) as an independent variable. These types of Search Patterns find the best fit Mini Block are able to elucidate what is 'the idea' the end user has in mind, so Cholti can find the final destination. Subset (I, J, K) has a Mass of 5.01 to 7.00 and serves as the tertiary filter. From related art the Complex Pyramids are the third partial differential equation of the content of the environment having the same characteristics as a Simple and Hybrid Pyramids. Independent variables (I) and (J) can be null.

When a request has a null content Superset (I) and Set (I, J), and a valid Subset (I, J, K) the best fit pattern with the highest mass between 1.00 to 3.00 becomes the Superset (I) and the best fit pattern with the highest mass between 3.01 to 5.00 becomes the Set (I, J).

Three Pyramid Limitations (Related Art)

In the related art the valid content of the first request to reach a mass between (1.0 to 3.0) becomes the Simple Pyramid or Superset (I) is the First Significant Event (or FSE). The valid content from the first request to reach a mass between 3.01 and 5.00 becomes the Hybrid Pyramid or Set (I, J) is considered the Second Significant Event (or SSE). The valid content from the first request that has a Mass greater than 5.00 becomes the Complex Pyramid or Subset (I, J, K) is considered the Third Significant Event (or TSE).

Nested Patterns:

Once Cholti found a nested Search Pattern with an optimal FSE+SSE+TSE it has a Left Brain checkmate combination that should create an optimal size environment. When the Right Brain has a Zero Cluster, such as Zip Codes, IP Address or ANI these keywords are attached to the TSE as additional filters. Thus Cholti would filter using the FSE to obtain the Simple Pyramid environment or Block, and the continue filtering by using the SSE to obtain the Hybrid Pyramid environment or Sub Block, and then use TSE to obtain the optimal Complex Pyramid environment or Mini Block and weigh in Zip Code, IP Addresses and ANI when considering Super Sites.

Improvements to the Three Pyramid Paradigm:

Based on the Lottery Grid of six numbers a request can have up to six independent variables, by using the [L] or Left Brain (I, J, K) and the [R] or Right Brain (X, Y, Z). Thus a request can have up to five Lucky Numbers, and for this reasoning Cholti will now have the Fourth or Quad Significant Event (or QSE), the Fifth or Pentane Significant Event (or PSE), and as stated before the Sixth or Hexane Significant Event (or HSE) that deals with direct requests, where the end user knows with certitude the final destination before typing the first keystroke and will always yield the optimal response.

Master Index

The English language estimated Master Index size of the environment expressed in web pages by Year is as follows:
  2008, Lottery__160_Basis=21,193,254,160
  2010, Lottery__165_Basis=25,564,880,880
  2012, Lottery__170_Basis=30,663,442,810
  2014, Lottery__175_Basis=36,582,584,325
  2016, Lottery__180_Basis=43,424,719,800
  2018, Lottery__185_Basis=51,301,564,860
  2020, Lottery__190_Basis=60,334,683,255
  2022, Lottery__195_Basis=70,656,049,360
  2024, Lottery__200_Basis=82,408,626,300

First Significant Event or (FSE):

Is the first request that creates a valid Superset (I) environment or Block. The environment (a, b, c, d, e, f) becomes (FSE, b, c, d, e, f) in the first valid Superset (I). Based on Mass the FSE size of the environment is as follows:
  Mass=1 (Lottery__100_Lucky__1 or 71,523,144)
  Mass=2 (Lottery__70_Lucky__1 or 11,238,513)
  Mass=3 (Lottery__50_Lucky__1 or 1906884)

Second Significant Event or (SSE) is the first request that creates a valid Set (I, J) environment or Sub Block. The environment (a, b, c, d, e, 0 becomes (FSE, SSE, c, d, e, f) in the first valid Set (I, J). Based on Mass the SSE size of the environment is as follows:
  Mass=1 (Lottery__100_Lucky__2 or 3612280)
  Mass=2 (Lottery__70_Lucky__2 or 814385)
  Mass=3 (Lottery__50_Lucky__2 or 194580)
  Mass=4 (Lottery__40_Lucky__2 or 73815)
  Mass=5 (Lottery__30_Lucky__2 or 20475)

Third Significant Event or (TSE) is the first request that creates a valid Subset (I, J, K) environment or Mini Block. The environment (a, b, c, d, e, f) becomes (FSE, SSE, TSE, d, e, f) in the first valid Subset (I, J, K). Based on Mass the TSE size of the environment is as follows:
  Mass=1 (Lottery__100_Lucky__3=147440)
  Mass=2 (Lottery__70_Lucky__3=47905)
  Mass=3 (Lottery__50_Lucky__3=16215)
  Mass=4 (Lottery__40_Lucky__3=7770)
  Mass=5 (Lottery__30_Lucky__3=2925)
  Mass=6 (Lottery__20_Lucky__3=680)
  Mass=7 (Lottery__15_Lucky__3=220)

The FSE, SSE and TSE clusters are nested together to become the primary, secondary and tertiary filters partition of the environment. When each FSE, SSE and/or TSE consists of a plurality of valid combinations, then each valid sub cluster belongs to each significant level of difference will be weighted and serve as filter when matching and comparing each web page until the limits in size are reached.

Quad (Fourth) Significant Event or (QSE) consists of the first known [R] or Right Brain Zero cluster that belongs to a valid City and/or Zip Code look up table, once the Left Brain Analysis has a checkmate combination or a complete Subset (I, J, K). The environment (a, b, c, d, e, f) becomes (FSE, SSE, TSE, QSE, e, f) is the first valid [L+R] checkmate request (Subset (I, J, K)!) having a QSE Mass as follows:
  Mass=5 (Lottery__30_Lucky__4=325)
  Mass=6 (Lottery__20_Lucky__4=120)
  Mass=7 (Lottery__15_Lucky__4=55)

Pentane (Fifth) Significant Event or (PSE):

Consist of the second known [R] or Right Brain Zero cluster that belongs to a valid ANI that is directly related to a Super Site that allows the use of TDR during a session consisting of a plurality of requests until Cholti is able to have both Left Brain and Right Brain [L+R] checkmate combinations. The environment (a, b, c, d, e, f) becomes (FSE, SSE, TSE, QSE, PSE, f) is the first valid [L+R] checkmate request (Subset (I, J, K)!!) having a PSE Mass. At this point we use limits: Mass=5 the value is 128, Mass=6 the value is 32, and Mass=7 the value is eight (8).

Hexane (Sixth) Significant Event or (HSE):

Or Direct Requests are the exception to the rule. The end user already has in his mind the exact keyword combination that is preferably expressed as Zero clusters such as ANI+(IP Address or Zip Code) that are directly associated to at least 2 clusters that yields the final destination. The environment (a, b, c, d, e, f) becomes (I, J, K, X, Y, Z) the first request [L+R] checkmate request with PSE Mass or 10_Lucky__6 or 1.

Direct Request Independent Variables:

(I)=is the (FSE) or valid Superset (I), (J)=is the (SSE) or valid Set (I, J), (K)=is the (TSE) or valid Subset (I, J, K), (X)=Country & State geospatial data, (Y)=City & zip code data, and (Z)=IP Address & ANI range data. The environment (a, b, c, d, e, f) becomes (FSE, SSE, TSE, QSE, PSE, HSE) the first valid [L+R] checkmate (Subset (I, J, K)!!!) with HSE Mass (Mass=7) with exactly one visible web page.

Likely Numbers Valorization

Gamma Modifier

Likely Numbers are further used to elucidate the best-fit blocks Likely Numbers modify the value of the independent variables or Lucky Numbers. Relevant keywords are assigned as independent variables or Lucky Numbers. Keywords that are directly associated to the independent variables are considered Likely Numbers, and further adjust the size of the environment. The gamma modifier is based on the quantity of Likely Numbers and the approach used by the end user to reach the final destination. Cold sessions use the direct method, whereas hot sessions use the trial and error method. The gamma modifier only affects the topside of the calculation, since the calculations are based on whole numbers of independent variables or levels of significant difference from (0 (chaos and anarchy) to 6 (informational certitude)).

Cold Sessions Likely Values

Cold Session consists of one or two consecutive related requests where the end user types keyword combinations to reach the final destination directly. The quantity of Likely Numbers determines the Gamma modifier as follows: (1)+0.1, (2)+0.2, (3)+0.3, (4)+0.4, (5)+0.5, (6)+0.6, (7-8)+0.7, (9-10)+0.8 and (11-12)+0.9.

As an Example for Cold Session:

When solving for an environment size of 80 with three Lucky Numbers the formula is $(80-3)!-((80-3)-(6-3))!/(6-3)!$ or $(77!-74!)/3!$ or 82,160 web pages. Now, when introducing Likely Numbers to solve for a Cold Session consisting of two requests with a 3 independent variables and a total of 7 Likely Numbers the gamma modifier is +0.7. Filtering the size of the environment to: $(80-3.7)!-((80-3.7)-(6-3))!/(6-3)!$ or $76.3!-73.3!/3!$ or 71,147. The value of 3.7 is obtained by adding the total number of independent variables or 3 plus the Gamma modifier or 0.7.

Hot Sessions Likely Values

Hot sessions consist of at least 2 or more consecutive related requests where the end user types keyword combinations to reach the final destination through trial and error. The quantity of Likely Numbers determines the Gamma modifier as follows: (1-2)+0.1, (3-4)+0.2, (5-6)+0.3, (7-8)+0.4, (9-10)+0.5, (11-13)+0.6, (13-16)+0.7, (17-20)+0.8 and (21-24)+0.9.

As an Example for Hot Session:

When solving for an environment size of 100 with 2 Lucky Numbers the formula is $(100-2)!-((100-2)-(6-2))!/(6-2)!$ or $(98!-94!)/4!$ or 3,612,280 web pages. Now, when introducing Likely Numbers to solve for a Hot Session consisting of several requests with 3 independent variables and 10 Likely Numbers the gamma modifier is +0.5. Filtering the size of the environment to: $(100-2.5)!-((100-2.5)-(6-2))!/(6-2)!$ or $97.5!-93.5!/4!$ or 3,537,984. The 3.5 is obtained by adding the total number of independent variables or 3 plus the gamma modifier or 0.5.

Estimating a Request Mass

Unrelated Estimated Value:

Consist of first identifying the primary anchor for a request, and using the mass of the anchor keyword as its basis. Then exhaustively add 5% of the mass of each remaining cluster or keywords to get the final value.

Related Estimated Value:

Consist of first identifying the primary anchor for a request, and using the mass of the anchor keyword as its basis. Then add exhaustively 10% of the mass of each related cluster or keywords to get the final value.

When Using the Following Keywords:

G1=Zip Code via a look up table value for Area Code=33160 with Mass 5.0, E1+E2 or Brazilian Steakhouse with Mass=1.2 and E3+E4 or Fogo Vivo with Mass=5.4. Estimating the Mass as follows:

As an Example for an Unrelated Estimated Value:

The anchor used as the basis for this request is G1 with Mass=5.0 and add 5% of cluster E1+E2 with Mass=1.2. The Mass is equal to 5.06 or 5+(1.2*0.05).

As an Example for a Related Estimated Value:

The anchor used as the basis for this request is E3+E4 with Mass=5.4 and add 10% of keyword G1 with mass 5.0 and cluster E1+E2 with mass 1.2. The mass is equal to 6.02 or (5.4+(5*0.1)+(1.2*0.1)).

Estimated Values Use Limits:

The Related and Unrelated estimated value couldn't exceed the Mass limit of the 'deciphered' level of significant difference of a request or session.

Unlikely Numbers Valorization

Unlikely Numbers are used to find the best-fit blocks. Unlikely Numbers modify the value of the independent variables or Lucky Numbers. Relevant keywords are assigned as independent variables or Lucky Numbers. Keywords that are not related to the independent variables are considered Unlikely Numbers, and further adjust the size of the environment. The gamma modifier is based on the quantity of Unlikely Numbers and the approach used by the end user to reach the final destination. Cold sessions use the direct method, whereas hot sessions use the trial and error method. The gamma modifier only affects the topside of the calculation, since the calculations are based on integer numbers of independent variables or levels of significant difference from (0 (chaos and anarchy) to 6 (informational certitude)).

Cold Sessions Unlikely Values

Cold Sessions consists of one (1) or two (2) consecutive related requests to reach the final destination directly. The quantity of Unlikely Numbers determines the gamma modifier as follows: (1)+0.01, (2)+0.02, (3)+0.03, (4)+0.04, (5)+0.05, (6)+0.06, (7-8)+0.07, (9-10)+0.08 and (11-12)+0.09.

Hot Sessions Unlikely Values

Hot session consists of at least 2 or more consecutive related requests to reach the final destination through trial and error. The quantity of Unlikely Numbers determines the gamma modifier as follows: (1-2)+0.1, (3-4)+0.2, (5-6)+0.3, (7-8)+0.4, (9-10)+0.5, (11-13)+0.6, (13-16)+0.7, (17-20)+0.8 and (21-24)+0.9.

Add Mulligan keywords and Zero Clusters expansions to determine Unlikely Numbers. As an example, the end user types the following: E5 or E1 Matador and E6 or The Knife, which are Argentinean restaurants as mulligan. End user types:

[1] (E1+E2)+(G1)

[2] (G1)+(E5)+(E6)

[3] (E1+E2)+(E3+E4)+(G1)

Analysis of the requests is as follows:

[1] (E1+E2)+(G1) Mass 5.06 as unrelated.

[2] (G1)+(E5)+(E6) Mulligan as unrelated.

[3] (E1+E2)+(E3+E4)+(G1). Mass 6.02 as related.

For example, a Hot Session with an environment size of 80 and 3 Lucky Numbers use the formula $(87!-84!)/3!$ or 105,955. Now, when solving for a Hot Session consisting of 3 requests with 7 Likely Numbers the gamma modifier is +0.7, and for 2 Unlikely Numbers the modifier is +0.01, which is set to: $(90-3.71)!-(90-3.71-(6-3))!/(6-3)!$ or $86.21!-83.21!/3!$ or 103,100 web pages.

Never Numbers Valorization

Never Numbers valorization consists of finding irrelevant keywords and clusters that help distill the environment. Using the 3 steps of TDR keywords are identified as independent variables, related variables, unrelated variables and irrelevant variables.

Let's suppose we have G1 or Zip Code 33160, using this information the "HIVE" is able to insert missing gaps of information using TDR such as G2 for USA, G3 for Florida, and G4 for Aventura; (E1+E2)+(E3+E4)+(G1) becomes (E1+E2)+(E3+E4)+(G2+G3) (G1)|(G4). Never Numbers become constants and thus are irrelevant.

Determining the highest valued geospatial keyword (Country (W), State (X), City (Y), Zip Code (Z), IP Address (IP) and telephone number (ANI)) as the basis and identifying ANI as the highest valued. The "HIVE" determines from (W, X, Y, Z, IP, ANI), which variables are visible and determines the quantity of Never Numbers as follows:

State: (W, X, 0, 0, 0, 0)+2

City: (W, 0, Y, 0, 0, 0)+1, (0, X, Y, 0, 0, 0)+2, (W, X, Y, 0, 0, 0)+3

Zip Code: (W, 0, 0, Z, 0, 0)+1, (0, X, 0, Z, 0, 0)+1 (0, 0, Y, Z, 0, 0)+2, (W, X, 0, Z, 0, 0)+2, (W, 0, Y, Z, 0, 0)+3, (0, X, Y, Z, 0, 0)+4, (W, X, Y, Z, 0, 0)+5

IP and ANI: (W)+1, (X)+1, (Y)+2, (Z)+2, (IP)+2, and (ANI)+4

For example, the end user typed G1 or (0, 0, 0, Z, 0, 0) and Cholti found the missing gaps of information and converted the geospatial data into (W, X, Y, Z, 0, 0), and has +2 independent variables (W, X) becomes the Superset (I), and Y becomes the Set (I, J) and has +5 Dependent Variables.

For a Cold Session with an environment size of 80 with three (3) Lucky Numbers and five (5) Never Numbers the formula is: ((75!−72!)/3!). When there are seven (7) Likely Numbers the modifier is +0.7 and there are 2 Unlikely Numbers the modifier is +0.02. The size of the environment is: 75−3.72!−(75−3.72−(6−3))!/(6−3!) or (71.28!−68.28!/3!) or 57,844.

Categories All significant difference level variables or Lucky Numbers are associated to a particular category. For example, Robert Lee is a person, and American Civil War belongs to history. Categories are used to filter out redundancy, as the optimal environment is being derived. The search process is no longer a "Boolean algebra" highest valued eigenvector match comparison, and becomes a data mining search, where the highest valued Block owns the Super Sites with the best fit inventory or 'Related Objects'.

Z_Price Bitmaps:

From related art technology the Z_Price Bitmap links to each Warehouse the optimal inventory based on price and availability, and then quantifies and qualifies time using X_FOB and Y_CDIF metrics to deliver goods door to door. Search Engine respond in less than one second 99% of the time. Consequently, time is not based on response time, instead it measures the time spent by the end user to reach the final destination and is also related to satisfaction. A ZSD request is ocean transportation. A FSD request is land transportation. A SSD request is cargo. A TSD request is Green Label air. A QSD request is Red Label air. A PSD request is Black Label air. A HSD request as Gold Label air, where price is not a variable, but time for delivery is.

Events:

Cholti improves the Super Glyphs equation by using the Left Brain linguistic categories via rules of Association and Relevance. Cholti improves accuracy by using the Right Brain via rules of Likeness by adding Super Glyph keywords yielding more independent variables. An event is a Left Brain Category that integrates Right Brain Category. For example, Robert Lee belonging to the person category becomes Military Leader {General Robert E. Lee}.

For example, Super Glyph "General" is what makes it an Event. General is a military rank that is expressed with quantity of stars and thus geospatial. General Lee was the military leader of the Confederate Army of Northern Virginia Army and is associated to the historical events belonging to the American Civil War (1862-1865).

Integrated Events:

Once a Category integrates geospatial information it becomes an Event. Then Cholti attempts to determine the relationship between (I!), (J!) and (K!). Once the relationship is known the Optimizer determines the highest level of significant difference. When 3 Events are related a [L+R] checkmate combination exists having an exact HSD (or Subset (I, J, K)!!!), otherwise when 2 Events are related a strong QSD or (Subset (I, J, K)!!), exists with a Mini Block expressed in hundreds of web pages.

When (I!), (J!) and (K!) are unrelated, Cholti probabilistically finds the most relevant related objects using TDR rules of Association, Relevance and Likelihood.

Objects as Inventory:

Peoples names, telephone numbers, particular copyrighted titles and links to downloadable audio media devices such music, and copyrighted pictures that belong to Super Sites are examples of Objects. When the system determines, the optimal Blocks for a query, it also associates the top objects. Analysis of the top Super Sites and its visible Super Pages will elucidate objects. The 'HIVE' uses quality values to filter top visible related objects and determines optimal inventory as follows:

Objects Rules:

Each Keyword, Cluster and/or Super Glyph has a Single Z_Price Bitmap containing the highest valued web pages.

Once keywords and clusters are converted into Super Glyph, the "HIVE" determines if Super Glyphs are associated. 2 related Super Glyphs have a Double Z_Price Bitmap containing the highest valued web pages. 3 related Super Glyphs have a Triple Z_Price Bitmap containing the highest valued web pages.

Once Super Glyphs become Independent Variables the "HIVE" identifies the most relevant category. Each Super Glyph belonging to a particular logically derived category has its own Single, Double or Triple Z_Price Bitmap. E.g. the song My Way is under the music category that may belong to Frank Sinatra, Elvis Presley, and other artists.

Using TDR the "HIVE" tries to integrate linguistic and geospatial categories as common denominator Events. Each Event combination has its own Single, Double or Triple Z_Price Bitmaps. For example, Billy Joel is considered an artist, having a plurality of copyrighted titles associated to his name.

Once the "HIVE" identifies an Event it determines it exists in its inventory. E.g. an exact event has a triple Z_Price Bitmaps. For example, a Michael Jackson Thriller HD (High Definition) 8 Year" is an exact event, since the author's name, copyrighted title and year are known and the 'HIVE' can find the missing gaps of information.

When determining objects as Super Glyphs the "HIVE" gathers the top related objects belonging to each visible Block of a search. Those object themselves have the default value of the partial, pertinent and relevant Super Glyph equation that constitutes the Z_Price Bitmap.

Z_Price Bitmaps Collection:

Represents the top (n) results of a given Search Pattern based on the best fit partition of the Internet (U). Each Z_Price Bitmap collection stores the top (n) results from the highest weighted visible Super Sites.

Single Z_Price Index:

Represents the top (n) results for a Search Pattern having one (1) Super Glyph independent variable.

Double Z_Price Indices:

Represents the top (n) results for a Search Pattern having two (2) Super Glyphs independent variables.

Triple Z_Price Bitmap Indices:

Represents the top (n) results for a Search Pattern having three (3) Super Glyphs independent variables.

Category Based Z_Price Bitmap Indices:

Represents the top (n) results for a Search Pattern consisting of at least one known category. Related keywords (Likely Numbers) to a particular independent variable and its relevant category can be used to further weight the value of the top (n) results.

Event Based Z_Price Bitmap Indices represents the top (n) results for a Search Pattern consisting of at least one known Event. Related keywords (Likely Numbers) and unrelated keywords (Unlikely Numbers) to a particular independent variable and its relevant event can be used to further weight the value of web pages.

Integrated Event Based Z_Price Indices are directly associated to a plurality of related categories and events.

Super Site as Warehouses:

After careful inspection and analysis of each valid partition or optimal environment the collection of single, double and/ or triple indices Z_Price Bitmap are known, and the "HIVE" stores visible objects directly related to a Super Site. Super Sites store information based on the six categories of Z_Price Bitmaps based on Keyword, Clusters, Super Glyph, Categories, Events and Integrated Events.

The "HIVE" continuously updates each valid domain: the content of the Internet and value of each Super Pages is updated as changes in the environment are detected. Significant changes in the environment trigger the "HIVE" to recalculate the relative Page Rank of each relevant web page within a particular domain. Each newly identifiable object detected in each particular domain is assigned and stored to its corresponding Z_Price Bitmap.

Each object will have its own bitmap with zeros and ones e.g. "100001" that will tell the spiders if it possesses a particular match, and then for each match the unique identification number of the relevant Z_Price Bitmap.

Spiders Update Each Z_Price Bitmap:

The spiders determine if the Z_Price Bitmap requires change when the value is greater that the lowest visible value Page Rank contained within the collection. The 'HIVE' continuously updates and stores top Super Site and Super Pages belonging to optimal environment uses quality values to filter out web pages. The size of each Z_Price Bitmap collection is minimally 1,024 web pages or W_Ranks (weighted ranks) when the domain names are relatively small.

Super Glyph Business Rules

Steps for a Single Request (ZSD) Zero Significant Difference:

The Internet environment is massive content has 200_Lottery_Basis or 82,408,626,300 valid elements or pages. The end user's idea begins as a total unknown and the entire content is available as a plausible final destination. ZSD have no independent variable that serves as the primary Managerial Hierarchical Relationship Index. ZSD requests have a Mass less than 1. The ZSD examples use the following keywords: G1 or USA or United States and E1 or War.

Presenting a First Example:

ZSD environments are always greater than 1,073,741,824 web pages and have no independent variables.

Presenting a Second Example:

Geodata keywords only. The end user's types only G1 or USA and there is no independent variable. G1 is a Likely number. G1 has a Mass of 1.1. The environment is: 110_Likely_1 or ((109.9!−103.9!)/6!) or 2,129,921,875 web pages.

Presenting a Third Example:

English language keyword and Geodata keyword. The end user's types E1 and G1. Both keywords are Likely numbers. E1+G1 "War USA" has a Mass of 1.2. The environment is: 100_Likely_2 or ((99.8!−93.8!)/6!) or 1,177,451,556 web pages.

(FSD) First Significant Difference:

The end user's idea begins as an unknown and the primary partition of the Internet is a Block. FSD, have one independent variable (I) that serves as the primary Managerial Hierarchical Relationship Index. FSD are also known as Superset (I) with a mass that ranges from 1.00 to 3.00. The FSD rules examples use the following keywords and clusters: G1 or USA or United States, E1 or War, E2 or Civil, E3 or Battlefield, E4 or Union, E5 or Confederate, and C1 or (E1+E2) or Civil War.

Presenting a First Example:

Geodata keywords only. The request is G1 or United States. (I)=G1 or United States is a Lucky number. G1 has a Mass of 1.1. The environment is: 110_Lucky_1 or ((109!−104.!)/5!) or 11,828,271 web pages.

Presenting a Second Example:

Single English language keyword. The request is E3 or Battlefield. (I)=E3 or Battlefield; is a Lucky number. E3 has a Mass of 2.5. The environment is: 65_Lucky_1 or ((64!−59!)/5!) or 7,624,512 web pages.

Presenting a Third Example:

Single English language cluster. The request is (E1+E2) or Civil War. (I)=(E1+E2) or C1 or Civil War is a Lucky Number. C1 has a Mass of 2.0. The environment is: 70_Lucky_1_Likely_1 or ((68.9!−63.9!)/5!) or 11,154,856 web pages.

Presenting a Fourth Example:

English language keyword with related keywords. The request is (E3+E4+E5) or "Battlefield Union Confederate". (I)=E3 or Battlefield is a Lucky Number. E3 is the highest valued keyword with a Mass of 2.5 and when combined with keywords E4 and E5 the resultant Mass=3. The environment is: 60_Lucky_1_Likely_2 or ((58.8!−53.8!)/5!) or 4,919,115 web pages.

Presenting a Fifth Example:

English language cluster with related keywords. The request is (E1+E2)+E4+E5 or "Civil War Union Confederate". (I)=(E1+E2) or C1 or Civil War is a Lucky Number. E4+E5 (Union Confederate) are Likely Numbers. C1 has a Mass of 2.0 and when combined with keywords E4 and E5 the resultant Mass=2.8. The environment is: 62_Lucky_1_Likely_3 or ((60.7!−55.7!)/5!) or 5,799,342 web pages.

Presenting a Sixth Example:

English keyword with related keywords. The request is G1+E3+E4+E5 or "USA Battlefield Union Confederate." (I)=E3 or Battlefield is a Lucky Number. G1, E4 and E5 are Likely Numbers. E3 has a Mass of 2.6 and when combined with keywords G1, E4 and E5 the resultant Mass=3.0. The environment is: 60_Lucky_1_Likely_3 or ((58.7!−53.7!)/5!) or 4,875,939 web pages.

Presenting a Seventh Example:

English language cluster with additional related keywords. The request is G1+(E1+E2)+E4+E5 or "USA Civil War Union Confederate". (I)=(E1+E2) or C1 or Civil War is a Lucky Number. G1, E4 and E5 (USA, Union, Confederate) are Likely Numbers. C1 has a Mass of 2.0 and when combined with keywords E4, E5 and G1 the resultant Mass=2.9. The environment is: 61_Lucky_1_Likely_3 or ((59.7!−54.7!)/5!) or 5,321,637 web pages.

(SSD) Second Significant Difference:

The end user's idea no longer begins as an unknown and the secondary partition of the Internet is a Sub Block. The resulting Mass will range from 3.0 to 5.0. The SSD rules examples use the following keywords and clusters: G1 or USA, G2 or PA, G3 or Gettysburg, E1 or War, E2 or Civil, E3 or Battlefield, E4 or Union, E5 or Confederate, E6 or American, E7 or Historical, E8 or Maps, C1 or (E6+E1+E2) or American Civil War and C2 or (E7+E8) or Historical Map.

Presenting a First Example:

Multiple Geodata keywords only. The request is G1+G2+G3 or "USA PA Gettysburg". (I)=G2 or PA, (J)=G3 or Gettysburg are Lucky Numbers. G1 or USA is a Likely Numbers. The request has a Mass of 4.3. The environment is: 47_Lucky_2_Likely_1 or ((44.9!−40.9!)/4!) or 147,629 web pages.

Presenting a Second Example:

English language keyword and Geodata keywords. The request is E1+(G1+G2+G3) or "War USA PA Gettysburg". (I)=E1 or War, and (J)=G3 or Gettysburg are Lucky Numbers. G1 or USA and G2 or PA is Likely Numbers. The request has a Mass of 4.4. The environment is: 46_Lucky_2_Likely_2 or ((43.8!−39.8!)/4!) or 133,211 web pages.

Presenting a Third Example:

English language and Geodata keywords. The request is E1+E7+E3 and (G1+G2+G3) or "War Historical Battlefield USA PA Gettysburg". (I)=E3 or Battlefield, (J)=E7 or Historical are Lucky Numbers. E1, G1, G2, and G3 are Likely Numbers. The request has a Mass of 4.6. The environment is: 44_Lucky_2_Likely_4 or ((41.6!–37.6!)/4!) or 107,569 web pages.

Presenting a Fourth Example:

English language cluster and keyword. The request is (E6+E1+E2)+E3 or "American Civil War Battlefield". (I)=C1 is a Lucky number and E6 or American is the anchor. E1, E2 and E3 are Likely numbers. The request has a Mass of 4. The environment is: 50_Lucky_2_Likely_2 or ((47.8!–43.8!)/4!) or 191,252 web pages.

Presenting a Fifth Example:

English language cluster and keywords. The request is (E6+E1+E2)+E3+E7 or "American Civil War Battlefield Historical". (I)=C1 or American Civil War or (E6+E1+E2), (J)=E3 or Battlefield are Lucky Numbers. E6 American is the anchor for C1. E1, E2 and E7 are Likely Numbers. The request has a Mass of 4.1. The environment is: 49_Lucky_2_Likely_3 or ((46.7!–42.7!)/4!) or 173,704 pages.

Presenting a Sixth Example:

English language cluster and keyword and Geodata keywords. The request is (E6+E1+E2)+E3+(G1+G2) or "American Civil War Battlefield USA PA". (I)=C1 or "American Civil War", (J)=E3 or Battlefield are Lucky Numbers. E6 American is the anchor. E1, E2, G1 and G2 are Likely Numbers. The request has a Mass of 4.2. The environment is: 48_Lucky_2_Likely_4 or ((45.6!–41.6!)/4!) or 157,393 pages.

Presenting a Seventh Example:

English language clusters. The request is (E6+E1+E2)+(E7+E8) or "American Civil War Historical Maps". (I)=C1 or American Civil War, (J)=C2 or Historical Maps are Lucky Numbers. E6 or American is the anchor for C1, E7 or Historical is the anchor for C2. E1, E2 and E8 are Likely Numbers. The request has a Mass of 4.0. The environment is: 50_Lucky_2_Likely_3 or ((47.7!–43.7!)/4!) or 180,604 web pages.

Presenting an Eighth Example:

English language clusters and keywords. The request is (E6+E1+E2)+(E7+E8)+E3 or "American Civil War" "Historical Maps" Battlefield (I)=C1 or "American Civil War" or (E6+E1+E2), (J)=C2 or (E7+E8) or "Historical Maps"; are Lucky Numbers. E6 or "American" is the anchor for C1, E7 or "Historical" is the anchor for C2. E1, E2, E3 and E8 are Likely Numbers. The request has a Mass of 4.5. The environment is: 45_Lucky_2_Likely_4 ((42.6!–38.6!)/4!) or 118,716 pages.

Presenting a Ninth Example:

English language clusters and Geodata Keywords. The request is (E6+E1+E2)+(E7+E8)+(G1+G2+G3) or "American Civil War Historical Maps USA PA Gettysburg". (I)=C1 or American Civil War, (J)=C2 or Historical Maps are Lucky Numbers. E6 or American is the anchor for the C1, E7 or Historical is the anchor for C2. E1, E2, E8, G1 and G2 are Likely Numbers. The request has a Mass of 4.5. The environment is: 45_Lucky_2_Likely_5 or ((42.5!–38.5!)/4!) or 117,564 pages.

(TSD) Third Significant Difference:

The end user's idea no longer begins as an unknown and the tertiary partition of the Internet is a Mini Block. The resulting Mass will range from 5.0 to 6.5. The SSD rules examples use the following keywords and clusters: G1 or USA, G2 or VA or Virginia, G3 or Manassas, E1 or War, E2 or Civil, E3 or Battlefield, E4 or Union, E5 or Confederate, E6 or American, E7 or Historical, E8 or Maps), C1 or (E6+E1+E2) "American Civil War", C2 or (E7+E8) or "Historical Map", C3 or (M1+E9+E10) or "General Robert Lee".

Presenting a First Example:

Geodata keywords only. The request is (G1+G2+G3) or "USA VA Manassas". (I)=G1 or USA, (J)=G2 or VA or Virginia, (K)=G3 or Manassas; are Lucky Numbers. The request has a Mass of 5.0. The environment is 40_Lucky_3 ((37!–34!)/3!) or 7,770 web pages.

Presenting a Second Example:

English language keyword and Geodata keywords. The request is E1+(G1+G2+G3) or War "USA VA Manassas". (I)=E1 or War, (J)=G2 or VA or Virginia, (K)=G3 or "Manassas"; are Lucky Numbers. G1 is a Likely number. The request has a Mass of 5.1. The environment is: 39_Lucky_3_Likely_1 or ((35.9!–32.9!)/3!) or 7,079 web pages.

Presenting a Third Example:

English language keywords and Geodata keywords. The request is M1+E7+E1+(G1+G2+G3) or General Historical War "USA VA Manassas". (I)=E7 or Historical, (J)=M1 or General, (K)=E1 or War are Lucky Numbers. (G1+G2+G3) are Likely Numbers. The request has a Mass of 5.3. The environment is: 37_Lucky_3_Likely_3 or ((33.7!–30.7!)/3!) or 5,822 web pages.

Presenting a Fourth Example:

English language keywords and Geodata keywords. The request is E10+E7+E1+(G1+G2+G3) or Lee Historical War "USA VA Manassas". (I)=E10 or Lee, (J)=E7 or Historical, (K)=E1 or War; are Lucky Numbers. The request has a Mass of 5.3. The environment is: 37_Lucky_3_Likely_3 or ((33.7!–30.7!)/3!) or 5,822 web pages.

Presenting a Fifth Example:

English language cluster and keywords and Geodata keywords. The request is (E6+E1+E2)+E10+E7+(G1+G2+G3) or "American Civil War Lee Historical "USA VA Manassas". (I)=C1 or (E6+E1+E2) or "American Civil War", (J)=E10 or Lee, (K)=E7 or Historical; are Lucky Numbers. E1, E2, E10, G1 and G2 are Likely Numbers. The request has a Mass of 5.4. The environment is: 36_Lucky_3_Likely_5 or ((32.5!–29.5!)/3!) or 5,204 web pages.

Presenting a Sixth Example:

English language clusters and Geodata keywords. The request is (E6+E1+E2)+(E7+E8)+(M1+E9+E10)+(G1+G2+G3) or "American Civil War" "Historical Maps" "General Robert Lee" "USA VA Manassas", (I)=C1 or (E6+E1+E2) or "American Civil War", (J)=C3 or (M1+E9+E10) or "General Robert Lee", (K)=C2 or (E7+E8) or "Historical Maps"; are Lucky Numbers. E1, E2, E8, E9, E10, G1, G2 and G3 are Likely Numbers. The request has a Mass of 6.0, which is the TSD upper limit. As per Cold Session Rules: eight Likely numbers have a gamma value of +0.7. The environment is: 30_Lucky_3_Likely_8 or ((26.3!–23.3!)/3!) or 2,695 web pages.

Presenting a Seventh Example:

English language cluster and keywords. The request is (M1+E9+E10)+E3+E5 or "General Robert Lee" Battlefield Confederate. (I)=E3 or Battlefield, (J)=C1 or (M1+E9+E10) or "General Robert Lee", (K)=E5 or Confederate; are Lucky Numbers. The request has a Mass of 5.0. The environment is: 40_Lucky_3_Likely_2 or ((36.8!–33.8!)/3!) or 7,641 web pages.

Unrelated Independent Variables:

More than one independent variable is required to consider if each (I), (J) and (K) are related and thus FSD are always related. The main difference for SSD or higher is how Cholti determines the Mass.

Presenting a First Example:

Unrelated SSD English language clusters. The request is C1+C2 that are unrelated. (I)=C1, (J)=C2; are Lucky Numbers and there are 3 Likely Numbers. C1 Mass=3 and C2 Mass=2 and a resultant Mass of 3.1 instead of 3.2. The environment is: 59_Lucky_2_Likely_3 or ((56.7!–52.7!)/4!) or 386,534 web pages.

Presenting a Second Example:

Unrelated TSD English language clusters. The end user's types C1+C2+C3 that is unrelated. (I)=C1, (J)=C2, (K)=C3; are Lucky Numbers and there are 5 Likely Numbers. C1 Mass=3, C2 Mass=2 and C3 Mass=5 and a resultant Mass of 5.2 instead of 5.5. The environment is: 38_Lucky_3_Likely_5 or ((34.5!–31.5!)/3!) or 6,260 web pages.

(QSD) Quad Significant Difference:

The end user's idea no longer begins as an unknown and the tertiary partition of the Internet is a Mini Block. Using TDR Cholti is able to modify the end user's request and then use relationship rules to improve the quality of the request by associating two categories into a single event, where it can imply the known geospatial data as an independent variable to further optimize the size of the environment. The resulting Mass will range from 5.5 to 6.75. The SSD rules examples use the following keywords and clusters: G1 or USA, G2 or Virginia, G3 or Manassas, E1 or War, E2 or Civil, E3 or Battlefield, E4 or Union, E5 or Confederate, E6 or American, E7 or Historical, E8 or Maps, C1 or (E6+E1+E2) or American Civil War, C2 or (E7+E8) or Historical Map, C3 or (M1+E9+E10) or General Robert Lee and C4 or (M1+E11+E12) or General Irvin McDowell.

Presenting a First Example:

Minimum criteria. To qualify to be a QSD request the Mass must be at least 5.0 and possess valid independent variables (I), (J) and (K).

Presenting a Second Example:

English language and Geodata keywords. The request is M1+E7+E1+(G1+G2+G3) or "General Historical War USA VA Manassas". (I)=E7 or Historical, (J)=M1 or General, (K)=E1 or War are Lucky Numbers with 2 Likely Numbers. The request has a Mass of 5.5. War {AUSA VA Manassas"} is the (I!) Event. The environment is: 35_Lucky_4_Likely_2 or ((30.8!–28.8!)/2!) or 458 web pages.

Presenting a Third Example:

English language clusters, and Geodata keywords. The request is (E6+E1+E2)+(E7+E8)+(M1+E11+E12)+(G1+G2+G3) or "American Civil War Historical Maps General Irvin Mc Dowell USA VA Manassas". (I)=C1 or American Civil War, (J)=C3 or General Irvin Mc Dowell, (K)=C2 or Historical Maps are Lucky Numbers with 7 Likely Numbers. The request has a Mass of 6.0. American Civil War {USA VA Manassas} is the (I!) event. The environment is: 30_Lucky_4_Likely_6 or ((25.4!–23.4!)/2!) or 310 web pages.

Direct Request Search:

Is a request in which the end user knows and has most of all the information required to reach the final destination.

(PSD) Pentane Significant Difference:

The end user's idea is no longer an unknown and the third partition a Mini Block of the Internet. Using TDR Cholti is able to modify the end user's request and then use relationship rules to improve the quality of the request by associating two categories into an event where it can imply the known geospatial data as two additional independent variables to further optimize the size of the environment. The resulting Mass will range from 6.0 to 6.95. The PSD rules examples use the following keywords and clusters G1 or USA, G2 or FL, G3 or Fort Lauderdale, G4 or 33324, G5 or www.missing_name.com, G6 or (954)555-1234, E1 or Glenn, E2 or Lawyer, E3 or Property, E4 or Law, E5 or Patent, E6 or Gold, E7 or Intellectual, C1 or (E6+E1) or Glenn Gold, C2 or (E3+E4+E7) or Intellectual Property Law, and C3 or (E5+E2) or Patent Lawyer.

Expanding Geospatial Zero Clusters:

Presenting a First Example: IP Address only. The end user's only types G5 or www.ideaattorneys.com and is a valid IP Address, thus is a Checkmate of the [R] Side of the Brain exists. Cholti expands the request from G5 to (G1+G2+G3)+G5+(E3+E4+E7)+(E5+E2)+(E6+E1). (K)=G5 is a Zero Cluster with Mass of 6.0. Note: G5 can be probabilistically a Zero Cluster and thus blind the end user from reaching the final destination.

When a Checkmate of the [R] Side of the Brain exists, Cholti, uses TDR to derive the Superset, and Set since the Mass>=5, and also the Subset since the Mass is >=6.5. When the ANI is known, Cholti finds Country, State and City. Intellectual Property Law {USA FL Fort Lauderdale"} is the (I!) and Patent Lawyer {Glenn Gold} is the (J!) event. The environment is: 30_Lucky_5 or ((25!–24!)/1!) or 25 web pages.

Presenting a Second Example:

ANI only. The end user's only types G6 or (954 555-1234). (954 555-1234) is a valid telephone number or ANI and thus is a Right Brain checkmate and Cholti expands the request from G6 to: (G1+G2+G3)+G6+(E3+E4+E7)+(E5+E2)+(E6+E1). K=G6 is a Zero Cluster with a Mass of 6.5.

Note, G6 can be probabilistically a Zero Cluster and thus blind the end user from reaching the final destination. When a Right Brain checkmate exists, Cholti, uses TDR to derive the Superset, and Set since the Mass>=5, and also the Subset since the Mass>=6.5. When the ANI is known, Cholti finds Country, State and City. Intellectual Property Law {USA Florida Fort Lauderdale} is the identified (I!) event and (E5+E2)(E6+E1) Patent Lawyer{Glenn Gold} is the identified (J!) event. The environment is: 25_Lucky_5 or ((20!–19!)/1!) or 20 web pages.

Presenting a Third Example:

ANI plus English language keywords. The request is G6+E1+E2+E3 or (954) 555-1234 Gold Lawyer Property. The request, G6 or (954) 555-1234 is a valid telephone number or ANI and thus a Right Brain checkmate exists. The request has a Mass of 6.6. Note, G6 can be probabilistically a Zero Cluster and thus blind the end user from reaching the final destination. When a Right Brain checkmate exists with Mass>=6.5 Cholti finds Superset, Set and Subset.

When the ANI is known, Cholti finds Country, State and City. Patent Lawyer {Glenn Gold} is the (I!) event and Intellectual Property Law {USA Florida Fort Lauderdale} is the (J!) event. The environment is set to 24_Lucky_5 or ((19!–18!)/1!) or 19 web pages. Same as example number 2 except the primary and secondary Managerial Hierarchical Relationship Indices priority are reversed and the probability that G6 is a Zero Cluster that confounds the end user's search is virtually eliminated.

Presenting a Third Example:

ANI plus English language clusters. The request is G6+(E6+E1)+(E7+E5+E2)+(E3+E4) or "954 555-1234 Glenn Gold Intellectual Property Law Patent Lawyer". The request, G6 or (954) 555-1234 is a valid ANI and thus a Right Brain checkmate exists. The request has a Mass of 6.95. When the ANI is known, Cholti searches and finds in its database relevant Country, State and City information when missing. Patent Lawyer {Glenn Gold} is (I!) event and Intellectual Property Law {USA Florida Fort Lauderdale} is (J!). The environment is: 15_Lucky_5 or ((10!–9!)/1!) or 10 web pages.

Super Glyph Exact Request Searches:

Is a request in which the end user knows all the information required to reach the final destination.

(HSD) Hexane Significant Difference:

Using TDR Cholti is able to modify the end user's request and then use likelihood rules to "Cherry Pick" the optimal response. The resulting Mass is always 7. The following keywords are clusters are used for the following example: G1 or USA, G2 or FL or Florida, G3 or Fort Lauderdale), G4 or 33324, G5 or www.ideaattorneys.com, G6 or 954 555-1234, E1 or Glenn, E2 or Lawyer, E3 or Property, E4 or Law, E5 or Patent, E6 or Gold, E7 or Intellectual, C1 or (E6+E1) Glenn Gold, C2 or (E3+E4+E7) or Intellectual Property Law, C3 or (E5+E2) or Patent Lawyer.

Presenting a First Example:

ANI, plus English language clusters and Geodata keywords. The end user's only types G6+G5+(G1+G2+G3+G4)+(E6+E1)+(E7+E5+E2)+(E3+E4) or 954 555-1234 www.ideaattoneys.com "USA FL Fort Lauderdale 33324 Glenn Gold Intellectual Property Law Patent Lawyer". 954 555-1234 is a telephone number, www.ideaattorneys.com is domain name representing an IP Address and thus a Right Brain checkmate exists.

Six Lucky Numbers have no Likely, Unlikely nor Never Numbers: The request: (G6+G5+(G1+G2+G3+G4)+(E6+E1)+(E7+E5+E2)+(E3+E4)) has a Mass of 7. Geodata (G1, G2, G3, G4, G5, G6), C1 or (E7+E5+E2) or Intellectual Property Law, C2 or (E5+E2) or Patent Lawyer and C3 or (E6+E1) or Glenn Gold are 6 Lucky Numbers with no Likely, Unlikely or Never Numbers. The environment is: $10\_Lucky\_6$ or $((4!-4!)/0!)$ or 1 web page.

When the Mass=7, Cholti, always 'Cherry Picks' with certitude the optimal response, since the end user made an exact Direct Request, and should always lead to exact responses, provided that the information is stored in a format that the artificial intelligence spiders can read and then store in the Master Index.

Thus, it is possible that the human can have an exact request and a plurality of Search Engines do not. For this reason TDR rules of Association, Relevance and Likelihood are used to permit Cholti to always "Cherry Pick" with certitude or Mass=7 yielding an environment of $10\_Lucky\_6$ or $((4!-4!)/0!)$ or exactly 1 web page.

Codex Business Rules

Triangulation Deductive Reasoning

Cholti has several ways to find the optimal search pattern environment once it has determined the best fit Managerial Hierarchical Relationship Indices, Mass, and has created a collection of additional keywords that are related via Association, Relevance and Likelihood to transforms what the end user is typing into formed ideas that dynamically yield final destinations.

XCommerce when a Z_Price Bitmap Exists:

From related art the XCommerce supercomputer stores, maintains and updates a comprehensive collection of all plausible and valuable search patterns that best reflects the latest trending of all the end user's interacting with a particular search engine supercomputer as follows:

1) Identify if the given Search Pattern exists as a Z_Price Bitmap.
2) Retrieve the Search Pattern Z_Price Bitmap information.
3) Perform no additional calculation, since answer is already optimal.
4) Rearward chain response to end user's terminal
5) Display top (n) web pages.

XCommerce when a Z_Price Bitmap does not Exists

When a search pattern does not exists as a Z_Price Bitmap in the XCommerce databases do as follows:

Association (of Super Glyphs) TDR Step #1: Cholti determines the approximate Mass of the dynamic weight of at least one request belonging to a session, and most importantly determines the quantity of independent variables, which in turn yields the level of significance difference (e.g. FSD, SSD, TSD or QSD) by mapping independent variables with the search pattern dynamic Mass value.

For each search pattern the Optimizer determines the Super Glyphs that are related to the Lucky Numbers or independent variables (I) for Superset (I), (J) for Set (I, J), (K) for Subset(I, J, K), (X) or (I!), (Y) or (J!) and (Z) or (K!) for Geodata. Then Cholti expands the end user's request via association, by adding related Super Glyphs or Likely Numbers, which are relevant in determining the final destination.

Mass Driven FSD Search Patterns:

When the Mass of a Search Pattern makes it a FSD do as follows:

1) Associate related keywords to Superset (I).
2) Assign Superset (I) to a category.
3) Shrink environment size to a Block having 1,048,576 Page Ranks.

Mass Driven SSD Search Patterns:

When the Mass of a Search Pattern makes it a SSD do as follows:

1) Associate related keywords to Superset (I) and Set (I, J).
2) Associate Superset (I) to a category.
3) Associate Set (I, J) to a category.
4) Determine if Super Glyphs (I) and (J) are directly related.
5) Shrink environment size to a Sub Block having 65,536 Page Ranks.

Mass Driven TSD, QSD, PSD and HSD Search Patterns:

When the Mass of a Search Pattern makes is a TSD or better do as follows:

1) Associate related keywords to Superset (I), Set (I, J) and Subset (I, J, K).
2) Associate related Geodata keywords to (X) or (I!), (Y) or (J!) and (Z) or (K!).
3) Associate Superset (I) to a category.
4) Associate Set (I, J) to a category.
5) Associate Subset (I, J, K) to a category.
6) Determine if Super Glyphs (I), (J) and (K) are unrelated.
7) Determine if Super Glyphs (I) or (J), (I) or (K), or (J) or (K) are related.
8) Determine if Super Glyphs (I), (J) and (K) are related.
9) Determine if Super Glyphs (X), (Y) and (Z) are related (I), (J) or (K).
10) TSD Mini Block has 4,096 web pages.
11) QSD, PSD, and HSD Mini Block or Element has 1,024 web pages.

Hot & Cold Analysis (of Super Glyphs)

TDR Step #2

Direct Requests

When solving for Direct Request use pre-processed responses based on the identified independent variables as follows:

FSD Driven Z_Price Bitmap Collections:

Use Single Object Z_Price Bitmap Superset (I).

SSD Driven Z_Price Bitmap Collections:

When (I, J) are related use Double Category Z_Price Bitmap (I, J) otherwise when (I, J) are unrelated correlate two Single Category Z_Price based on independent variables (I) and (J).

TSD Driven Z_Price Bitmap Collections:

When solving to determine the top results from pre calculated information perform left brain or English language calculations by using independent variables (I) as the primary filter, (J) as the secondary filter and (K) as the tertiary filter to derive the optimal environment size as follows:

Left Brain Filtering

Use Z_Price Bitmaps based (I), (J), and (K) as follows:
1) (I, J, K) are related use Triple Category (I, J, K).
2) (I, J, K) are unrelated use Single Category (I) then filter by (J, K).
3) (I, J) are related use Double Category (I, J) then filter by (K).
4) (I, K) are related use Double Category (I, K) then filter by (J).
5) (J, K) are related use Double Category (J, K) then filter by (I).

QSD Driven Z_Price Bitmap Collection:
1) Performs a Left Brain filtering.
2) Create a Mini Block environment using the primary, secondary, and tertiary filters.
3) Vector and weight each visible web page using the Right Brain independent variable (X). Correlate the top (n) pages and use TDR to convert 2 categories into one (1) event as follows:

Right Brain Conversion Using (X):

The "HIVE" performs Right Brain conversions by using Set Theory to standardize, reorganize, and transforms keywords into a collection of Super Glyphs that represent at least one request belonging to a session, and then maps (I), (J) and (K) to a particular category. The "HIVE" cross references the geospatial Super Glyphs against each category look up table, to determine the best fit Block that yields a Superset (I!). The "HIVE" integrates independent variables (I) and (X) into an Event.

As an example, (I)=American Civil War, which took place between the years 1861-1865, and thus American Civil War {1862} is a valid event.

PSD Driven Z_Price Bitmap Collections:
1) Perform a Left Brain filtering.
2) Create a Mini Block environment using the primary, secondary and tertiary filters.
3) Vector and weight each visible web page using the Right Brain independent variables (X) and (Y). Correlate the top (n) pages and use TDR to convert 4 categories into 2 events as follows:

Right Brain Conversion Using (X, Y):

The "HIVE" performs Right Brain conversions using "Topology" to map, plot and trace existing facts and then finds missing gaps of information belonging to Block (I!) using rules of relevance to group Super Glyphs relative to (J) and (K). The "HIVE" cross references the geospatial Super Glyphs against each category look up value to determine the best fit Sub Block and Set (I!, J!). The "HIVE" integrates independent variables (J) and (Y) into an Event. E.g. Superset (I!) is "American Civil War {1863}, (J)="Robert E Lee", which the highest frequency military leader of the American Civil War, and military leaders have ranks, and thus General {Robert E. Lee} is a valid event.

HSD Driven Z_Price Bitmap Collections:
1) Perform a Left Brain filtering. 2) Create a Mini Block environment using the primary, secondary and tertiary filters. 3) Vector and weight each visible web page using the Right Brain independent variables (X), (Y) and (Z). Cholti correlates the top (n) pages information and then uses TDR to integrate all categories into events as follows:

Right Brain Conversions Using (X, Y, Z):

The "HIVE" measures the Informational Entropy of Sub Block (I!, J!, K!) using rules of likelihood to expand existing groups of Super Glyphs with Related Objects relative (K). And cross references the geospatial Super Glyphs against category (K) look up table, to determine the best fit Mini Block and Subset (I!, J!, K!). And correlates independent variables (K) and (Z) are into an event. At this point, there can be a plurality of matrices of valid Block, Sub Blocks and Mini Blocks having (I), (J), (K), (X), (Y), (Z), (I!), (J!) and (K!) and it is by means of Z_Price Bitmaps and quality levels filtering that said plurality of matrices environments is limited not exceed 16,384 web pages.

Super Pages and Super Sites:

Statistical objects of multiple data: Some web pages and sites may appear multiple times, and this is the reason for Super Pages and Super Sites to store an array of statistical data objects concerning each of said plurality of matrices. Each Super Site and Super Page may have multiple values, based on the vector value of each Managerial Hierarchical Indices and their overall rank based on the relative Master Index.

The Optimizer Solving for Sessions

Dynamic Requests

When solving for a Dynamic Request consisting of at least one Request belonging to a Session, the Optimizer performs the following steps:
1) Identifies independent variables.
2) Creates a collection of related Super Glyphs based on relevance (Hot & Cold).
3) Finds missing gaps of information and related objects based on Likely & Unlikely probabilistic analysis of the content of the highest vector valued Super Sites.

Dynamic FSD driven Z_Price Bitmap collection: performs the following:
1) Finds the most relevant Single Category Z_Price Bitmap based on (I).
2) Creates a Block size environment or Superset (I).
3) By default each Super Page Bitmap look like this "1000000000000".
4) Removes (I) from the calculation, it is the first "1" in the Super Page Bitmap!
5) Match each (Lucky+Likely) Super Glyph against each Super Page.

Match:
6) Places a "2" in the appropriate Bitmap position for an exact match.
7) Places a "4" in the appropriate Bitmap position for a partial match.
8) Places an "8" in the appropriate Bitmap position for a TDR match.

No Match:
8) Places a "0" in the appropriate Bitmap position for no match.
9) Use Bitmap Vector Method to obtain Relevance Value.

Bitmap Vector Method:

For each Super Page Bitmap value adds the value of each position belonging to the Bitmap, e.g. "102280042" equals (1+0+2+2+8+0+0+4+2) or 19. Subtract 1 from the Super Page Bitmap value and if 0 the Super Page is irrelevant. For example, "100000000" is irrelevant and becomes "00000000". Then replace each 0 with an F or hexadecimal 15. E.g.: Super Page Bitmap "102280042" becomes "1F228FF42" or 64.

10) Distills using the Relevance Value to remove irrelevancy. The Final Value is obtained as follows: multiply the Super Page relative Master Index value×0.7 when "F", ×0.8 when "8", ×0.9 when "4", ×1 when "2" and ×2 when "1". For example, x=relative Master Index or 10,000, y=16,384 web pages and Super Bitmap value is "1F228FF42". The relevance value=(x+y) or 26,384* (2*0.7*1*1*0.8*0.7*0.7*0.9*1) or 13,032.

Dynamic SSD driven Z_Price Bitmap collection: Use a Double Category Z_Price (I, J) when related to create Sub Block sized environment, otherwise correlate the best fit results from the top results of two Single Category Z_Price Bitmaps (I) and (J). Vector multiply the top web pages and then weight each match belonging to the top Super Sites using the dynamic value of each Super Glyphs related to (I) and (J). Distill using the Relevance Value to remove irrelevancy, which yields the optimal environment.

Dynamic TSD Driven Z_Price Bitmap Collection

Dynamic Left Brain Filtering

Use a Triple Category Z_Price (I, J, K) when related to create a Mini Block sized environment, otherwise correlate the best fit results from the top results of the three Single Category Z_Price Bitmaps (I), (J) and (K). Vector multiply the top web pages and then weight each match belonging to the top Super Sites using the dynamic value of each Super Glyphs related to (I), (J) and (K). Distill using the Relevance Value to remove irrelevancy, which yields the optimal environment.

Dynamic QSD, PSD and HSD driven Z_Price Bitmap collection: use dynamic Left Brain filtering mechanism to yield the optimal environment.

Enhanced Managerial Hierarchical Relationship Indices: XCommerce has a look up tables that vectors each enhanced Managerial Hierarchical Relationship Indices. Correlating the top object Super Glyphs will determine, whether (I), (J), (K) or none are probabilistically the most plausible match in order to create an Enhanced Managerial Hierarchical Relationship Index hereinafter referred as Event.

In the ideal world the following should happen . . . (X) goes into (I), (Y) goes into (J) and (Z) goes into (K), unfortunately, after the process of TDR this may not be the case. Consequently, once the events of a particular Search Pattern are known and before performing the "Cherry Picking" steps and procedures, Cholti can rearrange the order of (I), (J) and (K), to group the (I, X), (J, Y) and (K, Z) pairs of independent variables.

Single Event:

Superset (I!) is a Single Event Z_Price Bitmap. The end user typed (I) and Cholti identifies (X) as a missing gap of information to merge both as (I!), then the environment size of the Block shrinks from 1,048,576 to 262,144 web pages.

Single Category and Event:

Set (I!, J) is a Single Category Z_Price Bitmap and a Single Event Z_Price Bitmap. The end user typed (J) and Cholti identifies (Y) as a missing gap of information to merge both as (J!), then the Sub Block shrinks from 65,536 to 16,384 web pages.

Double Events:

Set (I!, J!) is a Double Event Z_Price Bitmap. The end user typed (I) and (J) and Cholti identifies (X) and (Y) as the missing gaps of information to merge (I) and (X) to (I!) and (J) and (Y) to (J!). The Block shrinks from 1,048,576 to 262,144 web pages and also the Sub Block shrinks from 65,536 to 16,384 web pages.

Double Categories and Single Event:

Subset (I!, J, K) denotes the match/merge of a Double Category Z_Price Bitmap and a Single Event Z_Price Bitmap. The end user typed (I), (J), and (K) and then Cholti identifies (X) as a missing gap of information to merge (X) and (I) to (I!) only. Cholti can substitute and reorganize independent variables. Thus, Subset (I, J, K!), Subset (I, J!, K) and Subset (I!, J, K) become Subset (I!, J, K). The Block shrinks from 1,048,576 to 262,144 web pages.

Single Category and Double Events:

Subset (I!, J!, K) denotes the match/merge of a Single Category Z_Price Bitmap and a Double Event Z_Price Bitmap. The end user typed (I), (J), and (K) and then Cholti identifies (X) and (Y) as the missing gaps of information to merge (X) and (I) to (I!) and (Y) and (J) to (J!) only. Cholti reorganizes Subset (I, J!, K!), Subset (I!, J!, K) and Subset (I!, J, K!) into Subset (I!, J!, K) only. The Block shrinks from 1,048,576 to 262,144 web pages and also the Sub Block shrinks from 65,536 to 16,384 web pages.

Triple Events:

Subset (I!, J!, K!) denotes an exact request with a Triple Event Z_Price Bitmap. The end user typed (I), (J), (K), (X), (Y) and (Z) and Cholti just reorganizes the independent variables optimally. The Block shrinks from 1,048,576 to 262,144 web pages, the Sub Block shrinks from 65,536 to 16,384 web pages, and the Mini Block shrinks from 1,024 to 512 web pages.

[R] or Right Brain Conversions:

Right Brain conversions are accomplished by comparing in the look up table categories to events to determine the best fit Event. The missing gaps of information are found by using TDR rules of Association, Relevance and Likelihood to each Super Glyphs to enable the match/merge of 2 independent variables into a 1 Event.

Dynamic Right Brain Conversions Using (X):

Find the most relevant 'Related Object' Super Glyphs to (X). Use independent variable (X) to find the best Event (or Subset (I, J, K)!).

Dynamic Right Brain Conversions (X, Y):

Find the most relevant 'Related Object' Super Glyphs to (X) and then to (Y). Use independent variable (X) and (Y) to find the best 2 Events (or Subset (I, J, K)!!).

Dynamic Right Brain Conversions (X, Y, Z):

Find the most relevant 'Related Object' Super Glyphs to (X), (Y) and (Z). Use independent variables (X), (Y), and (Z) to find the best 3 Events or (Subset (I, J, K)!!!).

Mini Block Lower Limit:

The smallest size partition is a Mini Block with a lower limit size of 1,024 web pages. Cholti determines the environment should be 512 web pages. The top 512 web pages receive a bonus.

Likely & Unlikely Analysis (of Super Glyphs)

TDR Step #3

Replacing Categories with Events:

The Mini Block is derived using FSD, SSD or TSD guidelines, based on events (I!), (J!) and (K!) that are [L+R] Left and Right brain checkmate combinations.

Distill with Quality Values:

At this point using the quality Mini Block is distilled based on the dynamic Mass eliminating Super Sites and their organizations until the optimal size is obtained.

Assigning Likely Value:

Perform Bitmap Vector Method using independent variables Super Glyphs to give each Super Page a likely value, which reflects the actual quality of the content inside each visible Super Site and their visible subordinate Super Pages.

Modifying Likely Value Using Mulligan Super Glyphs:

Now confounding keywords become the determinant to yield the top response. Once a weighted Mini Block is derived, the final response must take into account Mulligan Super Glyph values to adjust the likely value of each Super Page belonging to the smallest partition that is being used to solve for the final destination.

Assigning Value Using Zero Clusters:

Finally, Zero Clusters are used to derive the final value of each Super Page. Zero Clusters used by "Boolean algebra"

technologies become the ultimate filter. In contrast, Cholti uses Zero Clusters for valuating Super Sites and subordinate Super Pages when finding the missing gaps of information and identifying independent variables.

Once Cholti finds all independent variables, the Super Glyph equation, represents a better Search Pattern that resembles the end user's idea. This fact, improves the effectiveness of the end user's to reach the final destination in less time with a minimum amount of requests. Cholti improves each request, by thoroughly reading and analyzing the content of smallest partition that is used to find the final destination!

Cherry Picking Process
Codex Search Pattern

Codex Search Pattern technology steps and procedures for "Cherry Picking" the top (n) pages from the smallest partition used to find the final destination as follows:

The "HIVE" uses the Mini Block and begins the resource intensive process of "Cherry Picking" by verifying and matching the final Super Glyph equation, to find the best content valued page ranks. With the new valorization the program measures the top (n) web pages and assigns each a content value. The "HIVE" stores the quality value of the lowest of top (n) web pages within the Mini Block based on browser capacities.

Browser Capacities Limitations:

The "HIVE" based on the browser capacities filters top (n) web pages as follows:
1) For responses of 10 web pages reduce environment to 128 web pages.
2) For responses of 20 web pages reduce to 256 web pages.
3) For responses of 50 web pages reduce to 384.
4) For responses of 100+ web pages reduce to 512.

Based on the end user's browser display capacities limitation the "HIVE" will retain as visible from the Mini Block the top (n) web pages as follows:
1) When 10 web pages are displayed reduce to top 16 web pages.
2) When 20 web pages are displayed reduce to top 32 web pages.
3) When 50 web pages are displayed reduce to top 64 web pages.
4) When 100+ web pages are displayed reduce to top 128 web pages.

Content Value the Final Determinant!:

The "HIVE" reads and verifies from highest valued to lowest valued the actual content of the web pages and based on the quality inside a content value is produced. The process ends once the highest content value is 'cherry picked' and then 'HIVE' fills the response based on browser capacities.

Match Criteria:

Is obtained by measuring from lower to higher significant difference slots the actual content inside the most relevant web pages as follows:
1) When FSD exists+1.
2) When SSD exists+1.
3) When TSD exists+1.
4) When all FSD, SSD, TSD exists+1, Left Brain checkmate.
5) When QSD exists+1.
6) When PSD exists+1.
7) When HSD exists+1.
8) When all QSD, PSD, HSD exists+1, [R] Ride Brain checkmate.
9) When all exist+2. [L+R] Left Brain and Right Brain checkmate.

The final step of the "Cherry Picking" process occurs when the Content Value is modified by match criteria as follows:

| Match Criteria | Coefficient |
| --- | --- |
| 0 | ×1.00. |
| 1 | ×1.05 |
| 2 | ×1.10 |
| 3 | ×1.21 |
| 4 | ×1.33 |
| 5 | ×1.41 |
| 6 | ×1.67 |
| 7 | ×2 |
| 8 | ×2.5 |
| 9 | ×5 |
| 10 | ×10 |

The "HIVE" "cherry picks" the top (n) results and this is the optimal answer by using the rules of Association, Relevance and Likelihood to perform a correlated analysis of optimal size environment and then methodically validates by reading and finally confirming that the best-fit content is in fact present. Nevertheless, when the end user wants more he can continue random surfing until reaching the new final destination.

Relevance and Likely value combinations are stored in look up tables as a coefficient to the relative Master Index. As a tie breaker the "HIVE" uses the Super Page relative Master Index value. The "HIVE" creates an array comprising the top 1,024 Super Page Bitmap values ordered from highest to lowest. Exhaustively, each Super Page belonging to the smallest partition receives its final value by multiplying the Relative Master Index times the content value coefficient. The $1^{st}$ ranked page becomes the upper limit and the $1024^{th}$ ranked page becomes the lower limit.

The top 1024 web pages and the limits are stored as the Z_Price Bitmap as a pre processed collection that associated to the smallest partition Codex Page. In the Codex Page instance the dynamic Mass of the Super Glyphs and mathematical resultant Mass required to reach the smallest partition are stored.

Updating Codex Pages:

When the Super Page Bitmap value is relevant the "HIVE" updates and inserts the new value in its appropriate position, and eliminates the last element of the array, and then the bottom value of the array becomes the new lower limit of the Codex Page.

Web Crawlers Updating Codex Pages:

Web crawlers continuously scan, gather and distill the content of the environment as they encounter content of significant difference they immediately based on the Super Site quality assign them to a temp Master Index value. For each minute five temp Master Index arrays are created with the rounded size 1/10,000 the active Master Index.

Span of Control:

Each temp Master Index has a visible Span of Control of analysis. E.g. the $1^{st}$ temp Master Index monitors Super Sites with quality 1 and 10, where Super Sites with quality 10 have the highest probability of being significant and quality 1 have the lowest.

Quality 0 Super Sites are irrelevant. Quality 1 Super Sites of the Internet are the lion share. Quality 10 Super Sites are 'la crème de la crème'.

Temp Master Index:

Each temp Master Index stores the significant difference events in the Internet for 1 minute. Each temp Master Index begin time is separated by 12 seconds, and the first temp Master Index begin time starts at the top of the minute.

Super Sites Trigger Change:

Each Super Site has its own Z_Price Bitmap collection of top (n) Codex Pages associated to it. If the event is lower than the lower limit of the lowest top (n) Codex Page it is irrelevant, otherwise the system updates each relevant top (n) Codex Page.

Synchronizing New Master Index:

Once the minute expires the new Master Index equals the temp Master Index size plus the active Master Index. Each relevant Codex Pages is updated. The 'HIVE' first maps the lion share that had no change nor was visible. Using the relevant Master Index value of the top significant difference Codex Page port each Super Sites and it chain of command to the new Master Index with the up to date values.

Replacing Master Index in Real Time:

Once all the information of the temp Master Index and active Master Index are mapped to the new Master Index, the active Master Index becomes the previous Master Index, and the new Master Index replaces the active Master Index in real time.

Updating Codex in Real Time:

Once all the information of each Codex Page belonging to the temp Master Index are mapped, and ported to the new Master Index, each active Codex Page is updated and in turn updating the Codex in real time.

BRIEF DESCRIPTION OF THE FIGURES

FIG. 20 presents an example representative of a FSD or Superset (I);

FIG. 21 presents an example representative of a SSD or Set (I, J);

FIG. 22 presents an example representative of a TSD or Subset (I, J, K);

FIG. 31 presents an example representative of a Cholti Super Glyph Hot and Cold Analysis;

FIG. 32 presents an example representative of a Hot & Cold FSD or Superset (I);

FIG. 37 presents an example representative of a Hot & Cold HSD or Subset (I, J, K)!!!;

FIG. 44 presents an example illustrating TSD using a Historical, Historical Battle and Military Leader Categories;

FIG. 50 presents an example illustrating TSD adding related Super Sites Objects;

FIG. 53 presents an example illustrating HSD adding related Super Sites Objects;

DETAILED DESCRIPTION OF THE FIGURES

Figure 1:
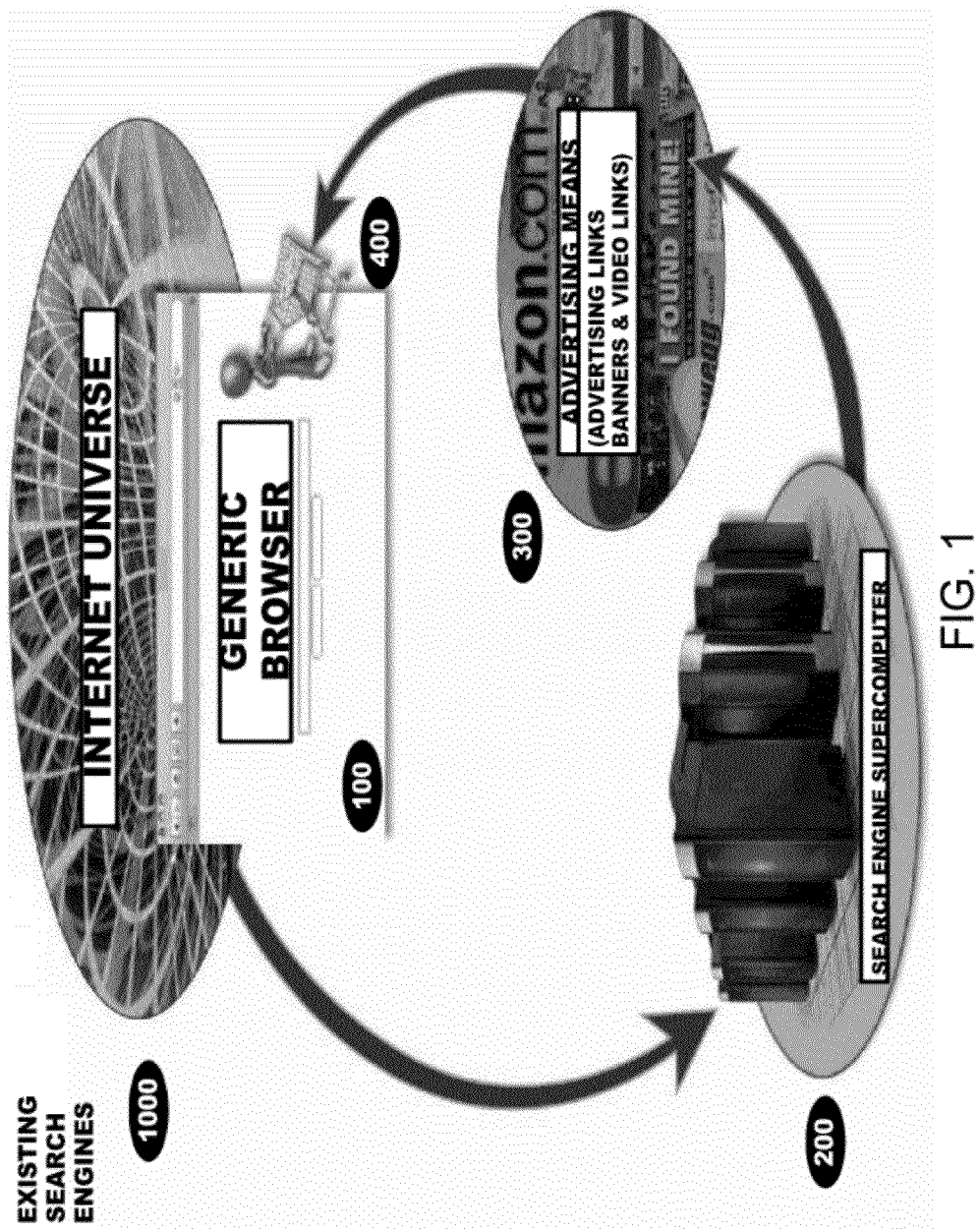
FIG. 1 presents an exemplary block diagram of a search engine architecture.
Figure 2:
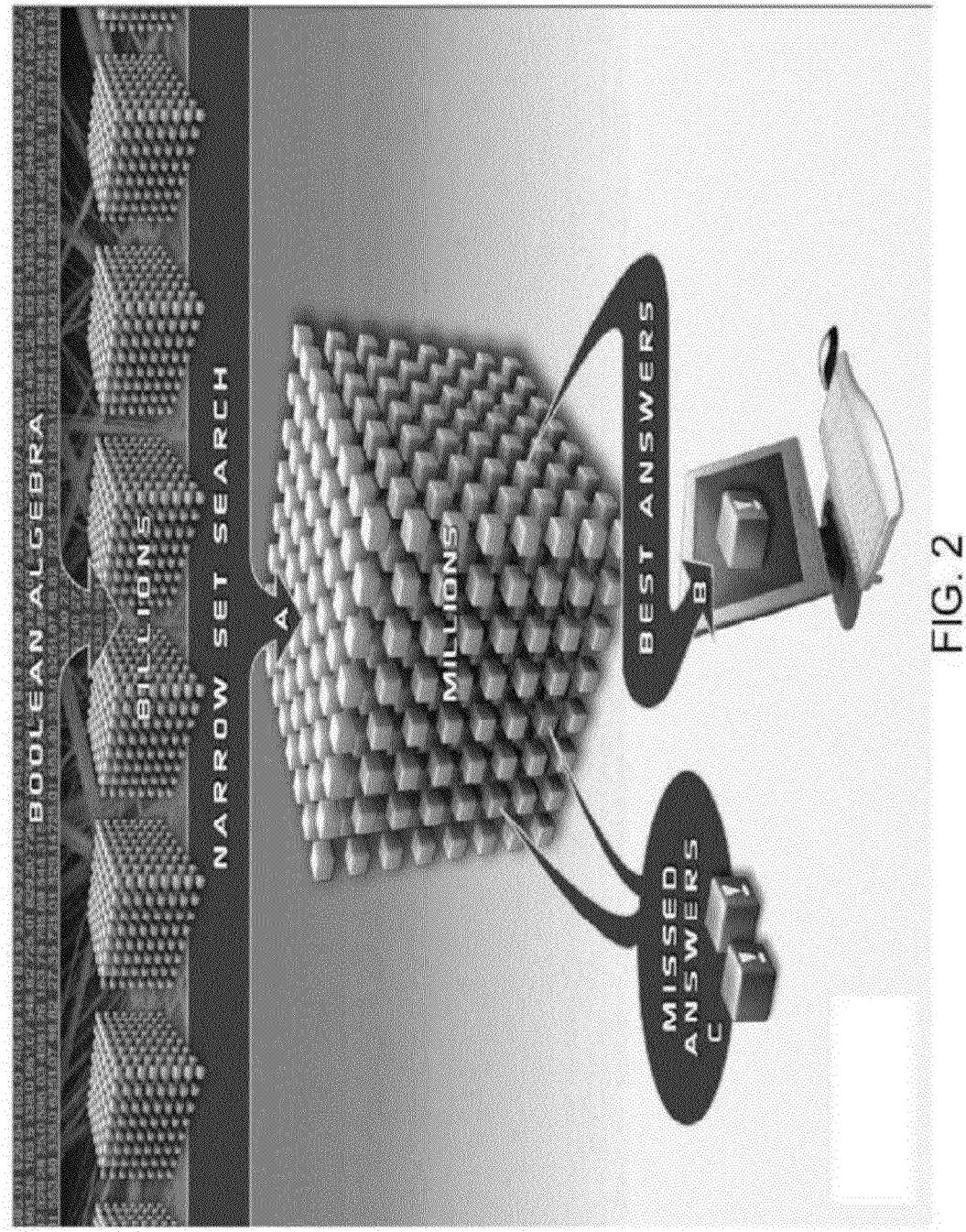
FIG. 2 presents an exemplary block diagram of a Boolean algebra search.
Figure 3:
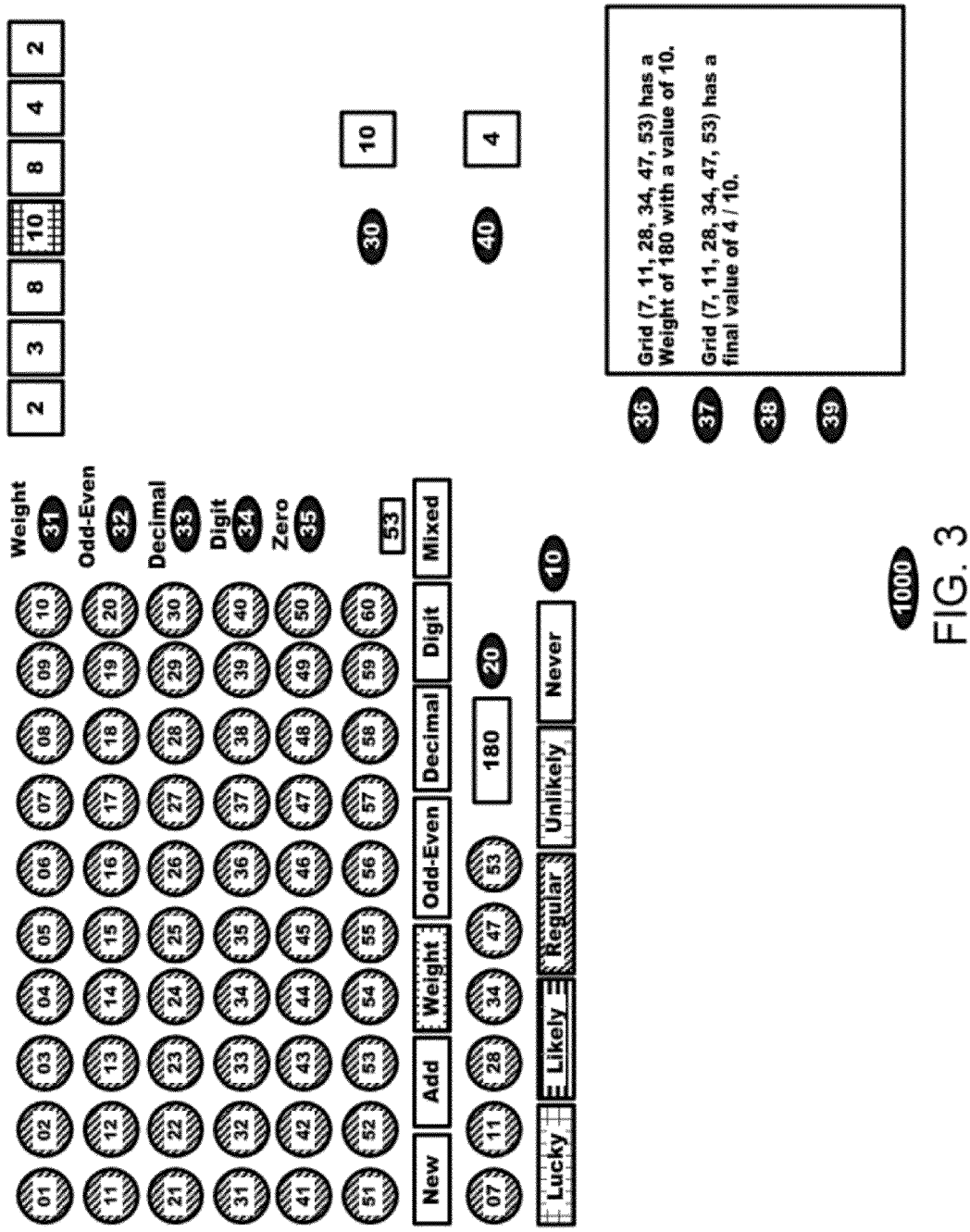
FIG. 3 presents an exemplary block diagram illustrating weight patterns.
Figure 4:
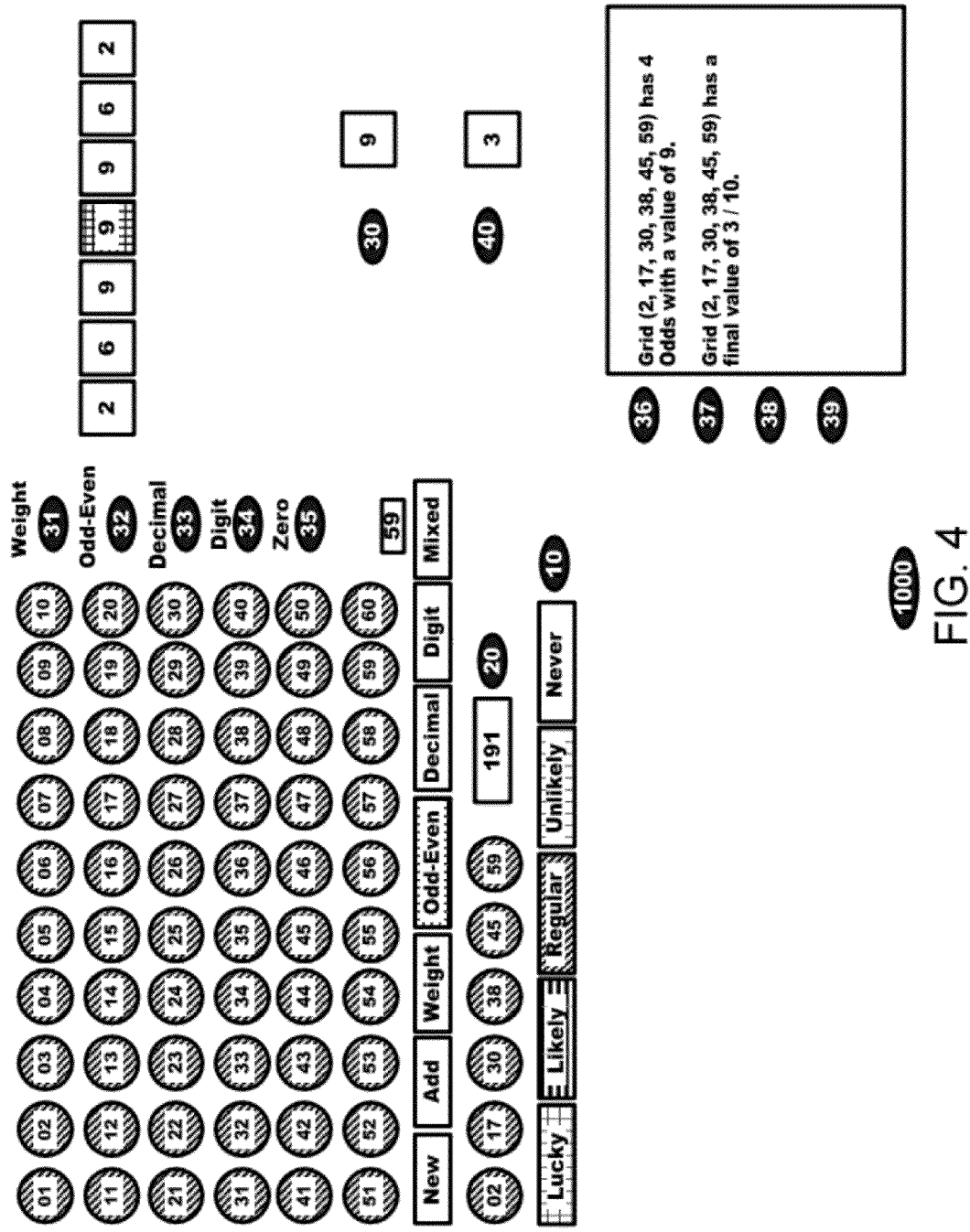
FIG. 4 presents an exemplary block diagram illustrating odd-even patterns.
Figure 5:
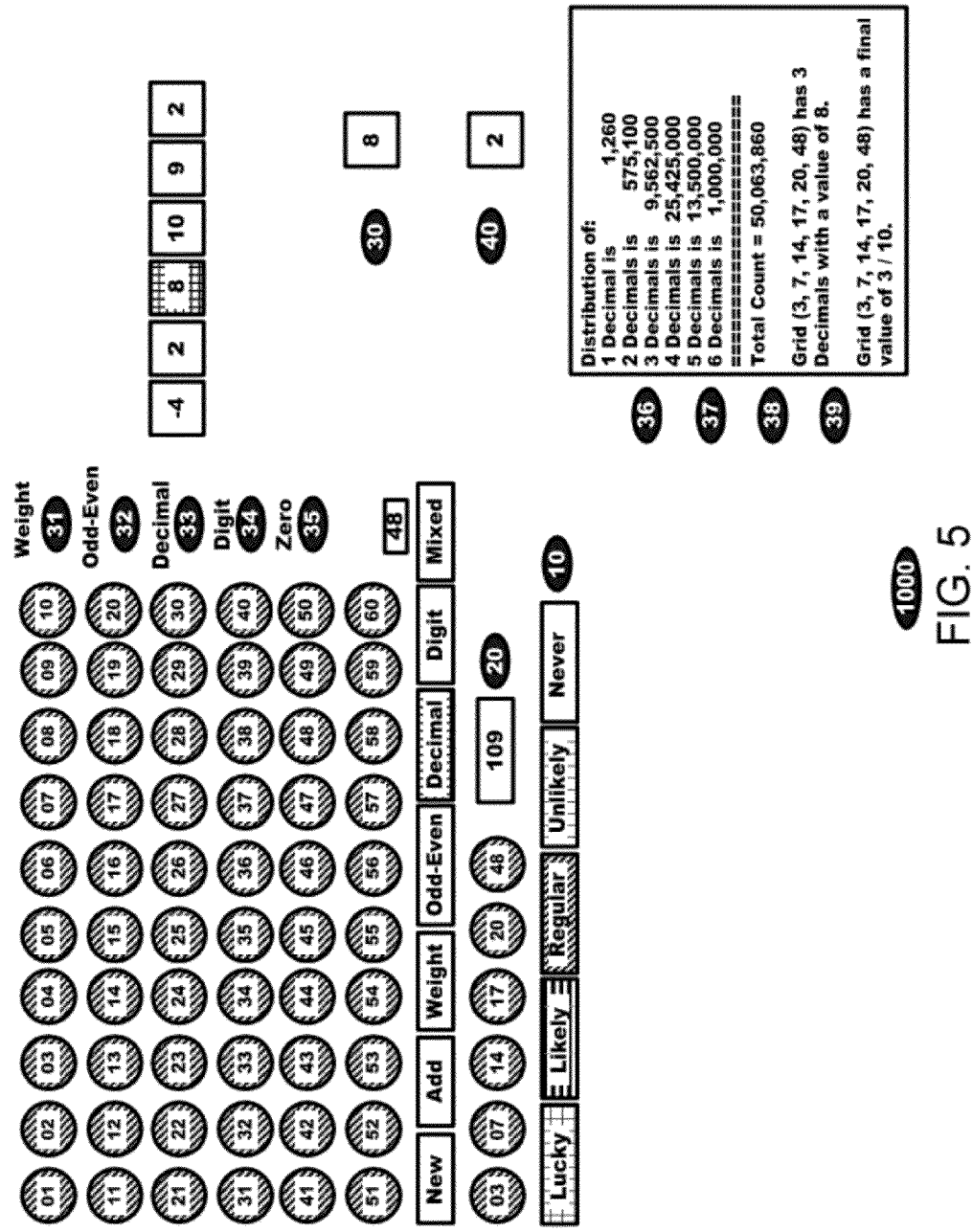
FIG. 5 presents an exemplary block diagram illustrating decimal patterns.
Figure 6:
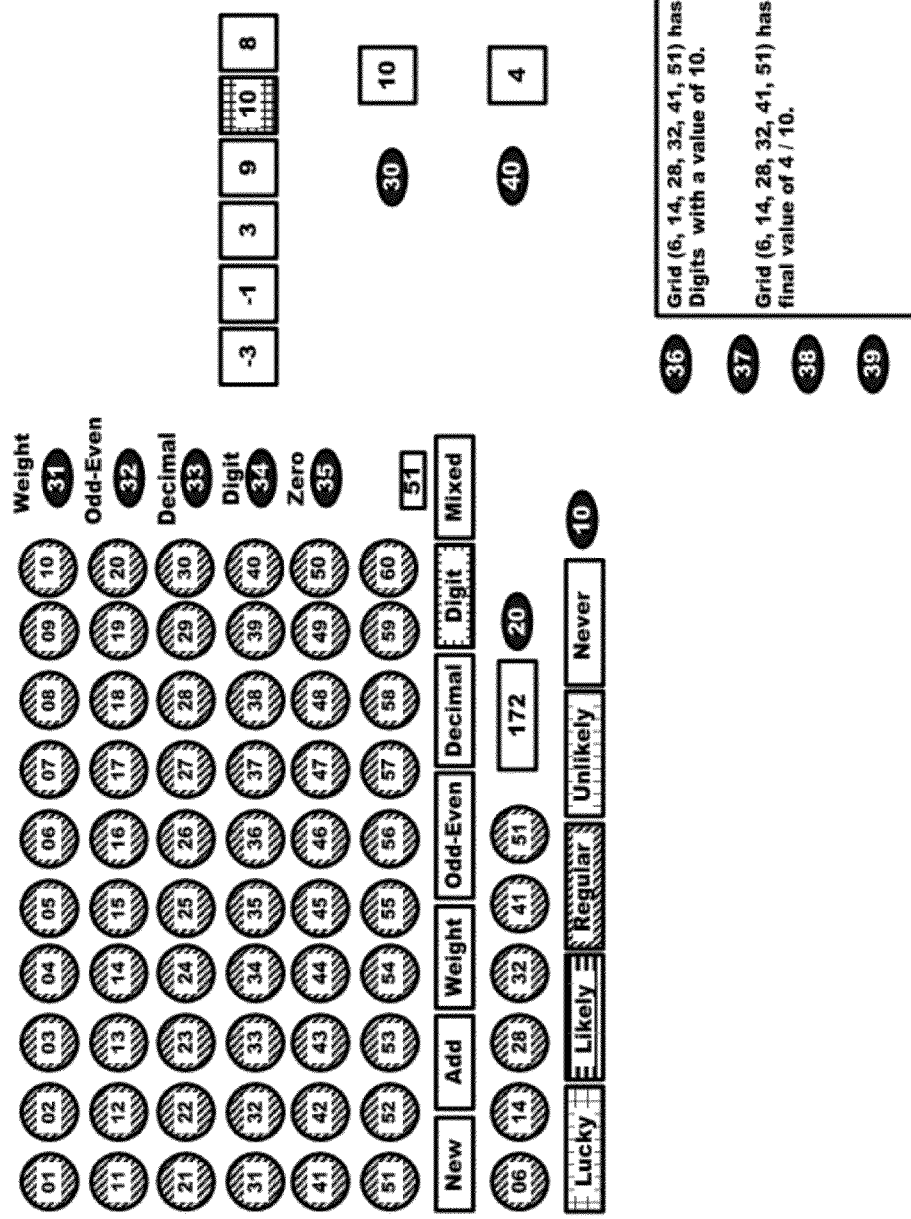
FIG. 6 presents an exemplary block diagram illustrating digit patterns.
Figure 7:
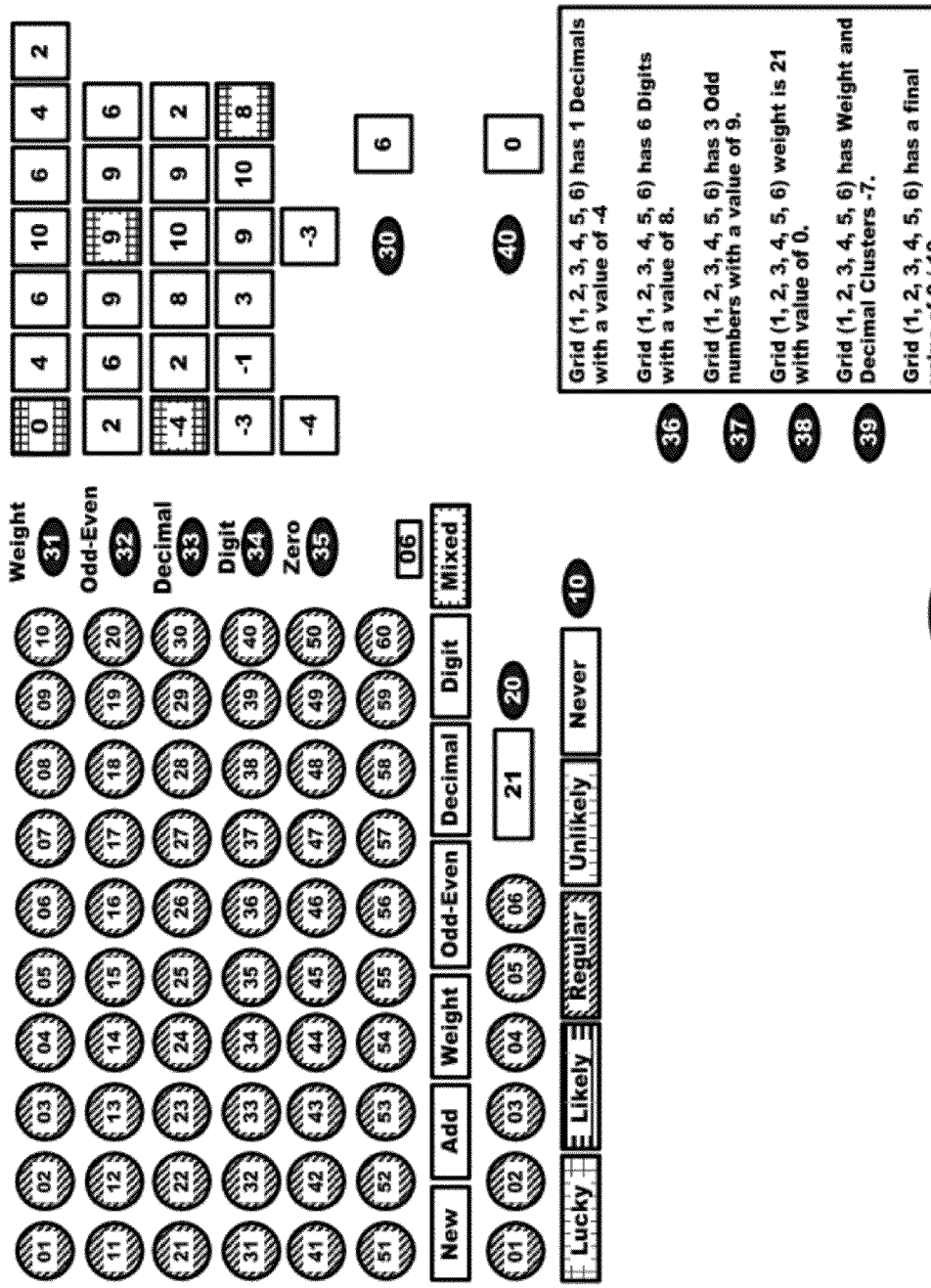
FIG. 7 presents an exemplary block diagram illustrating mixed patterns.
Figure 8:
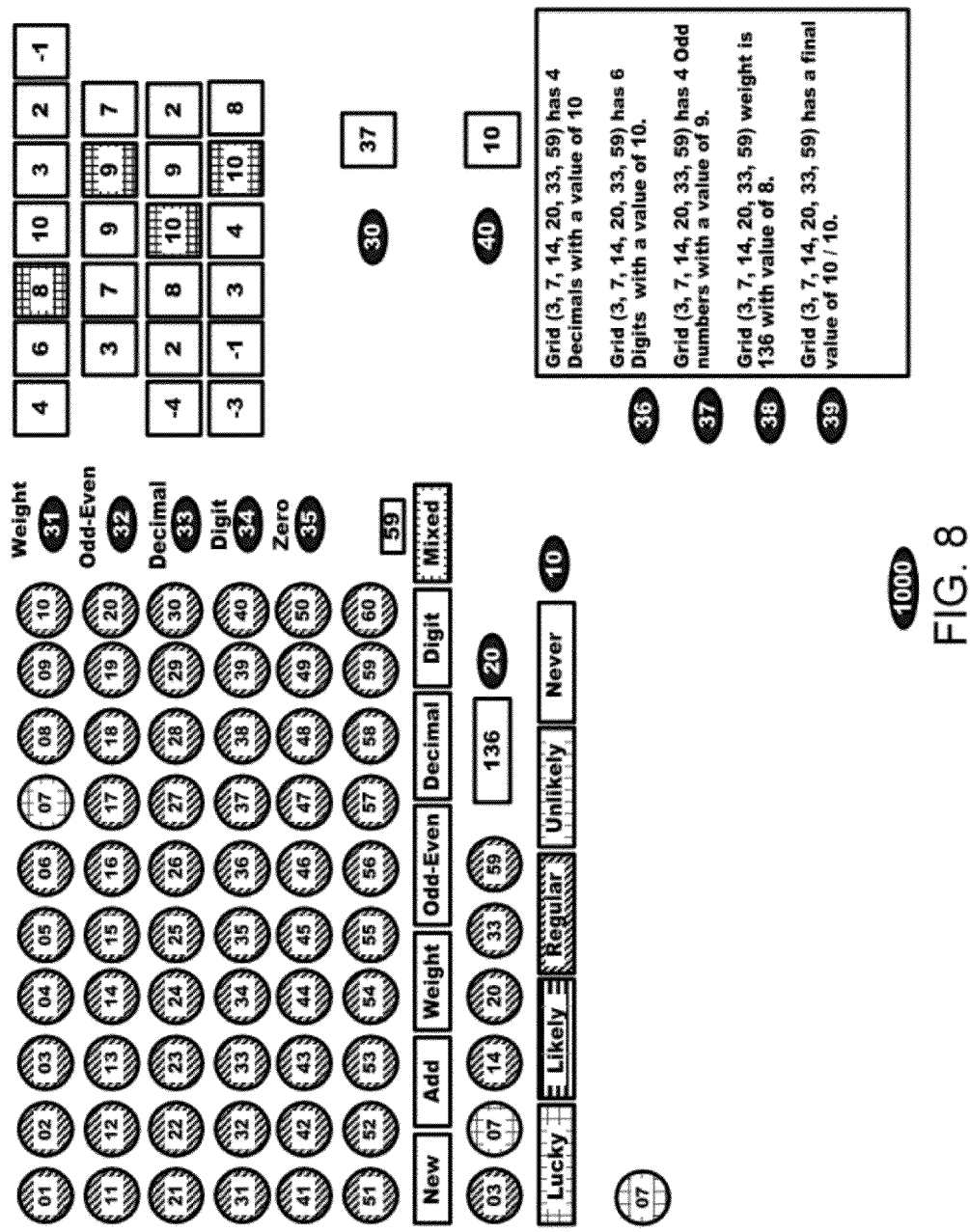
FIG. 8 presents an exemplary block diagram illustrating Lucky Number Patterns.
Figure 9:
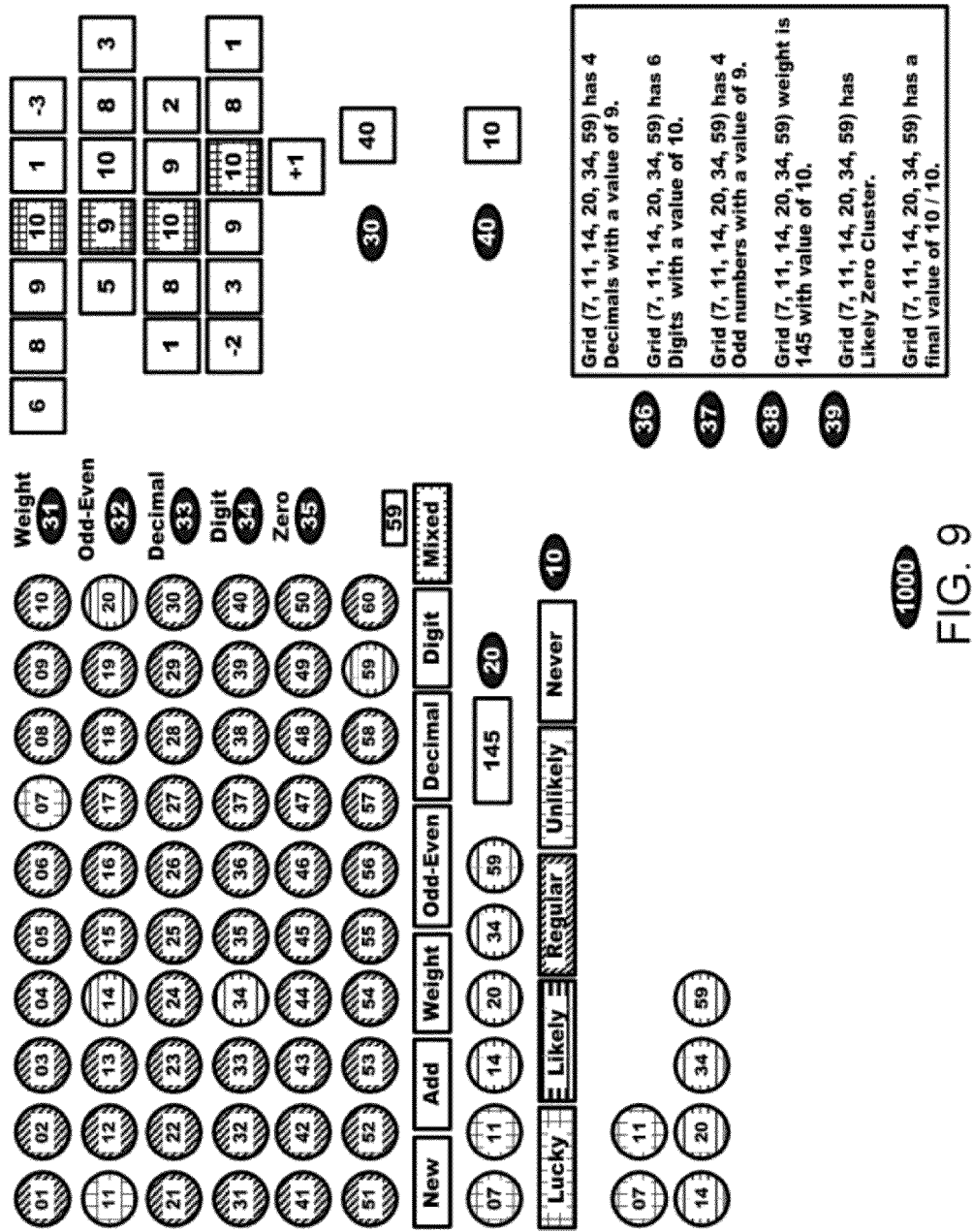
FIG. 9 presents an exemplary block diagram illustrating Likely Number Patterns.
Figure 10:
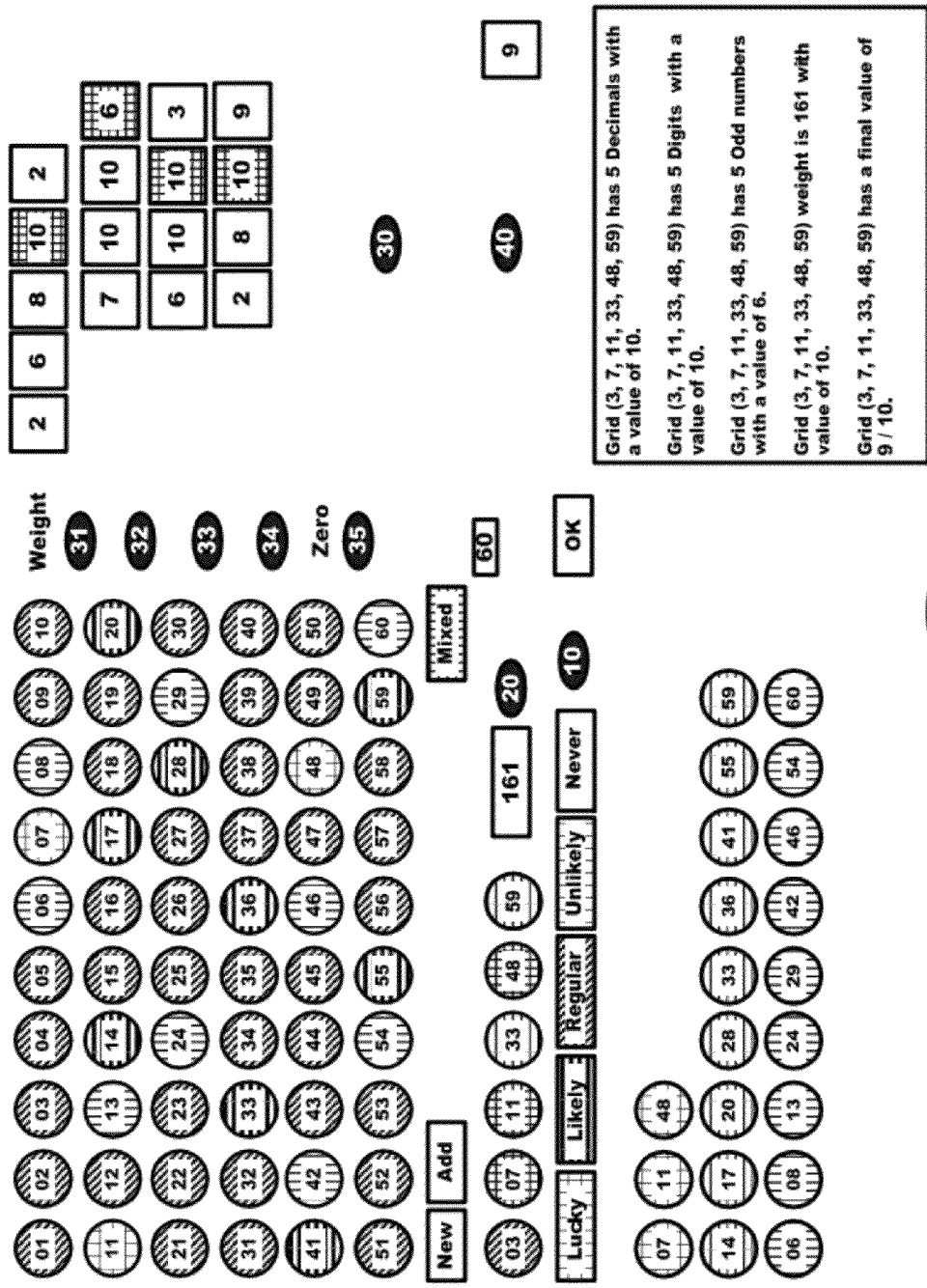
FIG. 10 presents an exemplary block diagram illustrating Unlikely Number Patterns.
Figure 11:
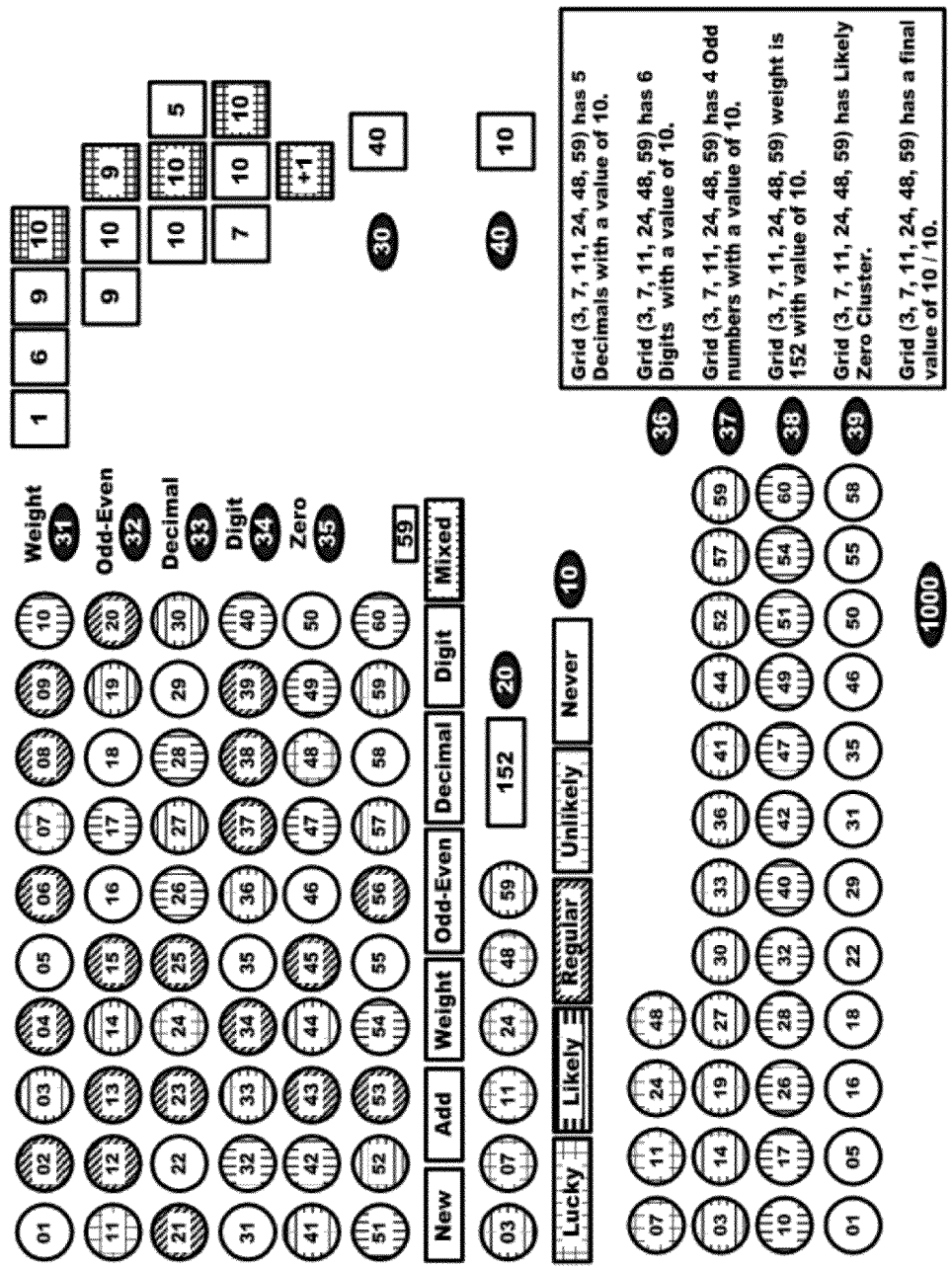
FIG. 11 presents an exemplary block diagram illustrating Never Number Patterns.
Figure 12:
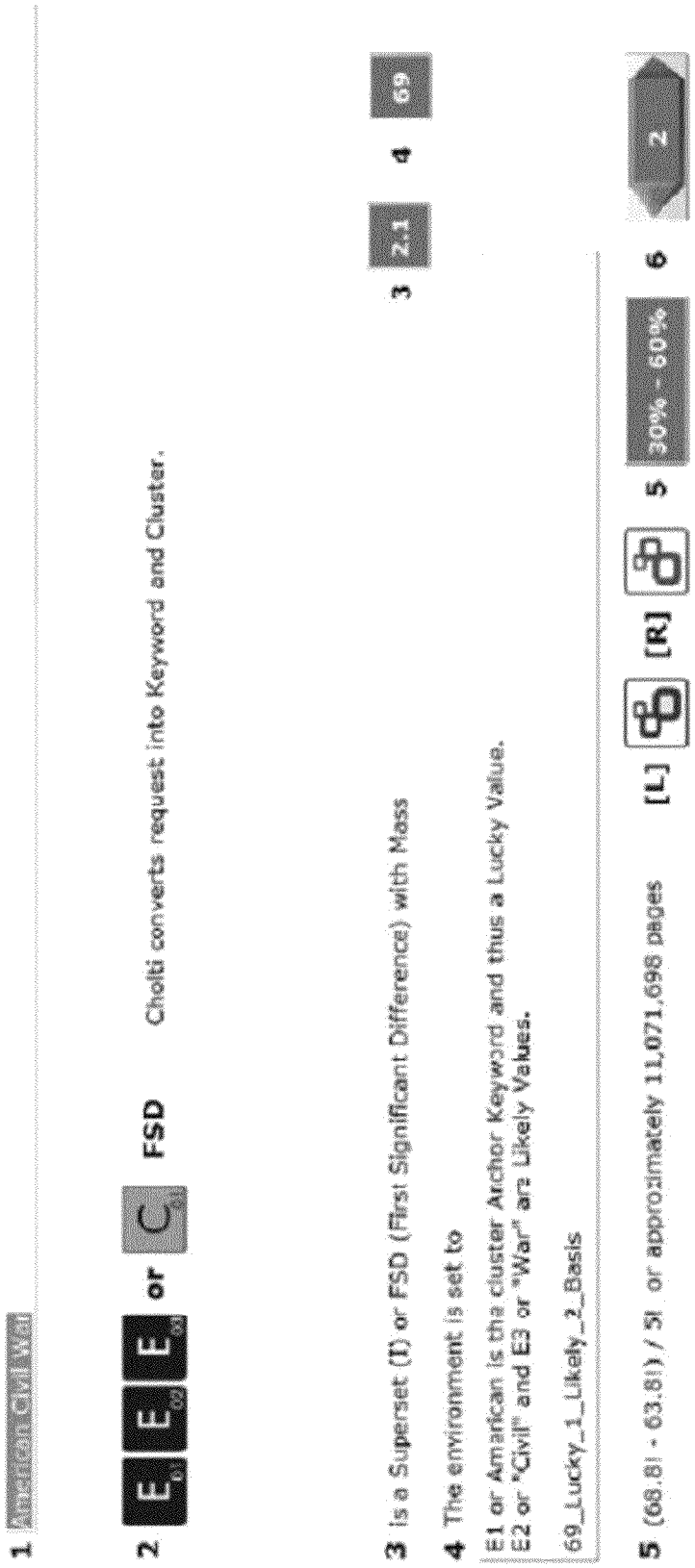
FIG. 12 presents an exemplary block diagram illustrating Superset (I), search with one (1) independent variable.
Figure 13:
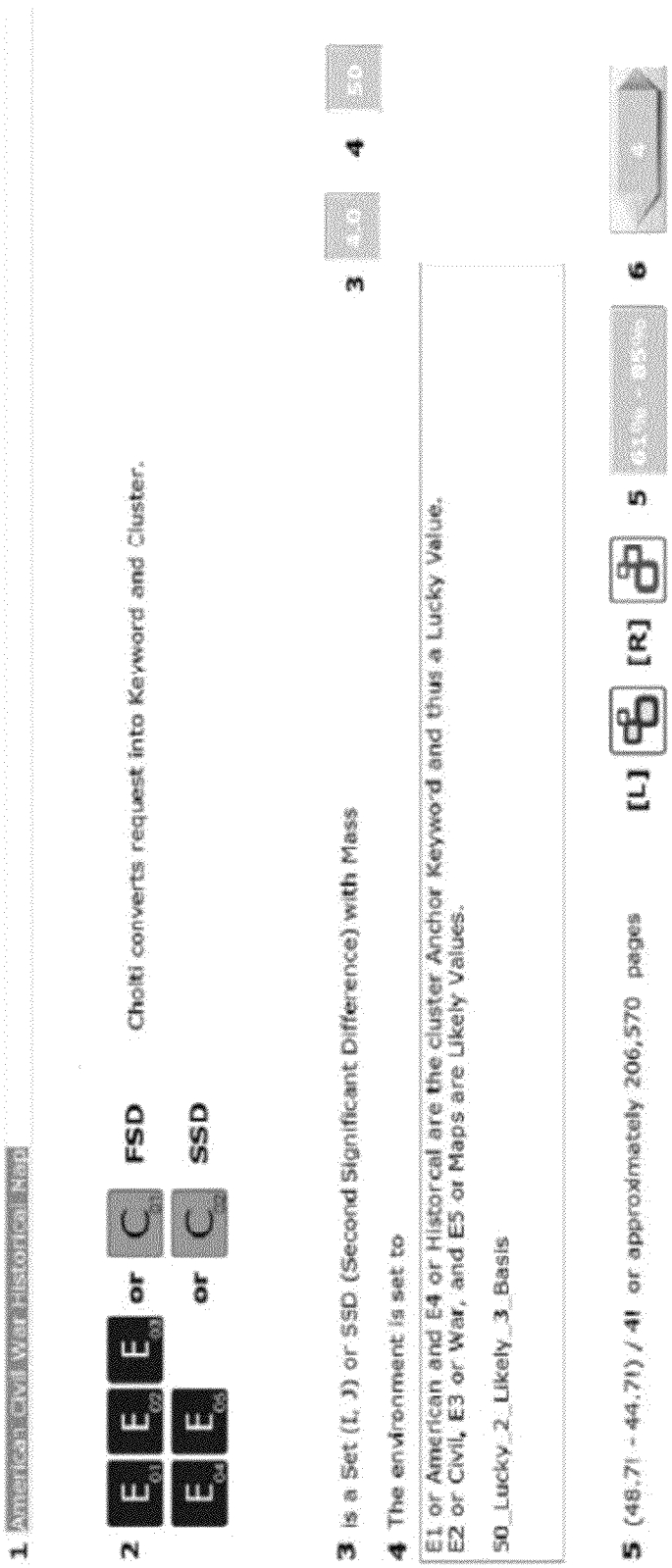
FIG. 13 presents an example representative of a Set (I, J), search with two (2) independent variables.
Figure 14:
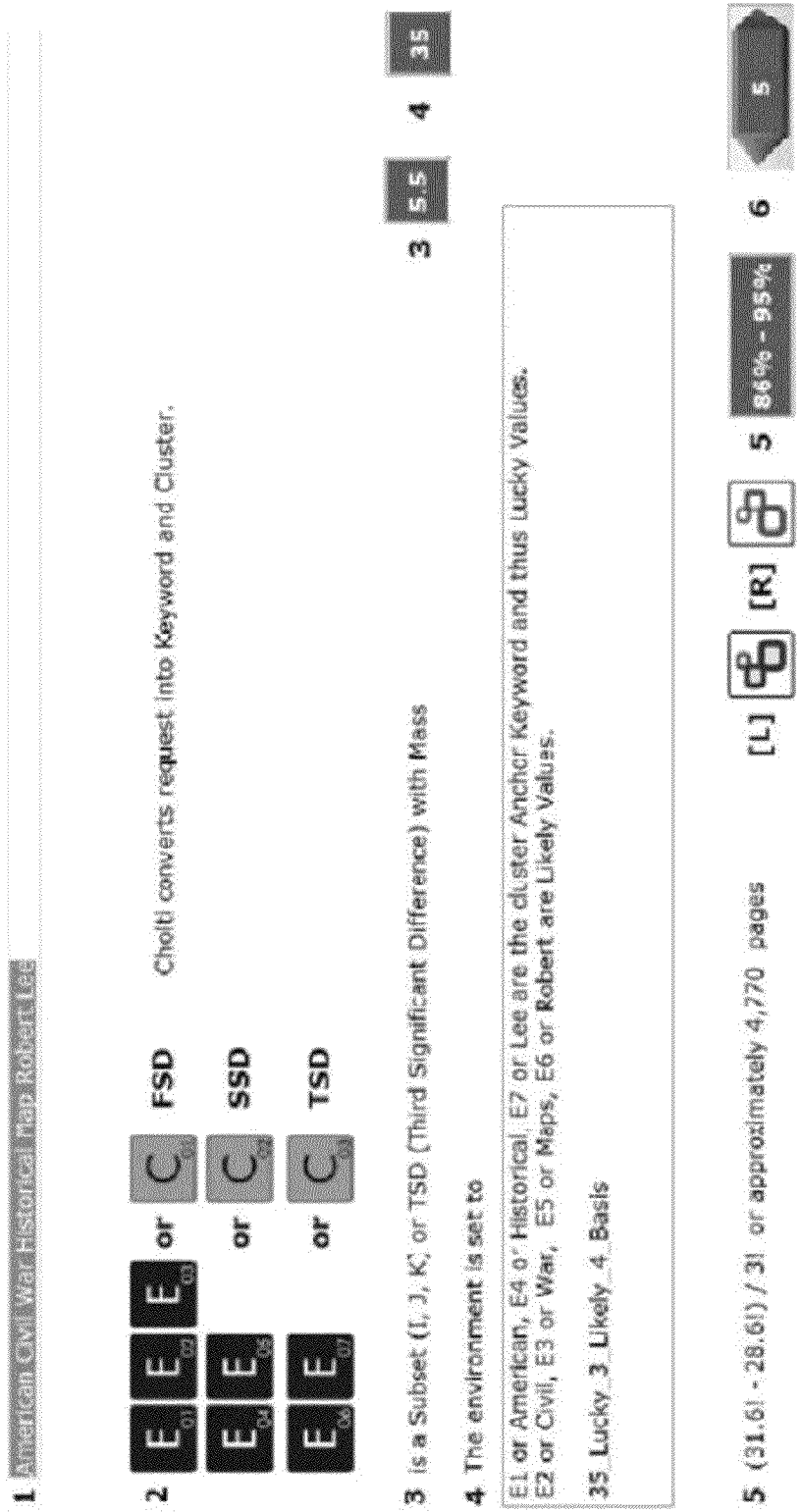
FIG. 14 presents an example representative of a Subset (I, J, K), search with three (3) independent variables.
Figure 15:
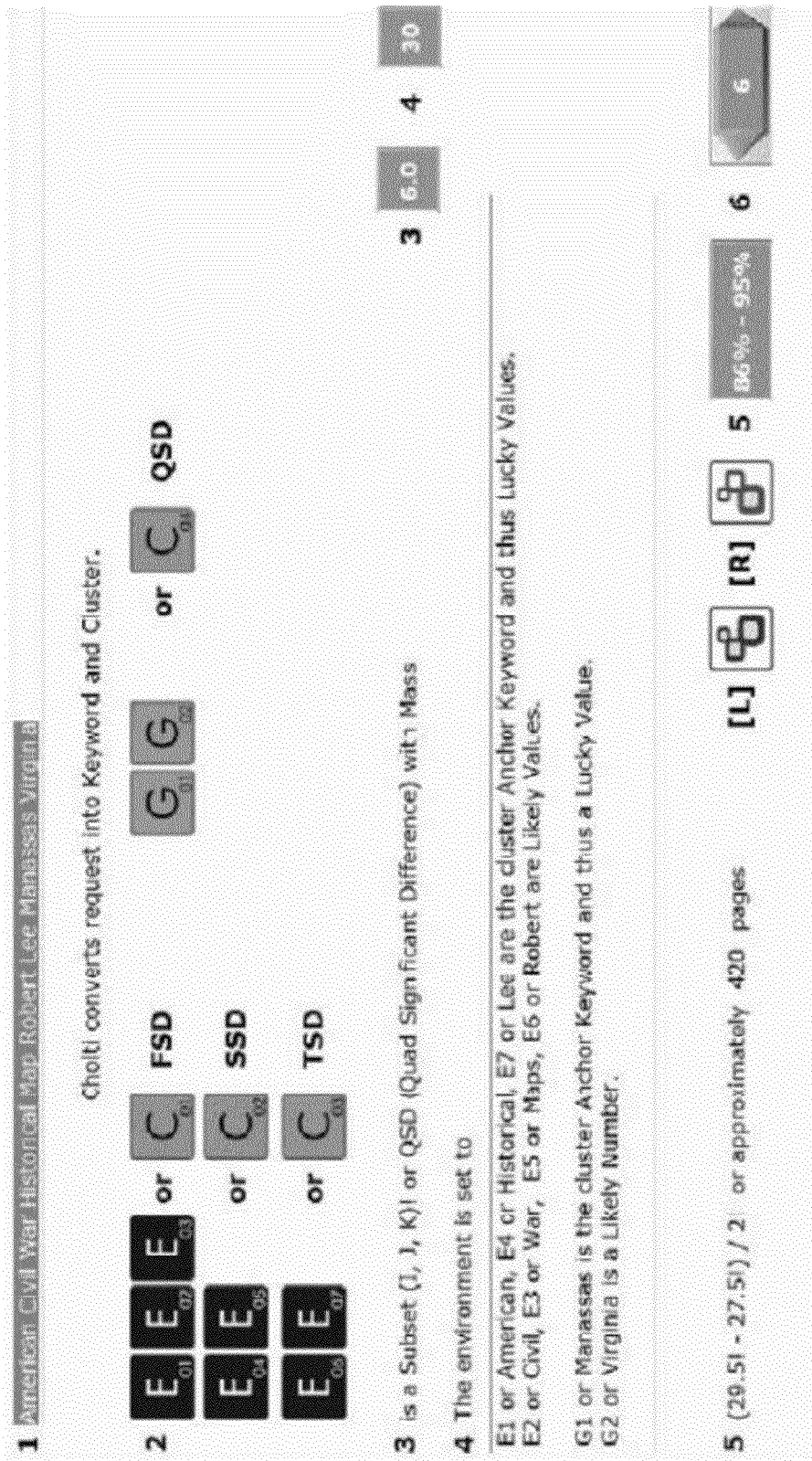
FIG. 15 presents an example representative of a Subset (I, J, K)!, search with 4 independent variables.
Figure 16:
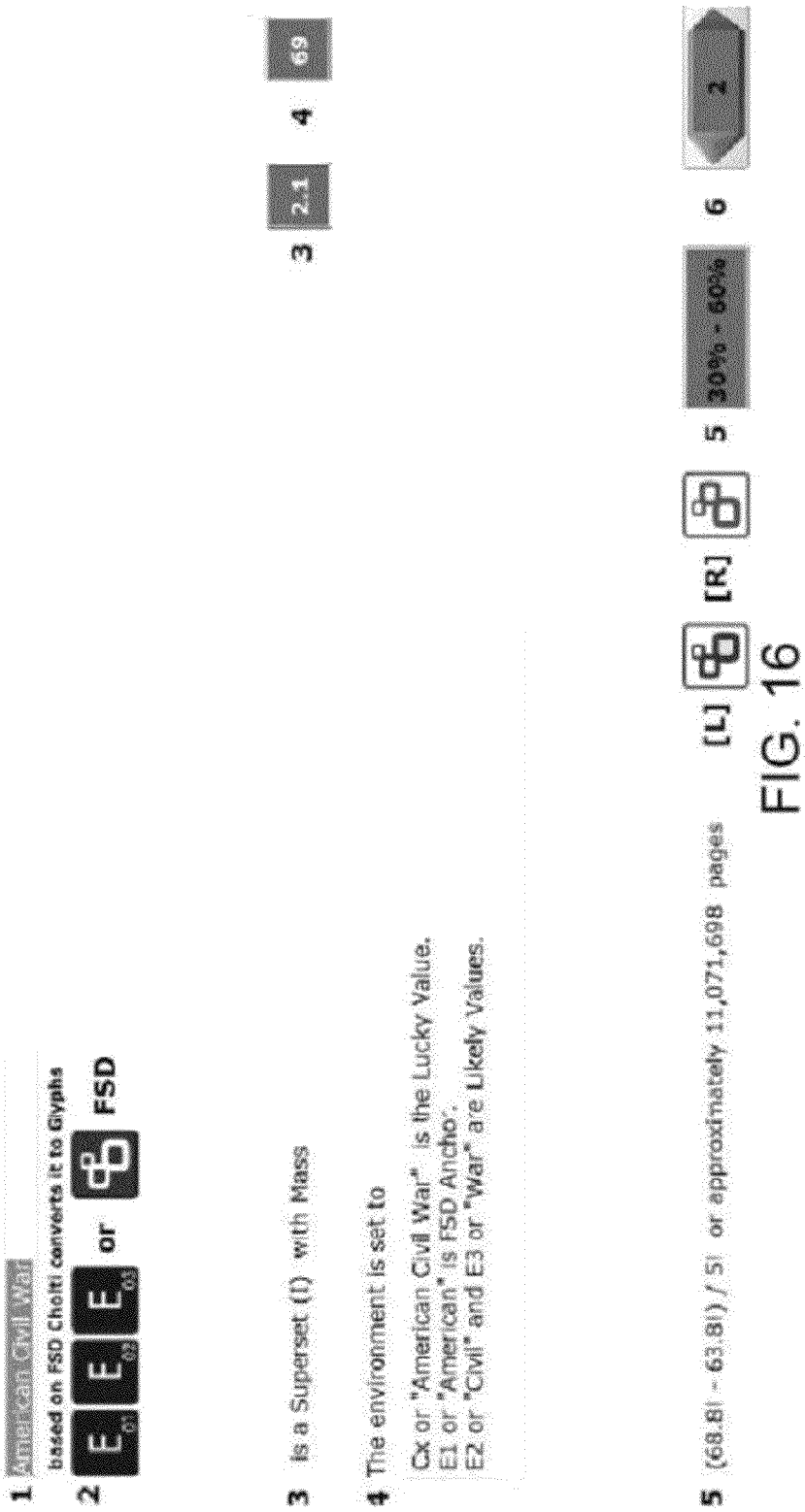
FIG. 16 presents an example representative of a Superset (I) or First Significant Event (FSD)
Figure 17:
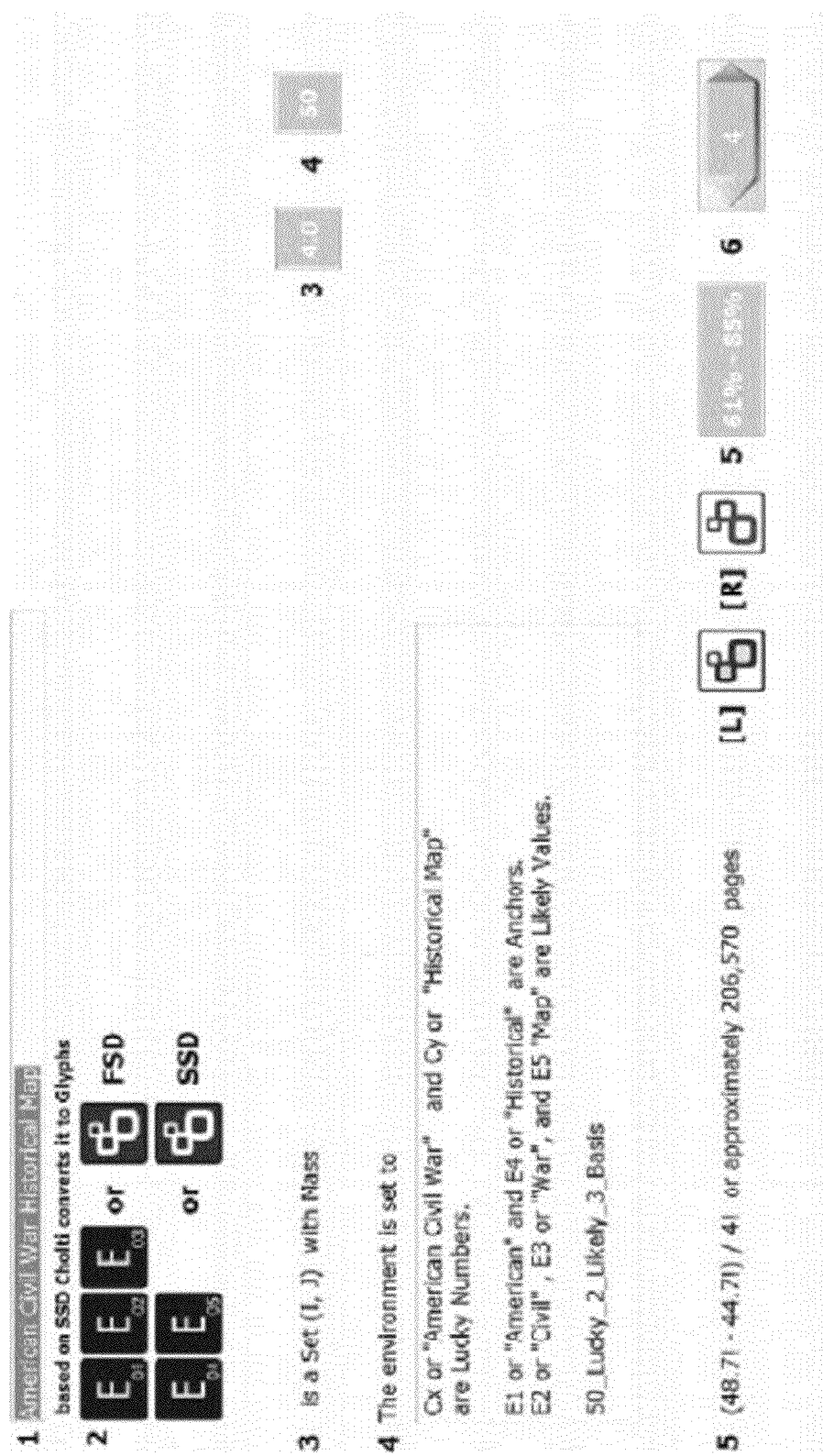
FIG. 17 presents an example representative of a Set (I, J) or Second Significant Event (SSD)

FIG. 1:

Is a system comprising of multiple concurrently subsystems that gather, scan, distill, update and transform the information of the Internet environment (1000). The Internet environment is comprised of over 20 billions of web pages for the English language, and continues to grow at geometric pace.

Search Engine Architecture:

(100) Generic Browser subsystem interacts with end user's to receive input in the form of keywords that in turn become a request messages. The messages are forward chained to a (200) Search Engine subsystem that uses eigenvectors means to find the highest valued web pages based on their exact match, quality, and content.

Boolean Algebra

"Boolean algebra" is a process to identify top (n) results that match a particular request by measuring keyword positioning, and frequency.

Advertisement Means the Lion Share of Revenues (300) The Advertisement Means subsystem is comprised of advertiser's links, banners, and corporate videos that constitute the lion share of revenue of Internet based companies. This subsystem identifies the corporate characteristics of the top (n) results based on request message and media value.

The top (n) results and the optimal advertisements are matched and become the response message that is rearward chained to the Generic Browser. The response message is displayed as output, comprising a plurality of links and advertisements. The Generic Browser may also have (400) a Shopping Cart subsystem technology.

FIG. 2:

Internet Environment (U) in Billions of Web Pages: A conceptual representation of how the billions of web pages belonging to the (1000) Internet is stored, grouped and evenly distributed for maximal efficiency.

Narrow Set Search in Millions of Web Pages

Once an end user finishes creating a request message, it is forward chained to the search engine capacities. A keyword driven eigenvector Narrow Set Search (A) is used to highlight the relevant environment expressed in millions of web pages.

Best Answers

After analysis and filtering of the relevant environment the highest valued web pages are picked and are immediately sent to end user's browser.

Missed Answers (C) Search Engine often leaves valuable missed answers, and is due to their programming that performs tasks lightning fast by oversimplifying the meticulous and resource intensive processes of identifying, validating and verifying the top (n) results.

FIG. 3:

The software (1000) measures the quality of a lottery grid consisting of six (6) numbers (10) as follows (7, 11, 28, 34, 47, 53) with a weight value (20) of 180.

Weight Based Distribution:

The weight based distribution (31) from left to right have the following values (2, 4, 6, 10, 6, 4, 2) that correspond to the following ranges from left to right (6 to 99, 100 to 121, 122 to 143, 144 to 222, 223 to 244, 245 to 266 and 267+).

The grid has a weight value of 180 that resides in the fourth range of the distribution and is highlighted in black with a value of 10. Based on the Weight, Odd-Even, Decimal and Digit Patterns (30) analysis yield a raw value of 10, giving the grid a net value (40) of four (4).

FIG. 4:

The software (1000) measures the quality of a lottery grid comprising of six numbers (10) as follows: (2, 17, 30, 38, 45, 59) with a weight value (20) of 191.

Odd-Even Distribution the odd-even based distribution (32) from left to right (2, 6, 9, 9, 9, 6, 2) that represent the following ranges from left to right 0, 1, 2, 3, 4, 5, and 6 odd numbers. The grid has three odd numbers (17, 45, 59) and thus resides in the fourth range and is highlighted with a value of 9. Based on the Weight, Odd-Even, Decimal and Digit Patterns (30) analysis yield a raw value of 9, giving the grid a net value (40) of three (3).

FIG. 5:

The software (1000) measures the quality of a lottery grid comprising of six numbers (10) as follows (3, 7, 14, 17, 20, 48) with a weight value (20) of 109.

Decimal Distribution:

The decimal based distribution (33) from left to right (−4, 2, 8, 10, 9, 2) that represent the following ranges from left to right 1, 2, 3, 4, 5, and 6 decimals. The grid has three decimals (3, 7), (14, 17, 20) & (48) and resides in the third range of the distribution and is highlighted with a value of 8. Based on the Weight, Odd-Even, Decimal and Digit Patterns (30) analysis yield a raw value of 8, giving the grid a net value (40) of two (2).

FIG. 6:

The software (1000) measures the quality of a lottery grid comprising of six numbers (10) as follows (6, 14, 28, 32, 41, 51) with a weight value (20) of 172.

Digit Distribution:

The digit based distribution (34) from left to right has the following values from left to right (−8, −1, 3, 9, 10, 5) representing the following ranges from left to right 1, 2, 3, 4, 5 and 6 digits. The grid has five digits 1s, 2s, 4s, 6s, and 8s and resides in the fifth range of the distribution with a value of 10. Based on the Weight, Odd-Even, Decimal and Digit Patterns analysis yield a raw value of 10, giving the grid a net value (40) of 4.

FIG. 7:

The software (1000) measures the quality of a lottery grid comprising of six numbers (10) as follows (1, 2, 3, 4, 5, 6)

with a grid weight value (20) of 21. Thus the lottery grid has a weight of 21, 3 odd numbers (1, 3, 5), one (1) decimal and six (6) digits.

Mixed Distributions:

The Weight Pattern (31) yields a weight value of 21 resides in the first distribution with a value of 0. The Odd-Even Pattern (32) yields three odd numbers resides in the fourth distribution with a value of 9. The Decimal Pattern (33) yield one decimal resides in the first distribution with a value of −4. The Digit Pattern (34) yield six digits reside in the sixth distribution with a value of eight (8).

Zero Clusters:

(35) This grid has a Weight Zero Cluster of −4 and a Decimal Zero Cluster of −3, for being improbable. Based on the Weight, Odd-Even, Decimal and Digit Patterns analysis yields a raw value of (17 minus 11) or 6, giving the grid a net value (40) of zero (0).

Summary Value:

(50) Is a summary value of the grid's different patterns and Lucky Numbers are independent variables, which measure the significance difference of each request.

FIG. 8:

Lucky Numbers are independent variables: the software (1000) measures the quality of a lottery grid comprising of six numbers (10) as follows (3, 7, 14, 20, 33, 59) with a grid weight value (20) of 136. (36) Lucky Number seven (7) is an independent variable that is assumed to be an exact match.

The grid has a weight of 136, 4 odds numbers (3, 7, 33, 59), 4 decimals and 5 digits. The Weight Pattern (31) for a grid with a weight value of 136 resides in the third distribution and is highlighted with a value of 8. The Odd-Even Pattern (32) for a grid with four (4) odd numbers resides in the fifth distribution and is highlighted with nine (9).

Lucky Numbers Eliminate Available Distributions:

The first odd number distribution that represents 0 odds numbers is not available, since 7 is an odd number and will always appear. The Decimal Pattern (33) for a grid with four decimals resides in the fourth distribution and is highlighted with 10. The Digit Pattern (34) for a grid with 5 digits resides in the fifth distribution and is highlighted with 10. (35) The grid has no Zero Clusters. Based on the Weight, Odd-Even, Decimal and Digit analysis yields a raw value of 37, giving the grid a net value (40) of ten (10).

Lucky Numbers the Basis for Significant Difference:

(50) Is a summary value of the grid's different patterns and Lucky Numbers are independent variables, which measure the significance difference of each request.

FIG. 9:

Likely Numbers are slightly inaccurate: the software (1000) measures the quality of a lottery grid comprising of six numbers (10) as follows (7, 11, 14, 20, 34, 59) with a grid weight value (20) of 145. (7, 11) are Lucky Numbers (36) and (14, 20, 34, 39) are Likely Numbers (37). Lucky Numbers are assumed to be accurate, whereas Likely Numbers are slightly inaccurate. The grid has a weight of 145, 3 odd numbers, 4 decimals and 5 digits. The Weight Pattern (31) for a grid with a weight value of 145 resides in the fourth distribution and is highlighted with 10. The Odd-Even Pattern (32) for a grid with 3 odd numbers resides in the fourth distribution and is highlighted with nine (9).

The first two (2) number distributions that represent zero and one odds numbers are not available, since (7, 11) are odd numbers and will always appear. The Decimal Pattern (33) for a grid with 4 decimals resides in the fourth distribution and is highlighted with 10. The Digit Pattern (34) for a grid with 5 digits resides in the fifth distribution and is highlighted with 10. (35) The grid has Likely Zero Clusters that improves the value by 1. Based on the Weight, Odd-Even, Decimal and Digit Pattern analysis has a raw value of 40, giving the grid a net value (40) of 10. (50) The summary value of the grid's different patterns.

FIG. 10:

Unlikely Numbers are slightly confounded: The software (1000) measures the quality of a lottery grid comprising of six numbers (10) as follows (3, 7, 11, 33, 48, 59) with a grid weight value (20) of 161. (7, 11, 48) are Lucky Numbers (14, 17, 20, 28, 33, 36, 41, 55, 59) are Likely Numbers (37), and (6, 8, 13, 24, 29, 42, 46, 54, 60) are Unlikely Numbers (38). Lucky Numbers are assumed to be accurate, whereas Likely Numbers are slightly inaccurate, and Unlikely Numbers are slightly confounded.

Thus the grid has a weight of 161, 5 odd numbers, 5 decimals and 5 digits. The Weight Pattern (31) for a grid with a weight value of 161 resides in the fourth distribution and is highlighted with 10. The Odd-Even Pattern (32) for a grid with 5 odd numbers resides in the sixth distribution and is highlighted with 6. The Decimal Pattern (33) for a grid with 5 decimals resides in the fifth distribution and is highlighted with 10. The Digit Pattern (34) for a grid with 5 digits resides in the fifth distribution and is highlighted with 10. (35) The grid has no Zero Clusters.

The 3 Lucky Numbers have eliminated many distributions. Based on the Weight, Odd-Even, Decimal and Digit Pattern analysis has a raw value of 36, giving the grid a net value (40) of 9. (50) The summary value of the grid's different patterns.

FIG. 11:

Never Numbers are confounded: the software (1000) measures the quality of a lottery grid comprising of six numbers (10) as follows (3, 7, 11, 24, 48, 59) with a grid weight value (20) of 152. (7, 11, 24, 48) are Lucky Numbers, (3, 14, 19, 27, 30, 33, 36, 41, 44, 52, 57, 59) are Likely Numbers (37), (10, 17, 26, 28, 32, 40, 42, 47, 49, 51, 54, 60) are Unlikely Numbers (38), (1, 5, 16, 18, 22, 29, 31, 35, 46, 50, 55, 58) are Never Numbers (39). Lucky Numbers are assumed to be accurate, whereas Likely Numbers are slightly inaccurate, Unlikely Numbers are slightly confounded, and Never Numbers are confounded.

The grid has a weight of 152, 5 odd numbers, 5 decimals and 5 digits. The Weight Pattern (31) for a grid with a weight value of 152 resides in the fourth distribution and is highlighted with 10. The Odd-Even Pattern (32) for a grid with 4 odd numbers resides in the fifth distribution and is highlighted with 9. The Decimal Pattern (33) for a grid with 5 decimals resides in the fifth distribution and is highlighted with 10. The Digit Pattern (34) for a grid with six (6) digits resides in the sixth distribution and is highlighted with 10. (35) The grid has a Likely Zero Cluster that improves the value by one.

Never Numbers Help Eliminate Distributions:

The 4 Lucky Numbers and 12 Never Numbers have eliminated many distributions. Based on the Weight, Odd-Even, Decimal and Digit Pattern analysis has a raw value of 40, giving the grid a net value (40) of 10. (50) The summary value of the grid's different patterns.

FIG. 12:

Superset (I); Cholti software measures the quality of an end user request and (1) types the following request: "American Civil War". (2) Cholti transforms the request into keywords E1 or American, E2 or Civil and E3 or War, and finds and converts a keyword combination into cluster C1 or (E1+E2+E3) or American Civil War.

The Mass of each request reflects Accuracy Percentage: (3) The cluster has a mass of 2.1 and is thus a Superset (I) with FSD accuracy. Independent variable (I) is C1. (4) E1 or American is the cluster Anchor keyword or Lucky Number or independent variable expressed as 69_Lucky__1_Likely__1. (5) The accuracy is about 30% to 60% and the environment is: (68.8!−63.8!)/5! or 11,071,698 web pages. (6) The quality for this request is two (2).

FIG. 13:

Set (I, J); Cholti software measures the quality of an end user request and (1) types the following request: "American Civil War Historical Maps". (2) Cholti transforms the request into keywords E1 or American, E2 or Civil, E3 or War, E4 or Historical, and E5 or Map, and finds and converts keyword combinations into clusters C1 or (E1+E2+E3) or American Civil War and C2 or (E4+E5) or Historical Map.

(I) and (J) are Independent Variables:

(3) The 2 clusters have a mass of 4.0 and are thus a Set (I, J) with SSD accuracy. Independent variable (I) is C1 and (J) is C2. (4) E1 or American and E4 or Historical are the cluster Anchor keywords or Lucky Numbers or independent variables expressed as 50_Lucky__2_Likely__3. (5) The accuracy is about 61% to 85% and the environment is (48.7!−44.7!)/4! or 206,570 web pages. (6) The quality for this request is four (4).

FIG. 14:

Subset (I, J, K); Cholti software measures the quality of an end user request and (1) types the following request: "American Civil War Historical Maps Robert Lee". (2) Cholti transforms the request into keywords E1 or American, E2 or Civil, E3 or War, E4 or Historical, E5 or Map, E6 or Robert and E7 or Lee, and finds and converts keyword combinations into clusters C1 or (E1+E2+E3) or American Civil War, C2 or (E4+E5) or Historical Map and C3 or (E6+E7) or Robert Lee.

Levels of Significance Difference is related to (I), (J) & (K): (3) The 3 clusters have a mass of 5.5 and are thus a Subset (I, J, K) with TSD accuracy. Independent variable (I) is C1, (J) is C2 and (K) is C3. (4) E1 or American, E4 or Historical and E7 or Lee are the cluster Anchor keywords or Lucky Numbers or independent variables expressed as 35_Lucky__3_Likely__4. (5) The accuracy is about 86% to 95%, and the environment is (31.6!−28.6!)/3! or 4,770 web pages. (6) The quality for this request is 5.

FIG. 15:

Subset (I, J, K)!; Cholti software measures the quality of an end user request and (1) types the following request: "American Civil War Historical Maps Robert Lee Manassas Va.". (2) Cholti transforms the request into keywords E1 or American, E2 or Civil, E3 or War, E4 or Historical, E5 or Map, E6 or Robert, E7 or Lee, G1 or Manassas, and G2 or Virginia and finds and converts keyword combinations into clusters C1 or (E1+E2+E3) or American Civil War, C2 or (E4+E5) or Historical Map, C3 or (E6+E7) and C4 or (G1+G2) or Manassas Va.

(X) is a Geospatial Independent Variable:

(3) The 4 clusters have a mass of 6.0 and is thus a Subset (I, J, K)! with QSD accuracy. Independent variable (I) is C1, (J) is C2, (K) is C3 and (X) is C4. (4) E1 or American, E4 or Historical, E7 or Lee and G2 or Manassas are the cluster Anchor keywords or Lucky Numbers or independent variables expressed as 30_Lucky__4_Likely__5. (5) The accuracy is about 86% to 95%, and the environment is: (25.2!−23.2!)/2! or 420 web pages. (6) The quality for this request is six (6).

Cholti Conversions into Super Glyphs

FIG. 16:

Superset (I) or FSD; Cholti software measures the quality of an end user request and (1) types: "American Civil War". (2) Cholti converts the request into keywords E1 or American, E2 or Civil and E3 or War, then groups keyword combination into cluster C1 or (E1+E2+E3) or American Civil War that becomes Super Glyph Cx. (3) C1 has a mass of 2.1 and is thus a Superset (I) with FSD accuracy. Independent variable (I) is Cx.

FSD Requests Accuracy is between 30% to 60%: (4) E1 or "American" is the cluster Anchor keyword or Lucky Number or independent variable expressed as 69_Lucky__1_Likely__1. (5) The accuracy is about 30% to 60%, and the environment is: (68.8!−63.8!)/5! or 11,071,698 web pages. (6) The quality for this request is two (2).

FIG. 17:

Set (I, J) or SSD; Cholti software measures the quality of an end user request and (1) types: "American Civil War Historical Maps". (2) Cholti transforms the request into keywords E1 or American, E2 or Civil, E3 or War, E4 or Historical, and E5 or Map, and then groups keyword combinations into clusters C1 or (E1+E2+E3) or American Civil War and C2 or (E4+E5) or Historical Map and then converts them into Super Glyphs Cx and Cy. (3) The two (2) clusters have a mass of 4.0 and is thus a Set (I, J) with SSD accuracy. Independent variable (I) is Cx and (J) is Cy.

SSD Requests Accuracy is between 61% to 85%: (4) E1 or American and E4 or Historical are the cluster Anchor keywords or Lucky Numbers or independent variables expressed as 50_Lucky__2_Likely__3. (5) The accuracy is about 61% to 85%, and the environment is: (48.7!−44.7!)/4! or 206,570 web pages. (6) The quality for this request is four (4).

Figure 18:
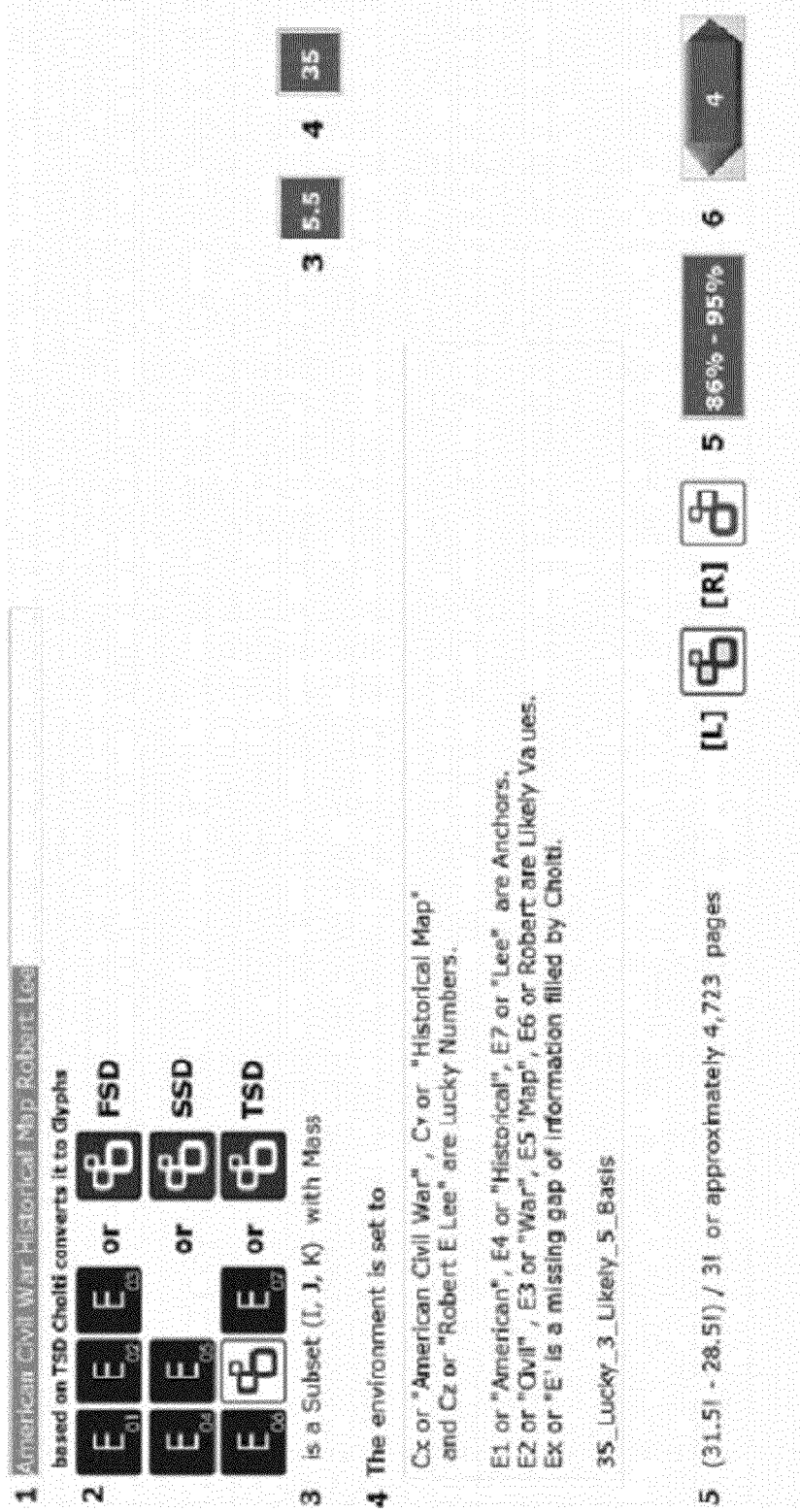
FIG. 18 presents an example representative of a Subset (I, J, K) or Third Significant Event (TSD)
Figure 19:
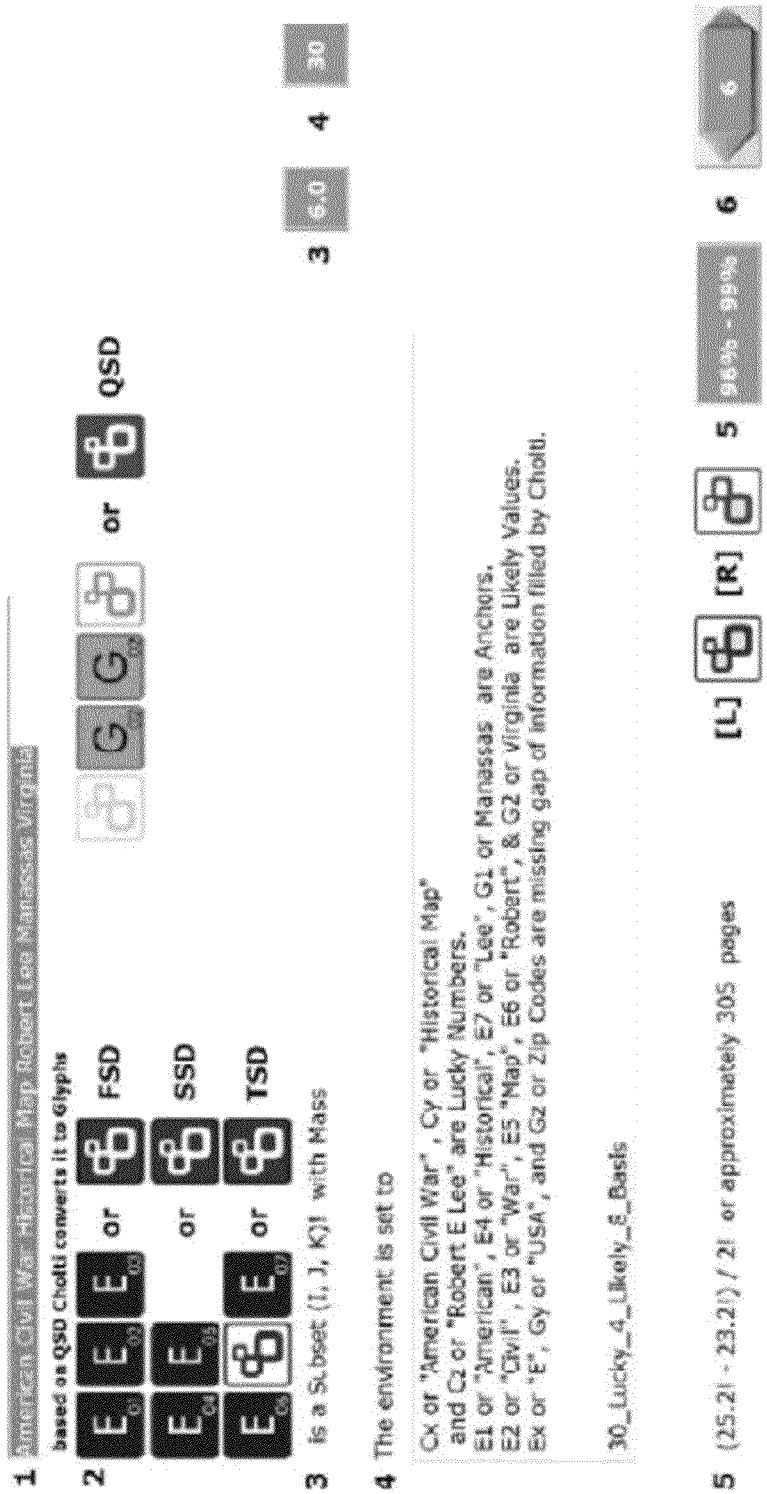
FIG. 19 presents an example representative of a Subset (I, J, K)! or Quad Significant Event (QSD)
Figure 23:
FIG. 23 presents an example representative of a QSD or Subset (I, J, K)!

FIG. 18 Subset (I, J, K) or TSD; Cholti software measures the quality of an end user request and (1) types: "American Civil War Historical Maps Robert Lee". (2) Cholti transforms the request into keywords E1 or American, E2 or Civil, E3 or War, E4 or Historical, E5 or Map, E6 or Robert and E7 or Lee, and then groups keywords combinations into clusters C1 or (E1+E2+E3) or American Civil War, C2 or (E4+E5) or Historical Map and C3 or (E6+E7) or Robert Lee and then converts them into Super Glyphs Cx, Cy and Cz.

Cholti finds and Identifies Missing Gaps of Information: Cholti finds and identifies a missing gap of information "E" or Ex and updates Cz to (E6+Ex+E7) or Robert E Lee. (3) The 3 clusters have a mass of 5.5 and is a Subset (I, J, K) with TSD accuracy. Independent variable (I) is C1, (J) is C2 and (K) is C3.

TSD Requests Accuracy is between 86% to 95%: (4) E1 or American, E4 or Historical and E7 or Lee is the cluster Anchor keywords and independent variables expressed as 35_Lucky__3_Likely__5. (5) Accuracy is about 86% to 95%, and the environment is: (31.5!−28.5!)/3! or 4,723 web pages. (6) The quality for this request is five (5).

FIG. 19:

Subset (I, J, K)! or QSD; Cholti software measures the quality of an end user request and (1) types: "American Civil War Historical Maps Robert Lee Manassas Va.". (2) Cholti transforms the request into keywords and groups keywords combinations into clusters C1 or (E1+E2+E3) or American Civil War, C2 or (E4+E5) or Historical Map, C3 or (E6+E7) and C4 or (G1+G2) and then converts them into Cx, Cy, Cz and Gx.

Cholti finds and identifies the missing gaps of information "E" or Ex, "USA" or Gy and Zip Code Range {x} or Gz and updates Cz to (E6+Ex+E7) or Robert E Lee and Gx to ((Gy+G1+G2)|Gz). (3) The 4 clusters have a mass of 6.0 and is a Subset (I, J, K)! with QSD accuracy. Independent variable (I) is Cx, (J) is Cy, (K) is Cz and (X) is Gx.

QSD Requests Accuracy is about 96% to 99%: (4) E1 or American, E4 or Historical, E7 or Lee and G2 or Manassas is cluster Anchor keywords or Lucky Numbers or independent variables expressed as 30_Lucky__4_Likely__8. (5) The accuracy is about 96% to 99%, and the environment is: (25.2!−23.2!)/2! or 305 web pages. (6) The quality for this request is six (6).

Super Glyph Procedures:

FIG. 20:

FSD or Superset (I); Cholti measures 7 consecutive requests (1) as follows: a) Blue and Gray, b) Session, c) Union and Confederates, d) War, e) Civil War, f) War between the States, g) American Civil War. (2) Cholti transforms the requests into keywords E1 or Blue, E2 or Gray, E3 or Session, E4 or Union, M1 or Confederates, E5 or War, E6 or Civil, E7 or States, E8 or American, then groups keyword combination into clusters C1 or (E6+E5) or Civil War, C2 or (E5+D1+E7) or War between the States, C3 or (E8+E6+E5) or American Civil War and then converts C1, C2, C3 into Cx, Cy, Cz.

Managerial Hierarchical Relationship Indices:

(3) The Managerial Hierarchical Relationship Indices has a mass of 2.1 and is thus a Superset (I) with FSD accuracy. Independent variable (I) is Cx. (4) E5 or "War" is the cluster Anchor keyword or independent variable that can be expressed as 65_Lucky__1_Likely__8. (5) The accuracy percentage is about 30% to 60%, with an approximate environment size of (63.2!−58.2!)/5! or 7,144,895 web pages. (6) The quality for this request is two (2).

FIG. 21:

SSD or Set (I, J); Cholti measures 7 consecutive requests (1) as follows: a) Historical Maps, b) Session, c) Union and Confederates, d) Military Maps, e) Civil War, f) War between the States, g) American Civil War Military Maps. (2) Cholti converts the requests into keywords.

The Optimizer then groups keyword combination into clusters C1 or (E6+E7) or Civil War, C2 or (E7+D1+E8) or War between the States, C3 or (E9+E6+E7) or American Civil War, C4 or (E1+E2) or Historical Maps, C5 or (E5+E2) or Military Maps and then converts C1, C2, C3 into Cx, Cy, Cz and C4, C5 into Ca and Cb.

Anchor Keywords are the Independent Variables:

(3) The 2 Managerial Hierarchical Relationship Indices have a mass of 3.5 and is thus a Set (I, J) with SSD accuracy. Independent variable (I) is Cx and (J) is Cb. (4) E7 or War and E5 or Military are the cluster Anchor keywords and independent variables that can be expressed as 65_Lucky__1_Likely. (5) The accuracy percentage is about 61% to 85%, with an approximate environment size of (52.2!−48.2!)/4! or 275,041 web pages. (6) The quality for this request is three (3).

FIG. 22:

TSD or Subset (I, J, K); Cholti measures 7 consecutive requests (1) as follows: a) Historical Maps, b) Session, c) Robert E Lee, d) Military Maps, e) Civil War, f) War between the States, and g) American Civil War Robert E Lee Military Maps. (2) Cholti converts the requests into keywords E1 or Historical, E2 or Maps, E3 or Session, E4 or Robert, E5 or Lee, E6 or Military, E7 or Civil, E8 or War, E9 or States, E10 or American.

The Optimizer then groups keyword combination into clusters C1 or (E7+E8) or Civil War, C2 or (E8+E9) or War between the States, C3 or (E10+E7+E8) or American Civil War, C4 or (E1+E2) or Historical Map, C5 or (E6+E2) or Military Map, C6 or (E4+E5) or Robert E Lee and then converts C1, C2, C3 into Cx, Cy, Cz, C4, C5 into Ca, Cb, and C6 into Cc.

An Independent Variable can be a Nested Cluster:

(3) The three (3) nested clusters have a mass of 5.5 and is thus a Subset (I, J, K) with TSD accuracy. Independent variable (I) is Cx, (J) is Cc and (K) is Cb. (4) E7 or War, E5 or Lee and E6 or Military are the cluster Anchor keywords and the independent variables that can be expressed as 35_Lucky__3_Likely__7. (5) Accuracy is about 86% to 95%, with (31.3!−28.3!)/3! or 4,631 web pages. (6) The quality for this request is five (5).

FIG. 23:

QSD or Subset (I, J, K)!; Cholti measures 7 consecutive requests (1) as follows: a) Historical Maps, b) Gettysburg, c) Robert E Lee, d) Military Maps, e) Civil War, f) War between the States Maps, and g) American Civil War Robert E Lee Military Map Gettysburg. The 'HIVE' identifies G2 or USA, G3 or Pennsylvania and G4 or Zip Code ranges.

Super Glyphs can be Nested Clusters:

Cholti converts the requests into keywords. Then groups keyword combination into clusters C1 or (E6+E7) or Civil War, C2 or (E7+E8) or War between the States, C3 or (E9+E6+E7) or American Civil War, C4 or (E1+E2) or Historical Map, C5 or (E5+E2) or Military Map, C6 or (E3+E4) or Robert E Lee, C7 or (G2+G3+(G11 G4)) or USA Pennsylvania (Gettysburg|Zip Code Ranges).

The optimizer converts C1, C2, C3 into Cx, Cy, Cz, C4, C5 into Ca, Cb, C6 into Cc, and C7 into Cd that is geospatial.

Super Glyph's Anchor Keywords become the Independent Variables: (3) The Managerial Hierarchical Relationship Indices have a mass of 6.0 and is thus a Subset (I, J, K)! with FSD accuracy. Independent variable (I) is Cx, (J) is Cc and (K) is Cd. (4) E7 or War, E4 or Lee, E5 or Military, and G1 or Gettysburg are the cluster Anchor keywords and independent variables that can be expressed as 30_Lucky__4_Likely__8. (5) Accuracy is about 96% to 99% with (25.2!−23.2!)/2! or 305 web pages. (6) The quality for this request is six (6).

FIG. 24:

Cholti Super Glyph Relationships; Cholti measures 7 consecutive requests (1) as follows: a) (E1+E2)+E3, b) (E1+E2)+G1+E3, c) (E1+E2+E4)+G1+E3+E5, d) (E1+E2+E4)+(E3+E6)+G1+E7, e) (E1+E2+E4)+(E3+E6)+G1+G3, f) (E1+E2+E4)+(E3+E6)+(E5+E7)+G1, g) (E1+E2+E4)+(E3+E6)+(E5+E7)+(G1+G2). (2) The simulated keywords are transformed into E1, E2, E3, E4, E5, E6, E7, G1, G2 and G3, and (3) then group into clusters C1 or (E1+E2+E4), C2 or (E3+E6), C3 or (E5+E7), and C4 or (G1+G2). The size of the environment or Internet or (U) has billions of web pages.

The "HIVE" assigns all the linguistic keywords into a Managerial Hierarchical Relationship Indices, and does the same for geospatial keywords.

Filters of the Environment:

American Civil War or (X) is the primary filter, which is an event and is directly linked with (Y) that is a time dimension. For example, American Civil War {"1863"}. Historical Battle or (A) is the secondary filter, which is a person and is directly linked with (B) that is a historical person. E.g. General {"Robert E Lee"}. (C) is the tertiary filter, which is a battlefield that is direct related with (D) that is a geographic location. 3a: For example: Historical Battle {"Gettysburg"}.

Use Set Theory to Determine Association:

The "HIVE" uses set theory to determine if the different clusters are associated. 3b: E.g. (X) is related to (A) that is also related to Gettysburg. For example: 1863 is related to Historical Leader that is directly related with Gettysburg, the historical battle. 3a is the Left Brain analysis, and 3b is the Right Brain analysis.

Association Steps and Procedures:

(4) The first steps and procedures of the Triangulation Deductive Reasoning (TDR) is to associate the top 12 keywords related to 3a) and 3b), which is a filter mechanism to create best fit environment expressed in millions of web pages.

The "HIVE" Reorganizes the Session:

(5) The "HIVE" match/merges 3a) and 3b) and then valorizes each Super Glyph representing keywords and clusters for the given session, comprised of requests 1 through 7, and determines for each Super Glyph if it is a independent variable and/or Lucky, Likely, Regular or Unlikely Number.

Significant Difference Levels

FIG. 25:

FSD or Superset (I); Cholti software measures a FSD session comprising 7 consecutive requests (1) as follows: a) Blue and Gray, b) Session, c) Union and Confederates, d) War, e) Civil War, f) War between the States, g) American Civil War. Cholti transforms the session into keywords E1 or Blue, E2 or Gray, E3 or Session, E4 or Union, M1 or Confederates, E5 or War, E6 or Civil, E7 or States, E8 or American.

The Optimizer then groups keyword combination into clusters C1 or (E6+E5) or Civil War, C2 or (E5+D1+E7) or War between the States, C3 or (E8+E6+E5) or American Civil War and converts (C1, C2, C3) into Cx, Cy, Cz. (2) The "HIVE" determines that Cx, Cy and Cz are directly related to the category Historical Events{ }.

FSD Requests Mass Range from 1.0 to 3.0: (3) The Managerial Hierarchical Relationship Index has a mass of 3.0 and is thus a Superset (I) with FSD accuracy. Independent variable (I) is Cx based on end user's weight value. (4) E5 or War is the Anchor keyword for the event and is considered an independent variable that can be expressed as 60_Lucky_1_Likely_8. (5) The accuracy percentage is about 30% to 60%, with an environment of: (58.2!−53.2!)/5! or 4,664,579 web pages. (6) The quality for this request is 3.

FIG. 26:

SSD or Set (I, J); Cholti software measures a SSD session comprising seven (7) consecutive requests (1) as follows: a) Blue and Gray, b) Session, c) Union and Confederates, d) War, e) Civil War, f) War between the States, g) American Civil War Historical Maps. Cholti transforms the session into keywords E1 or Blue, E2 or Gray, E3 or Session, E4 or Union, M1 or Confederates, E5 or War, E6 or Civil, E7 or States, E8 or Historical.

The Optimizer then groups keyword combinations into clusters C1 or (E6+E5) or Civil War, C2 or (E5+D1+E7) or War between the States, C3 or (E8+E6+E5) or American Civil War and then converts (C1, C2, C3) into (Cx, Cy, Cz) and C4 into Ca. (2) The "HIVE" determines the following direct relationships categories (Cx, Cy, Cz) into Historical Events{ }, and Ca into Product Object{ }.

SSD Requests Mass Range from 3.01 to 5.0: (3) The 2 Managerial Hierarchical Relationship Indices have a mass of 3.5 and becomes a Set (I, J) with SSD accuracy. Independent variable (I) is Cx and (J) is Ca based on end user's weighted value.

(4) E5 or War and E8 or Historical are the cluster Anchor keywords or independent variables expressed as 55_Lucky_2_Likely_8. (5) The accuracy is about 61% to 85%, with an environment of: (52.2!−48.2!)/4! or 275,041 web pages. (6) The quality for this request is three (3).

FIG. 27:

TSD or Subset (I, J, K); Cholti software measures a TSD session comprising seven (7) consecutive requests (1) as follows: a) Historical Maps, b) Military Maps, c) War Military Maps, d) Civil War, e) War between the States, f) Robert E Lee Civil War, g) American Civil War Robert E Lee Military Maps. Cholti transforms the session into keywords E1 or Historical, E2 or Maps, E3 or Military, E4 or War, E5 or Civil, E6 or States, E7 or Robert, E8 or Lee, and E9 or American.

The optimizer then groups keyword combinations into clusters C1 or (E5+E4) or Civil War, C2 or (E4+E6) or War between the States, C3 or (E9+E5+E4) or American Civil War, C4 or (E1+E2) or Historical Maps, C5 or (E3+E2) or Military Maps, C6 or (E7+E8) or Robert E Lee and then converts (C1, C2, C3) into (Cx, Cy, Cz), (C4, C5) into (Ca, Cb) and C6 into Cc. (2) The "HIVE" determines the following direct relationships categories (Cx, Cy, Cz) into Historical Events{ }, (Ca, Cb) into Product Object{ } and Cc into Historical Person{ }.

TSD Requests Mass Range from 5.01 to 6.0: (3) The 3 Managerial Hierarchical Relationship Indices have a mass of 5.9 and becomes a Subset (I, J, K) with TSD accuracy. Independent variable (I) is Cx, (J) is Cc and (K) is Cb based on end user's weighted value. (4) E7 or War, E5 or Lee and E6 or Military are the cluster Anchor keywords and independent variables expressed as 31_Lucky_3_Likely_6. (5) The accuracy is about 86% to 95%, with an environment of: (27.4!−24.4!)/3! or 3,062 web pages. (6) The quality for this request is five (5).

FIG. 28:

QSD or Subset (I, J, K)!; Cholti software measures a QSD session comprising 7 consecutive requests (1) as follows: a) Historical Maps, b) Military Maps, c) War Military Maps, d) Civil War, e) War between the States, f) Robert E Lee, g) American Civil War Robert E Lee Military Map Gettysburg. The 'HIVE' identifies G2 or USA, G3 or Pennsylvania and or G4 Zip Code ranges. Cholti transforms the session into keywords E1 or Historical, E2 or Maps, E3 or Military, E4 or War, E5 or Civil, E6 or States, E7 or Robert, E8 or Lee, E9 or American and G1 or Gettysburg.

The Optimizer then groups keyword combinations into clusters C1 or (E5+E4) or Civil War, C2 or (E4+E6) or War between the States, C3 or (E9+E5+E4) or American Civil War, C4 or (E1+E2) or Historical Maps, C5 or (E3+E2) or Military Maps, C6 or (E7+E8) or Robert E Lee and G1 or Gettysburg and then converts (C1, C2, C3) into (Cx, Cy, Cz), (C4, C5) into (Ca, Cb), C6 into Cc.

Expanding Geospatial Information:

The Optimizer inserts missing gaps of information and converts C7 into Cd or (G2+G3+(G1|G4)) or USA Pennsylvania (Gettysburg|Zip Code Ranges). (2) The "HIVE" identifies the following direct relationships categories: (Cx, Cy, Cz) into Historical Event{ }, (Ca, Cb) into Product Object{ }, Cc into Historical Person{ } and Cd into Geodata{ }.

An Event is two Directly Related Independent Variables: (3) The Managerial Hierarchical Relationship Indices have a mass of 6.5 and is thus a Subset (I, J, K)! with QSD level of accuracy. Independent variable (I) is Cx, (J) is Cc, (K) is Cb and (X) is Cd based on end user's weighted value. The "HIVE" integrates the directly related (I+X) independent variables into Event (I!).

Events can Also be Expanded:

Thus, Historical Event {Cx|Cy|Cz} plus Geodata {Cd} yields Historical Battle {Gettysburg}. Since Historical Battle is comprised of Cx, Cy and Cz then American Civil War {Gettysburg}, Civil War {Gettysburg} and War between the States {Gettysburg} are the valid filters.

QSD Requests Mass Range from 6.01 to 6.5: E4 or "War", E7 or "Lee", E3 or "Military", and G1 or "Gettysburg" is the cluster Anchor keywords and independent variables expressed as 25_Lucky_4_Likely_8. (5) The percentage is about 96% to 99% with an environment of: (20.2!−18.2!)/2! or 194 web pages. (6) The quality for this request is six (6).

FIG. 29:

PSD or Subset (I, J, K)!!; Cholti software measures a PSD session comprising 7 consecutive requests (1) same as FIG. 27 except in (2) The "HIVE" identifies the following direct relationships categories: (Cx, Cy, Cz) into Historical Event{ }, (Ca, Cb) into Product Object {Ca|Cb}, Cc into Historical Person{ } and Cd into Geodata {Cd}.

PSD Requests Mass Range from 6.51 to 6.9: (3) The Managerial Hierarchical Relationship Indices have a mass of 6.9 and is thus a Subset (I, J, K)!! with PSD level of accuracy. Independent variable (I) is Cx, (J) is Cc, (K) is Cb and (X) is Cd based on end user's weighted value. The "HIVE" integrates the directly related (I+X) independent variables into Event (I!).

Thus, Historical Event {Cx|Cy|Cz}+Geodata {Cd} yields Historical Battle {Gettysburg}. Historical Person {C6} becomes (J!) Military Leader {ARobert E Lee"} or General {ARobert E Lee"} Event. (K) is (Historical Maps|Military Maps|Order of Battle).

E4 or War and G1 or Gettysburg, General {ARobert E Lee"}, and E2 or Maps are the cluster Anchor keywords and independent variables expressed as 21_Lucky_5_Likely_8. (5) The accuracy is 99%, with an environment of: (15.2!–14.2!)/1! or 15 web pages. (6) The quality for this request is six (6).

Figure 28:
FIG. 28 presents an example representative of a QSD or Subset (I, J, K)! analysis of seven (7) requests.

FIG. 30:

HSD or Subset (I, J, K)!!!; Cholti software measures a HSD session comprising 7 consecutive requests (1) same as FIG. 28 except in (2) "Robert E Lee" is transformed into General{ARobert E Lee"} the Military Leader event, Gettysburg into Historical Battle{AGettysburg"} event.

The Optimizer also transforms Map and EXACT DATA or I1 are matched/merged into Map{AEXACT DATA"} Event. The independent variables are as follows: (I!)=American Civil War{AGettysburg"}, (J!)=General{ARobert E Lee"}, and (K!)=Map {AEXACT DATA"} Events.

Exact Data Yields the Final Destination:

(3) The Managerial Hierarchical Relationship Indices have a mass of 7 and is thus a Subset (I, J, K)!!! with HSD accuracy or certitude. Independent variable (I!) is Map{AEXACT DATA"}, (J!) is General{ARobert E. Lee"}, (K!) is Historical Event {Cx|Cy|Cz} plus Geodata {Cd} that yields Historical Battle {Gettysburg}.

Historical Battle{AGettysburg"}, General{ARobert E Lee"} and Map {AEXACT DATA"} are the independent variables expressed as 10_Lucky_6.

HSD Requests Mass is 7 or Certain:

Once the 'HIVE' identifies 6 independent variables the equation is exact nothing follows. (5) The accuracy is 100%, with an environment of exactly 1 web page. (6) The quality for this request is 7 or certain. EXACT DATA or I1 is a Zero Cluster!

Dynamic Values that Exceed Traditional Limits

FIG. 31:

Cholti Super Glyph Hot & Cold Analysis; (Relevance Steps and Procedures) As in FIG. 24 Cholti created a (1) Block of the Internet that is expressed in Million of web pages. The second steps and procedures of TDR further dilute the valid environment based on frequency and relevance or Hot & Cold Analysis.

The "HIVE" Finds Missing Gaps of Information: (2) The "HIVE" reorganizes the Association page. (3) The "HIVE" assigns the most probable object within the Block that is directly related to the 4 Lucky Numbers identified in (1). (4) After finding the missing gaps of information "HIVE" will identify the best fit Sub Block that further dilute the size of the environment in thousands of web pages based on the Significant Difference level of the session.

The "HIVE" Improves the Information Entropy of the Session: (5) The "HIVE" match/merges the existing Super Glyphs from (1) plus the missing gaps of information and Related Objects from (3) to improve the Informational Entropy of the session. (6) The "HIVE" performs the Hot & Cold Analysis of Related Objects that yields the best-fit Sub Block.

Personalized Dynamic Sessions

Figure 25:
FIG. 25 presents an example representative of a FSD or Superset (I) analysis of seven (7) requests.

FIG. 32:

Hot & Cold FSD or Superset (I) (1) As in FIG. 25 the "HIVE" analyzes a session comprised of 7 requests, and (2) transforms the keywords into Super Glyphs. Left Brain analysis identifies independent variables: Cx or Civil War, Cy or War between States and Cz or American Civil War as being independent (I) or Superset (I). (I) becomes Historical Event {Cx|Cy|Cz}.

Irrelevant Keywords are Identified:

(3) The "HIVE" finds the missing gaps of information and then performs the Hot and Cold Analysis and determines that keywords Mexican, Spanish and Russian are irrelevant to improve the Managerial Hierarchical Relationship Indices with Mass 3.0.

Block:

(4) 60_Lucky_1_Never_3_Likely_8 best describes the Block. (5) The accuracy is about 30% to 60%, with an environment of: (55.2!–50.2!)/5! or 3,544,943 web pages. (6) The quality for this request is three (3).

Figure 26:
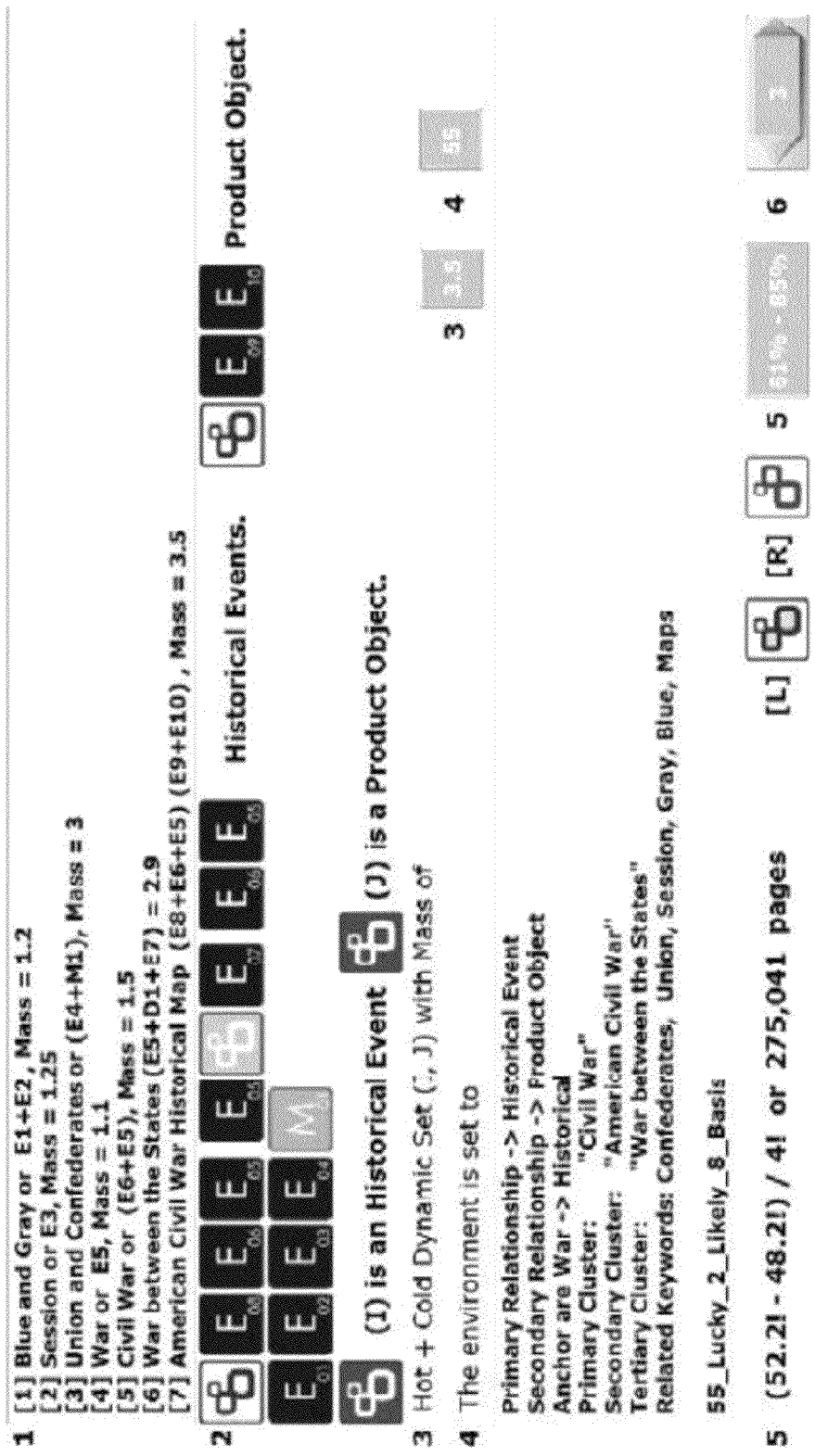
FIG. 26 presents an example representative of a SSD or Set (I, J) analysis of seven (7) requests.

FIG. 33:

Hot & Cold SSD or Set (I, J); (1) As in FIG. 26 the "HIVE" analyzes a session comprised of 7 requests, and (2) converts the keywords into Super Glyphs. Left Brain analysis identifies independent variables: Cx or Civil War, Cy or War between States and Cz or American Civil War as (I) or Superset (I), Ca or Historical Map as (J) or Set (I, J). (I) is Historical Event {Cx|Cy|Cz} and (J) is Product Object {Ca}.

Irrelevant Keywords Help Improve Information Entropy:

(3) The "HIVE" finds the missing gaps of information and then performs the Hot and Cold Analysis and determines that keywords Mexican, Spanish and Russian as irrelevant to improve the Managerial Hierarchical Relationship Indices with Mass 3.5.

Sub Block:

(4) 55_Lucky_2_Never_3_Likely_8 best describes the Sub Block. (5) The accuracy is about 61% to 85%, with an environment of: (49.8!–45.8!)/4! or 226,523 web pages. (6) The quality for this request is three (3).

FIG. 34:

Hot & Cold TSD or Subset(I, J, K): (1) As in FIG. 27 the "HIVE" analyzes a session comprised of 7 requests, and (2) converts the keywords into Super Glyphs. Left Brain analysis identifies independent variables: Cx or Civil War, Cy or War between States and Cz or American Civil War as (I) or Superset (I), Cc or Robert E Lee as (J) or Set (I, J), and Ca or Historical Map and Cb or Military Map as (K) or Subset (I, J, K). (I) is Historical Event {Cx|Cy|Cz}, (J) is Historical Person {Cd} and (K) is Product Object {Cb}.

(3) The "HIVE" finds the missing gaps of information and performs the Hot and Cold Analysis and determines that keywords Mexican, Spanish and Russian as irrelevant to improve the Managerial Hierarchical Relationship Indices with Mass 5.9.

Mini Block:

(4) 31_Lucky_3_Never_3_Likely_6 best describes the Mini Block. (5) The accuracy is about 86% to 95%, with an environment of: (24.4!–21.4!)/3! or 2,104 web pages. (6) The quality for this request is five (5).

FIG. 35:

Hot & Cold QSD or Subset(I, J, K)!; (1) As in FIG. 28 the "HIVE" analyzes a session comprised of 7 requests, and (2) converts the keywords into Super Glyphs. Left Brain analysis identifies independent variables: Cx or Civil War, Cy or War between States and Cz or American Civil War as (I) or Superset (I), Cc or Robert E Lee as (J) or Set (I, J), Ca or Historical Map and Cb or Military Map as (K) or Subset (I, J, K).

Right Brain analysis identifies independent variables: (I) is a Historical Event { }, (J) is a Historical Person { }, (K) is a Product Object{ } and (X) is a Historical Battle {Gettysburg}. The "HIVE" matches/merges (I) and (X) as (I!) yielding Subset (I, J, K)!.

Relevant Keywords Help Improve Information Entropy: (3) The "HIVE" finds the missing gaps of information and performs the Hot and Cold Analysis and determines that keywords Mexican, Spanish and Russian as irrelevant, and USA and PA or Pennsylvania as relevant to improve the Managerial Hierarchical Relationship Indices with Mass 6.5. (4) The Mini Block expressed as 25_Lucky_4_Never_3_Likely_8. (5) The accuracy is about 96% to 99%, with an environment of: (17.2!–15.2!)/2! or 139 web pages. (6) The quality for this request is six (6).

Figure 29:
FIG. 29 presents an example representative of a PSD or Subset (I, J, K)!! analysis of seven (7) requests.

FIG. 36:

Hot & Cold PSD or Subset(I, J, K)!!; (1) As in FIG. 29 the "HIVE" analyzes a session comprised of 7 requests, and (2) converts the keywords into Super Glyphs. Left Brain analysis identifies independent variables: Cx or Civil War, Cy or War between States and Cz or American Civil War as (I) or Superset (I), Cc or Robert E Lee as (J) or Set (I, J), Ca or Historical Map and Cb or Military Map as (K) or Subset (I, J, K).

The "HIVE" [R] Analysis identifies independent variables: Right Brain analysis identifies independent variables: (I) is Historical Event { }, (J) is Historical Person { }, (K) is Product Object { } and (X) is Geodata {Gettysburg}. The "HIVE" matches/merges (I) and (X) as (I!) to Historical Battle {Gettysburg} Event and (J) to (J!) from Robert E Lee to General {ARobert E Lee"} the Military Leader event yielding Subset (I, J, K)!!.

Relevant Keywords Help Elucidate Events:

(3) The "HIVE" finds the missing gaps of information and performs the Hot and Cold Analysis and determines keywords 1861, 1862, 1864 and 1865 as irrelevant and USA, PA or Pennsylvania and 1863 are relevant that improve the Managerial Hierarchical Relationship Indices with Mass 6.9. (4) The environment expressed as 21_Lucky_5_Never_7_Likely_8. (5) The accuracy is about 99%, with an environment of: (8.2!–7.2!)/1! or 8 web pages. (6) The quality for this request is six (6).

FIG. 37:

Hot & Cold HSD or Subset (I, J, K)!!!; (EXACT DATA yields the Final Destination) (1) As in FIG. 29 the "HIVE" analyzes a session comprised of 7 requests, and (2) converts the keywords into Super Glyphs. Left Brain analysis identifies independent variables: Cx or Civil War, Cy or War between States and Cz or American Civil War as (I) or Superset (I), Cc or Robert E Lee as (J) or Set (I, J), Ca or Historical Map and Cb or Military Map as (K) or Subset (I, J, K).

Right Brain analysis identifies independent variables: (I) is a Historical Event { }, (J) is a Historical Person { }, (K) is a Product Object { } and (X) is Geodata {Gettysburg}.

Cholti matches/merges (I) and (X) into (I!) or Historical Battle {Gettysburg} event and e(J) to (J!) from Robert E Lee to General{ARobert E Lee"} the Military Leader event.

The Optimizer improves (K) to (K!) from EXACT DATA{ } into EXACT DATA{!!!}, which reaches the final destination yielding Subset (I, J, K)!!!.

Exact Ideas Driven Requests:

(3) The Optimizer finds the missing gaps of information and performs the Hot and Cold Analysis and determines those keywords 1861, 1862, 1864 and 1865 as irrelevant, and USA, PA or Pennsylvania and 1863 as relevant to improve the Managerial Hierarchical Relationship Indices with Mass 6.9.

(4) The Mini Block express as 10_Lucky_6 or 10_Lucky_6_Never_4. (5) The accuracy is certain or 100%, with an environment of exactly 1 web page. (6) The quality for this request is 7. As explained before once 6 independent variables are found Likely, Regular, Unlikely and Never Numbers become irrelevant.

FIG. 38:

Cholti organizes request into Basic Glyphs; (TDR Step #1 Basic Glyphs) Cholti software (1000) maps and reorganizes keywords belonging to a Request and then transforms them into Basic Glyphs. Then Cholti matches/merges both Left Brain and Right Brain to transform English language and geospatial components of end user's request "American Civil War Confederates Battlefield Gettysburg" into Glyphs. It used both sides of the brain to begin the process of converting typed keyword text into a logical mathematical equation or (Super Glyph equation).

FIG. 39:

Cholti organizes request into Advanced Glyphs; (TDR Step #2 Advanced Glyphs) Cholti software (1000) converts Basic Glyphs into Advanced Glyphs. Then Cholti correlates both Left Brain and Right Brain to convert English language and geospatial components of end user's request "American Civil War Confederates Battlefield Gettysburg" into Glyphs. Cholti uses both sides of the brain to convert typed keyword text into a logical mathematical equation or (Super Glyph equation).

FIG. 40:

"Boolean algebra" versus Cholti; (TDR Step #2 Improved Glyphs) Cholti Software (1000) transforms Advanced Glyphs into Improved Glyphs. Then Cholti correlates both the Before or Boolean algebra and After or Deductive Reasoning equation of Glyphs to optimal solve for the best result of the end user's request "American Civil War Confederates Battlefield Gettysburg". Cholti begins to decipher the actual value of each typed keyword text and arranges it into a Final Super Glyph equation that yields an optimal environment for "Cherry Picking" the top (n) responses.

FIG. 41:

Cholti simulates the human brain; this diagram explains the step by step process Cholti performs to simulate the human brain.

Triangulation Deductive Reasoning

Association Pages Step #1

FIG. 42:

FSD using a Historical Category; (1) As in FIG. 25 and FIG. 32 the "HIVE" analyzes a session comprised of 7 requests, and (2) transforms the keywords and clusters into Super Glyphs. Performing Left Brain analysis the "HIVE" identifies the independent variables as follows: Cx or American Civil War, Cy or Civil War and Cz or War between States as (I) or Superset (I). By using set theory the "HIVE" determines that (Cx<-" Cy)<-" Cz are directly related and substitutes the clusters into Historical Event {AAmerican Civil War"}, The primary filter is Cx, the secondary filter is Cy and the tertiary filter is Cz.

Superset (I) is now Historical Event {AAmerican Civil War"}: (3) The "HIVE" determines relevant and irrelevant keywords to improve the Managerial Hierarchical Relationship Indices with Mass 3.0, and the environment Block is set not exceed 1,048,576 web pages. (4) The "HIVE" finds the missing gaps of information and then creates the session=s Association Page.

(5) The "HIVE" correlates and valorizes the Association Page relevant to Historical Event {AAmerican Civil War"}, and determines if each Super Glyph statistical object are probabilistically Lucky, Likely, Regular, Unlikely or Never Numbers.

Figure 33:
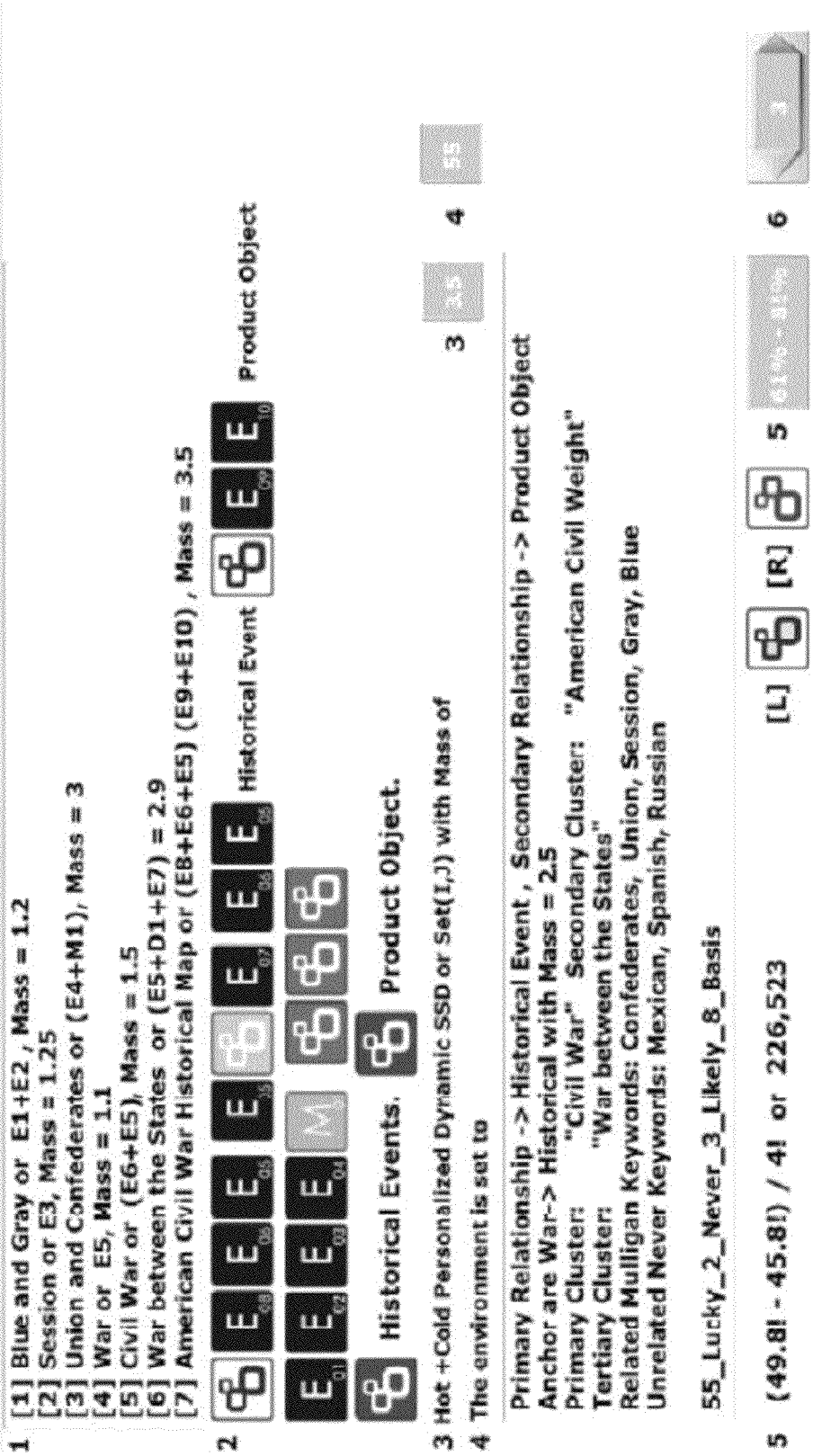
FIG. 33 presents an example representative of a Hot & Cold SSD or Set (I, J)

FIG. 43:

SSD using a Historical Event and Military Leader; (1) As in FIG. 26 and FIG. 33 the "HIVE" analyzes a session comprised of 7 requests, and (2) transforms the keywords and clusters into Super Glyphs. Performing Left Brain analysis the "HIVE" identifies independent variables as follows: Clusters Cx or American Civil War, Cy or Civil War and Cz or War between States as (I) or Superset (I) and Ca or Robert E Lee as (J) or Set(I, J).

By using set theory the "HIVE" determines that (Cx<-"Cy) <-"Cz are directly related and transforms them into Historical Event {Cx|Cy|Cz} or Historical Event{AAmerican Civil War"}. The primary filter is Cx by having the highest end user's weighted value, and also identifies Military Leader {ARobert E. Lee"}.

Set (I, J) is now Military Leader {ARobert E Lee"}; (3) The "HIVE" determines relevant and irrelevant keywords to further improve the Managerial Hierarchical Relationship Indices with Mass 5.0 and the environment Sub Block is set not to exceed 65,536 web pages. (4) The "HIVE" finds the missing gaps of information and then creates the session's Association Page.

(5) The "HIVE" correlates and valorizes the Association Page relevant to Historical Event {AAmerican Civil War"} and Military Leader {ARobert E Lee"} and determines if each Super Glyph statistical object are probabilistically Lucky, Likely, Regular, Unlikely or Never Numbers.

Figure 27:
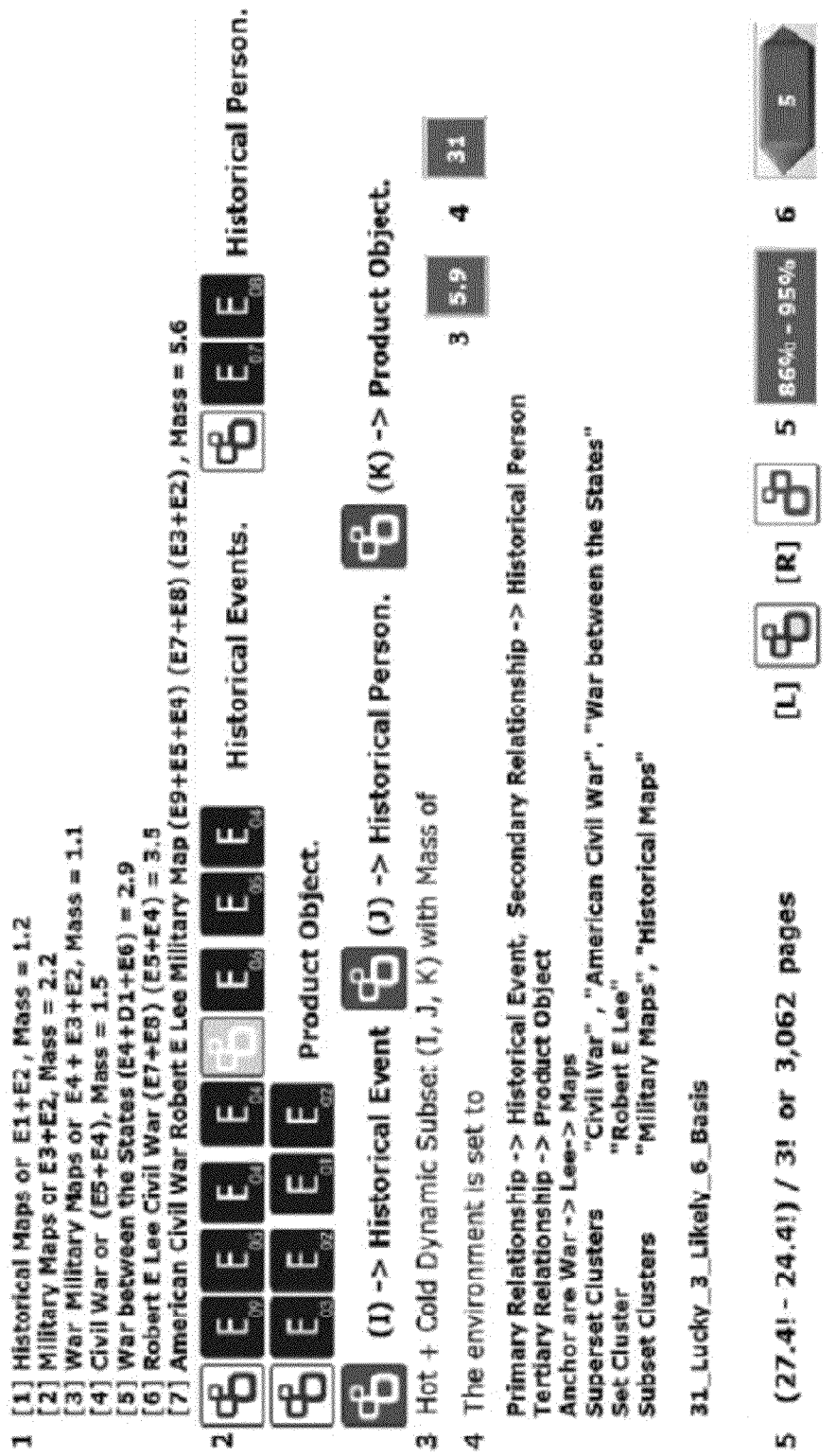
FIG. 27 presents an example representative of a TSD or Subset (I, J, K) analysis of seven (7) requests.
Figure 34:
FIG. 34 presents an example representative of a Hot & Cold TSD or Subset (I, J, K)

FIG. 44:

TSD using an Historical Event, Historical Battle and Military Leader Categories (1) As in FIG. 27 and FIG. 34 the "HIVE" analyzes a session comprised of 7 requests, and (2) converts the keywords and clusters into Super Glyphs. Performing Left Brain analysis the "HIVE" identifies independent variables as follows: Clusters Cx or American Civil War, Cy or Civil War and Cz or War between States as (I) or Superset (I), Ca or Robert E Lee as (J) or Set (I, J) and Cb or Gettysburg as (K) or Subset (I, J, K).

Using set theory the "HIVE" determines that (Cx<-"Cy)<-"Cz are directly related and transforms them into Historical Event {Cx|Cy|Cz} or Historical Event {AAmerican Civil War"}. The primary filter is Cx and identifies Military Leader {ARobert E. Lee"} and Historical Battle {AGettysburg"}.

(3) The "HIVE" determines relevant and irrelevant keywords to further improve the Managerial Hierarchical Relationship Indices with Mass 6.0 and the environment Mini Block is set not exceed 4,096 web pages. (4) The "HIVE" finds the missing gaps of information and then creates the session=s Association Page.

(5) The "HIVE" correlates and valorizes the Association Page relevant to Historical Event {AAmerican Civil War"}, Military Leader {ARobert E Lee"} and Historical Battle{AGettysburg"}, and determines if each Super Glyph statistical object are probabilistically Lucky, Likely, Regular, Unlikely or Never Numbers.

Figure 35:
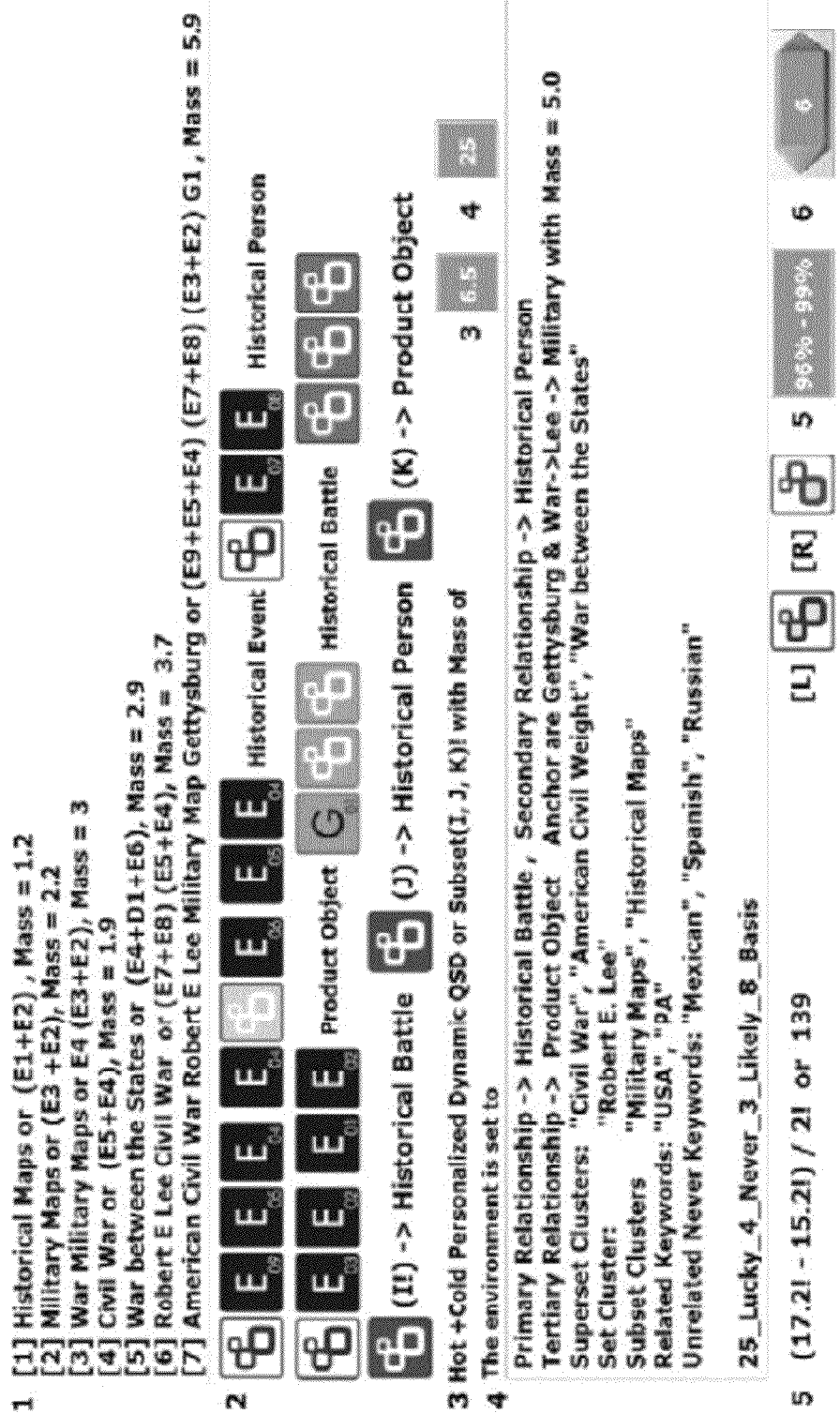
FIG. 35 presents an example representative of a Hot & Cold QSD or Subset (I, J, K)!

FIG. 45:

(QSD) using Historical Battle {AGettysburg"}, and Military Leader {ARobert E Lee"}; (1) As in FIG. 28 and FIG. 35 the "HIVE" analyzes a session comprised of 7 requests, and (2) converts the keywords and clusters into Super Glyphs. Performing Left Brain analysis the "HIVE" identifies independent variables as follows: Clusters Cx or American Civil War, Cy or Civil War and Cz or War between States as (I) or Superset (I), Ca or Robert E Lee as (J) or Set (I, J), and Cc or Historical Map and Cd or Military Map as (J) or Subset (I, J, K).

Dynamic Weight Prioritizes Filter:

Using set theory the "HIVE" determines that (Cx<-"Cy)<-"Cz are directly related and transforms the triple nested clusters into Historical Event {Cx|Cy|Cz} or Historical Event {AAmerican Civil War"}. Based on the highest end user's weighted value the "HIVE" prioritizes Cx as primary filter, and identifies Historical Battle {AGettysburg"} establishing a Subset (I, J, K)!.

(3) The Optimizer determines relevant and irrelevant keywords to further improve the Managerial Hierarchical Relationship Indices with Mass 6.5 and the environment Mini Block is set not exceed 1,024 web pages. (4) The "HIVE" finds the missing gaps of information and then creates the session=s Association Page.

(5) The "HIVE" correlates and valorizes the Association Page relevant to categories Historical Event {AAmerican Civil War"}, Historical Battle {AGettysburg"}, and Military Leader General {ARobert E Lee"} Events, and determines if each Super Glyph statistical object are probabilistically Lucky, Likely, Regular, Unlikely or Never Numbers.

Figure 36:
FIG. 36 presents an example representative of a Hot & Cold PSD or Subset (I, J, K)!!
Figure 38:
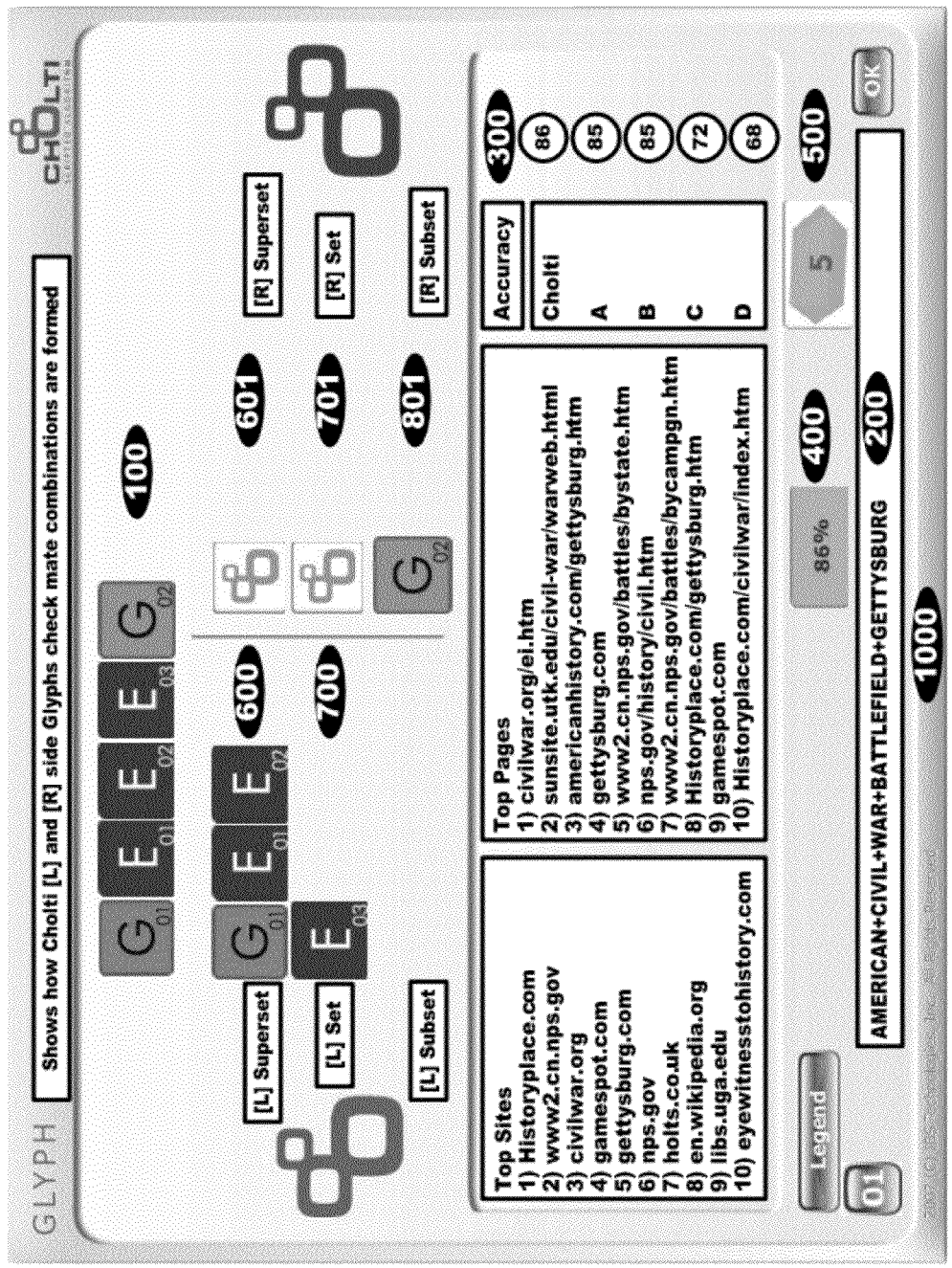
FIG. 38 presents an exemplary screen image illustrating how Cholti organizes requests into basic glyphs.
Figure 39:
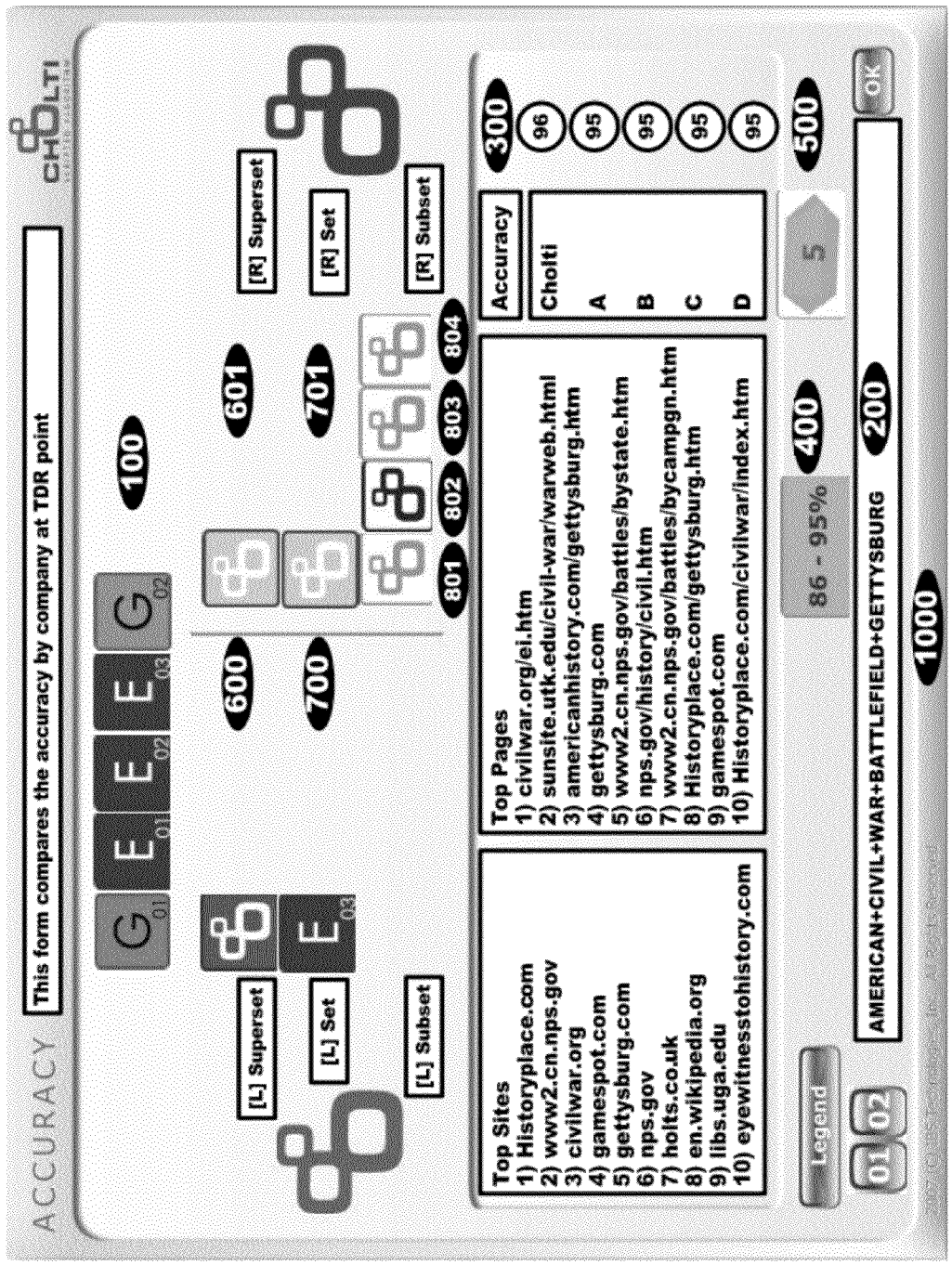
FIG. 39 presents an exemplary screen image illustrating how Cholti organizes requests in advanced glyphs.
Figure 40:
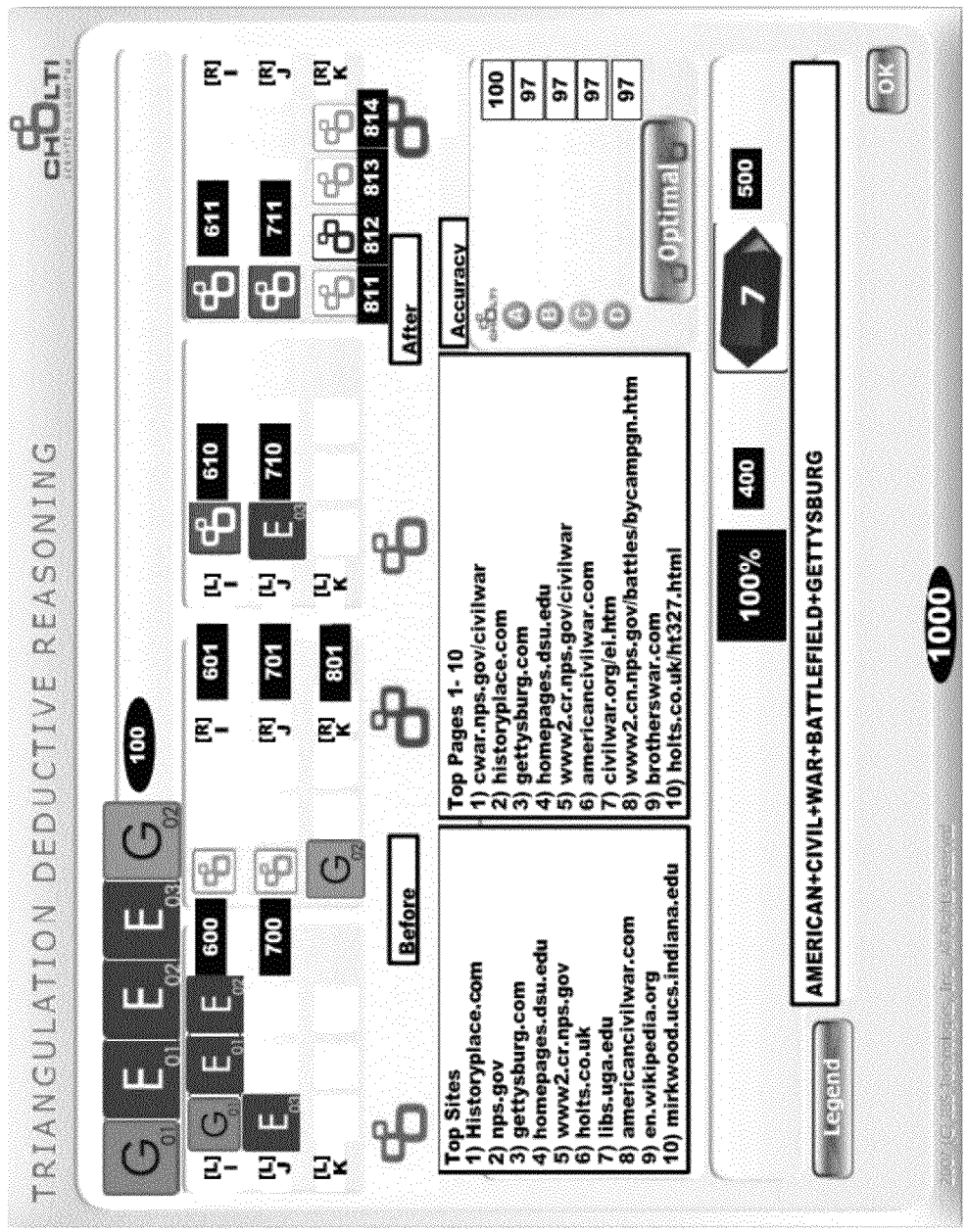
FIG. 40 presents an exemplary screen image illustrating a comparison between "Boolean algebra" and Cholti.
Figure 41:
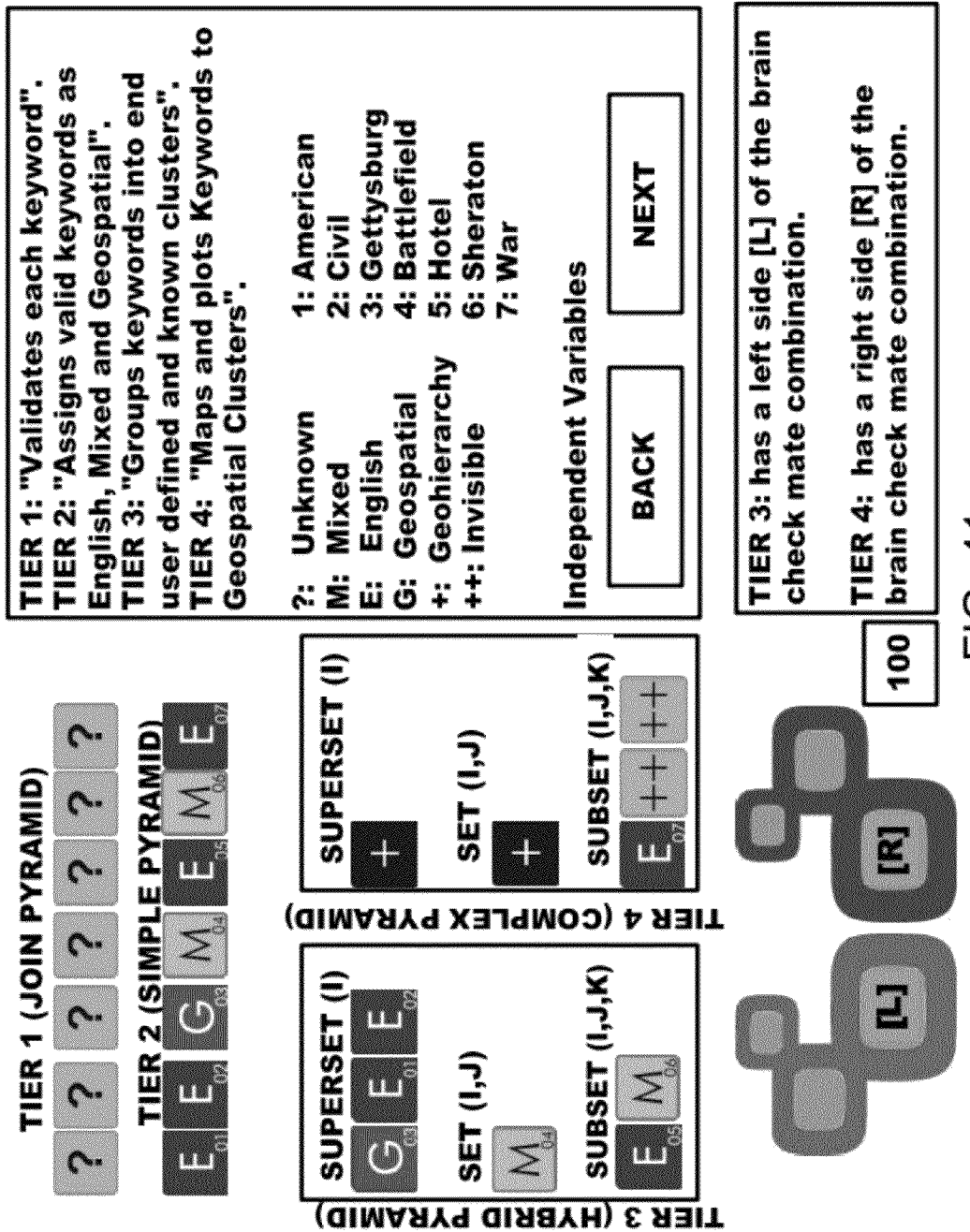
FIG. 41 presents an example illustrating how Cholti simulates the human brain.

FIG. 46:

PSD using Historical Battle {AGettysburg"}, Military Leader {ARobert E Lee"} and Product Object; (1) As in FIG. 29 and FIG. 36 the "HIVE" analyzes a session comprised of 7 requests, and (2) converts the keywords and clusters into Super Glyphs. Performing left brain analysis the "HIVE" identifies independent variables as follows: Clusters Cx or American Civil War, Cy or Civil War and Cz or War between States as (I) or Superset (I), Ca or Robert E Lee as (J) or Set (I, J), and Cc or Historical Map and Cd or Military Map as (J) or Subset (I, J, K).

Using set theory the "HIVE" determines that (Cx<-"Cy)<-"Cz are directly related and transforms the triple nested clusters into Historical Event {Cx|Cy|Cz} or Historical Event {AAmerican Civil War"}. The primary filter is Cx by having the highest end user's weighted value, and also identifies Historical Battle {AGettysburg"}.

The "HIVE" expands Military Leader Robert E Lee category to General{ARobert E. Lee"} event, and transforms American Civil War, Civil War, War between the States and Gettysburg into American Civil War{1863}, Civil War{1863}, War between the States {1863} and Gettysburg {1863} establishing Subset(I, J, K)!!.

Known Irrelevant Keywords Improve the Mass:

(3) The "HIVE" determines relevant and known irrelevant keywords to further improve the Managerial Hierarchical Relationship Indices with Mass 6.9 and the size of the environment Mini Block is set not to exceed the lower limit of 1,024 web pages.

Triangulation or Deductive Reasoning is King!:

Historical Battle {Gettysburg} occurred during the American Civil War on 1863 and TDR simplifies to Gettysburg {1863}. The "HIVE" equation uses all assigned probabilities and weight values of each Super Glyph to validate each web page.

(4) The "HIVE" finds the missing gaps of information and creates the session=s Association Page. (5) The "HIVE" correlates and valorizes the Association Page relevant to American Civil War {1863} or Gettysburg {1863}, General {Robert E Lee} Event and Product Object{AMap"}, and determines if each Super Glyph statistical object are probabilistically Lucky, Likely, Regular, Unlikely or Never Numbers.

Figure 30:
FIG. 30 presents an example representative of a HSD or Subset (I, J, K)!!! analysis of 7 requests.

FIG. 47:

HSD using Historical Battle {AGettysburg"}, Military Leader {ARobert E Lee"} and EXACT DATA!; End users type EXACT DATA! (1) As in FIG. 30 and FIG. 37 the "HIVE" analyzes a session comprised of 7 requests, and (2) converts the keywords and clusters into Super Glyphs. Performing Left Brain analysis the "HIVE" identifies independent variables as follows: Clusters Cx or American Civil War, Cy or Civil War and Cz or War between States as (I) or Superset (I), Ca or Robert E Lee as (J) or Set (I, J), and Cc or Historical Map and Cd or Military Map as (J) or Subset (I, J, K).

Using set theory the "HIVE" determines that (Cx<-"Cy)<-"Cz are directly related and transforms them into Historical Events {Cx|Cy|Cz} or Historical Event {AAmerican Civil War"}. The primary filter is Cx and also identifies Historical Battle {AGettysburg"}. The "HIVE" expands Military Leader Robert E Lee to General{ARobert E. Lee"}, and transforms American Civil War, Civil War, War between the States and Gettysburg into American Civil War{1863}, Civil War{1863}, War between the States {1863} and Gettysburg {1863}.

Furthermore, the "HIVE" expands EXACT DATA{!!!} or I1 and converts it into EXACT DATA {AMap!!!"} and thus establishing a Subset(I, J, K)!!!. (3) The "HIVE" determines relevant and irrelevant keywords to further improve the Managerial Hierarchical Relationship Indices with Mass 7.0 and the environment Mini Block is set not to exceed the lower limit of 1,024 web pages.

(4) The "HIVE" finds the missing gaps of information and then creates the session=s Association Page. (5) The "HIVE" correlates and valorizes the Association Page relevant to EXACT DATA {AMap"}, Historical Battle{AGettysburg"} and Military Leader General {ARobert E Lee"}, and determines if each Super Glyph statistical object are probabilistically Lucky, Likely, Regular, Unlikely or Never Numbers.

Relevance Step #2

Figure 42:
FIG. 42 presents an example illustrating FSD using a Historical Category.

FIG. 48:

FSD adding related Super Sites Objects; Continuation to FIG. 42, apply rules of Relevance. (1) After the first TDR process the Block has 1,048,576 web pages. (2) The "HIVE" reorganizes the Association Page. (3) The "HIVE" analyzes the specific Block to find from the Super Sites the best 'Related Objects'. (4) The "HIVE" finds the missing gaps of information and evaluates the Sub Block content diluting it to 131,072 web pages. (5) The "HIVE" then correlates both the (1) Association Page and (3) 'Related Objects' Super Glyphs. (6) The "HIVE" performs the Hot & Cold analysis of the (5) correlated Objects and finds an additional independent variable. (7) Once the second TDR process is complete the relevant content is a Mini Block having 16,384 web pages.

Figure 43:
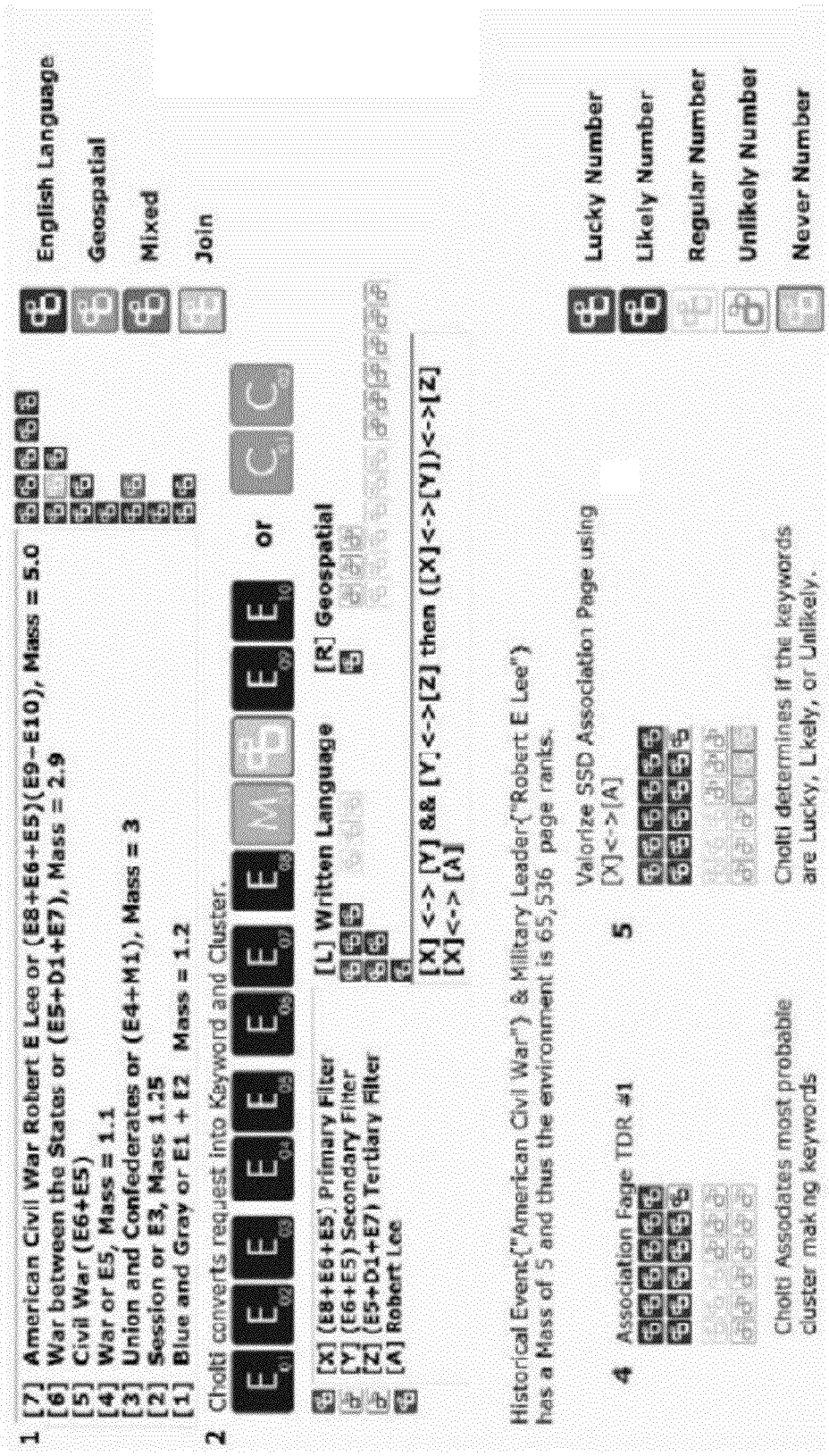
FIG. 43 presents an example illustrating SSD using a Historical Event and Military Leader.

FIG. 49:

SSD adding related Super Sites Objects; Continuation to FIG. 43, apply rules of Relevance. (1) After the first TDR process the Sub Block has 65,536 web pages. (2) The "HIVE" reorganizes the Association Page. (3) The "HIVE" analyzes the specific Sub Block to find from the Super Sites the best 'Related Objects'. (4) The "HIVE" finds the missing gaps of information and evaluates the Mini Block content diluting it to 16,384 web pages.

(5) The "HIVE" then correlates both the (1) Association Page and (3) 'Related Objects' Super Glyphs. (6) The "HIVE" performs the Hot & Cold analysis of the (5) correlated Objects and finds an additional independent variable. (7) Once the second TDR process is complete the relevant content is a Mini Block having 4,096 web pages.

FIG. 50:

TSD adding related Super Sites Objects; Continuation to FIG. 44, apply rules of Relevance. (1) After the first TDR process the Mini Block has 4,096 web pages. (2) The "HIVE" reorganizes the Association Page. The "HIVE" analyzes the specific Mini Block to find from the Super Sites the best 'Related Objects'. (4) The "HIVE" finds the missing gaps of information and evaluates the Mini Block content diluting it to 2,048 web pages.

(5) The "HIVE" then correlates the (1) Association Page and (3) 'Related Objects' Super Glyphs. (6) The "HIVE" performs the Hot & Cold analysis of the (5) correlated Objects and finds an additional independent variable. (7) Once the second TDR process is complete the relevant content is a Mini Block having 1,024 web pages.

Figure 45:
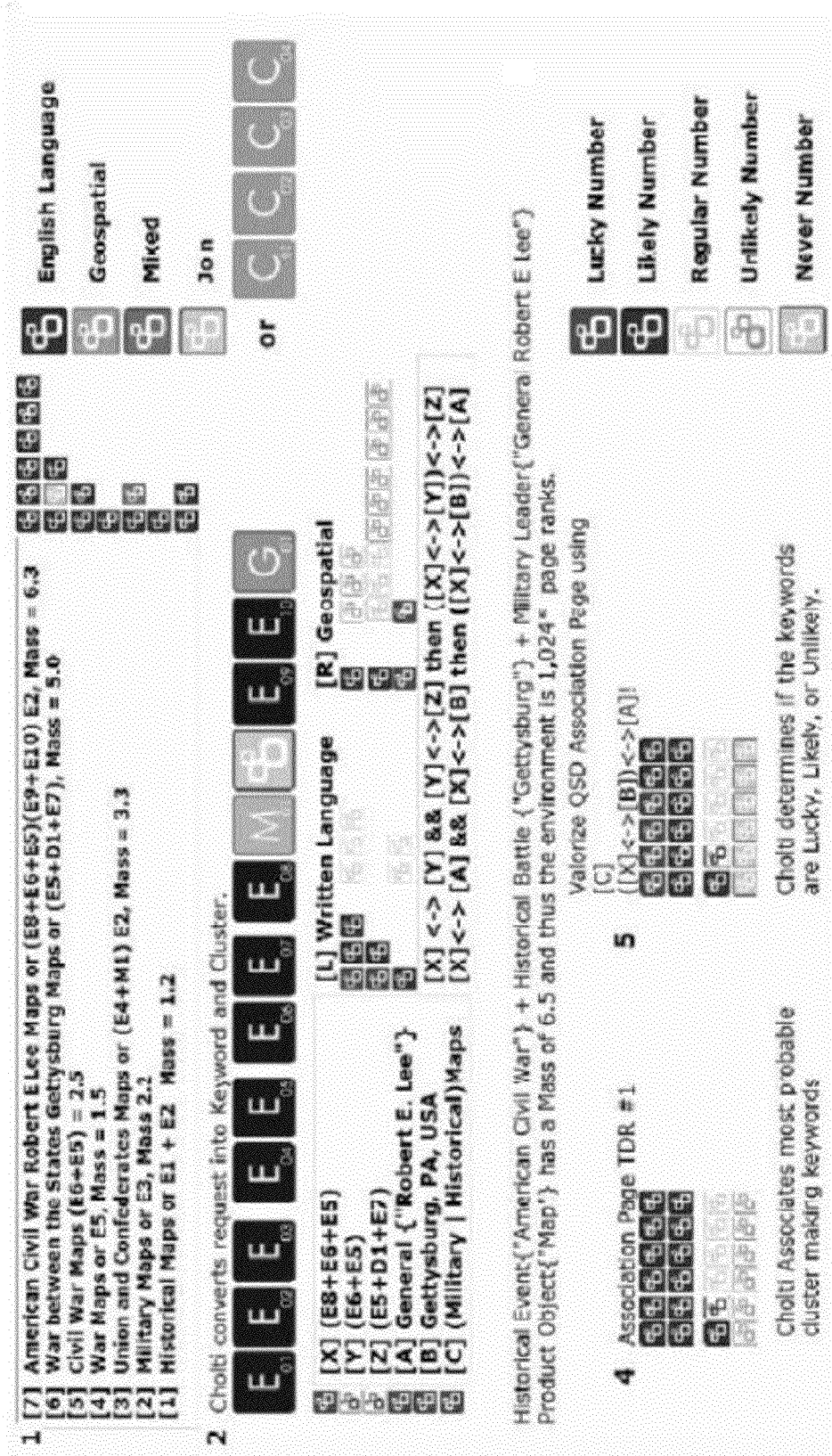
FIG. 45 presents an example illustrating QSD using Historical Battle {"Gettysburg"}, and Military Leader {"Robert E Lee"}.

FIG. 51:

QSD adding related Super Sites Objects; Continuation to FIG. 45, apply rules of Relevance. (1) After the first TDR process the Mini Block environment has 1,024 web pages. (2) The "HIVE" reorganizes the Association Page. (3) The "HIVE" analyzes the specific Mini Block to find from the Super Sites the best 'Related Objects'. (4) The "HIVE" finds the missing gaps of information and evaluates the Mini Block content diluting it to 512 web pages.

(5) The "HIVE" then correlates the (1) Association Page and (3) 'Related Objects' Super Glyphs. (6) The "HIVE" perform the Hot & Cold analysis of the (7) correlated Objects and identifies an additional independent variable to reduces the relevant content of the Internet to a Mini Block having 256 web pages.

Figure 46:
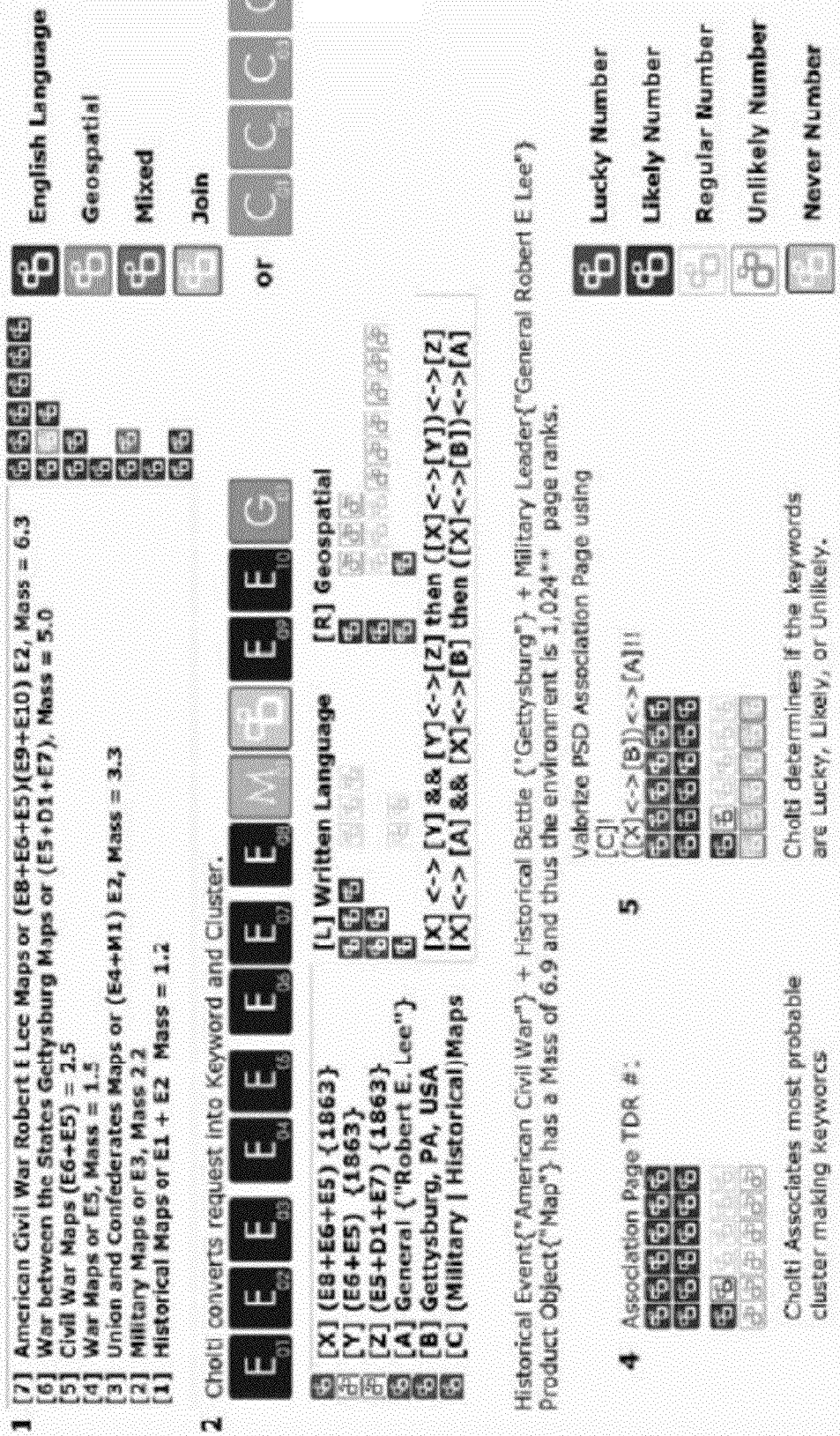
FIG. 46 presents an example illustrating PSD using Historical Battle {"Gettysburg"}, Military Leader {"Robert E Lee"} and Product Object.

FIG. 52:

PSD adding related Super Sites Objects; Continuation to FIG. 46, apply rules of Relevance. (1) After the first TDR process the Sub Block has 1,024 web pages. (2) The "HIVE" reorganizes the Association Page. (3) The "HIVE" analyzes the specific Mini Block to find from the Super Sites the best 'Related Objects'. (4) The "HIVE" finds the Missing Gaps of Information and evaluates the Mini Block content diluting it to 256 web pages.

(5) The "HIVE" then correlates the (1) Association Page and (3) Related Objects Super Glyphs. (6) The "HIVE" performs the Hot & Cold analysis of the (5) correlated Objects. (7) Once second TDR process is complete the relevant content of the Internet becomes a Mini Block having 64 web pages.

Figure 47:
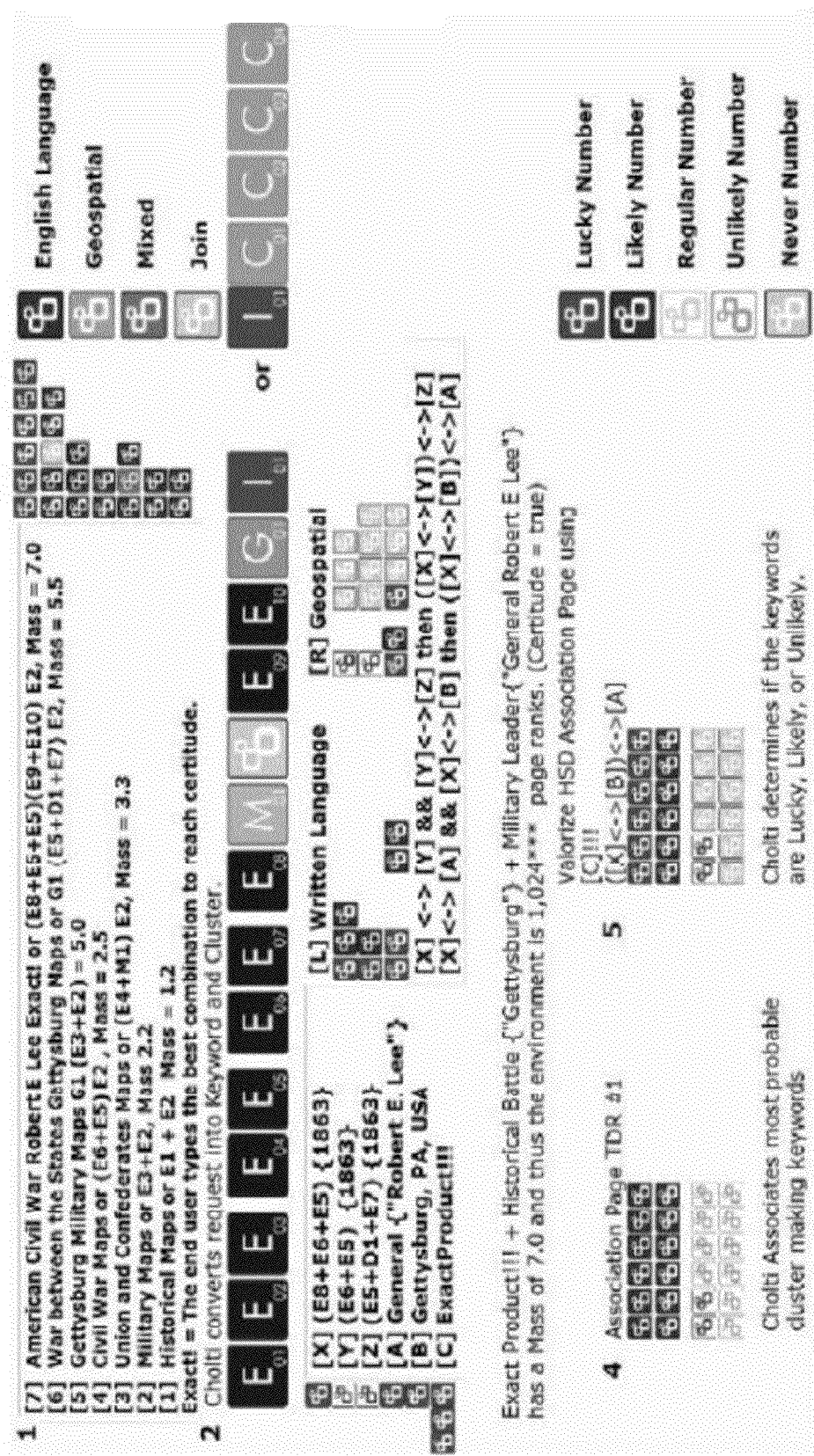
FIG. 47 presents an example illustrating HSD using Historical Battle {"Gettysburg"}, Military Leader {"Robert E Lee"} and EXACT DATA!
Figure 48:
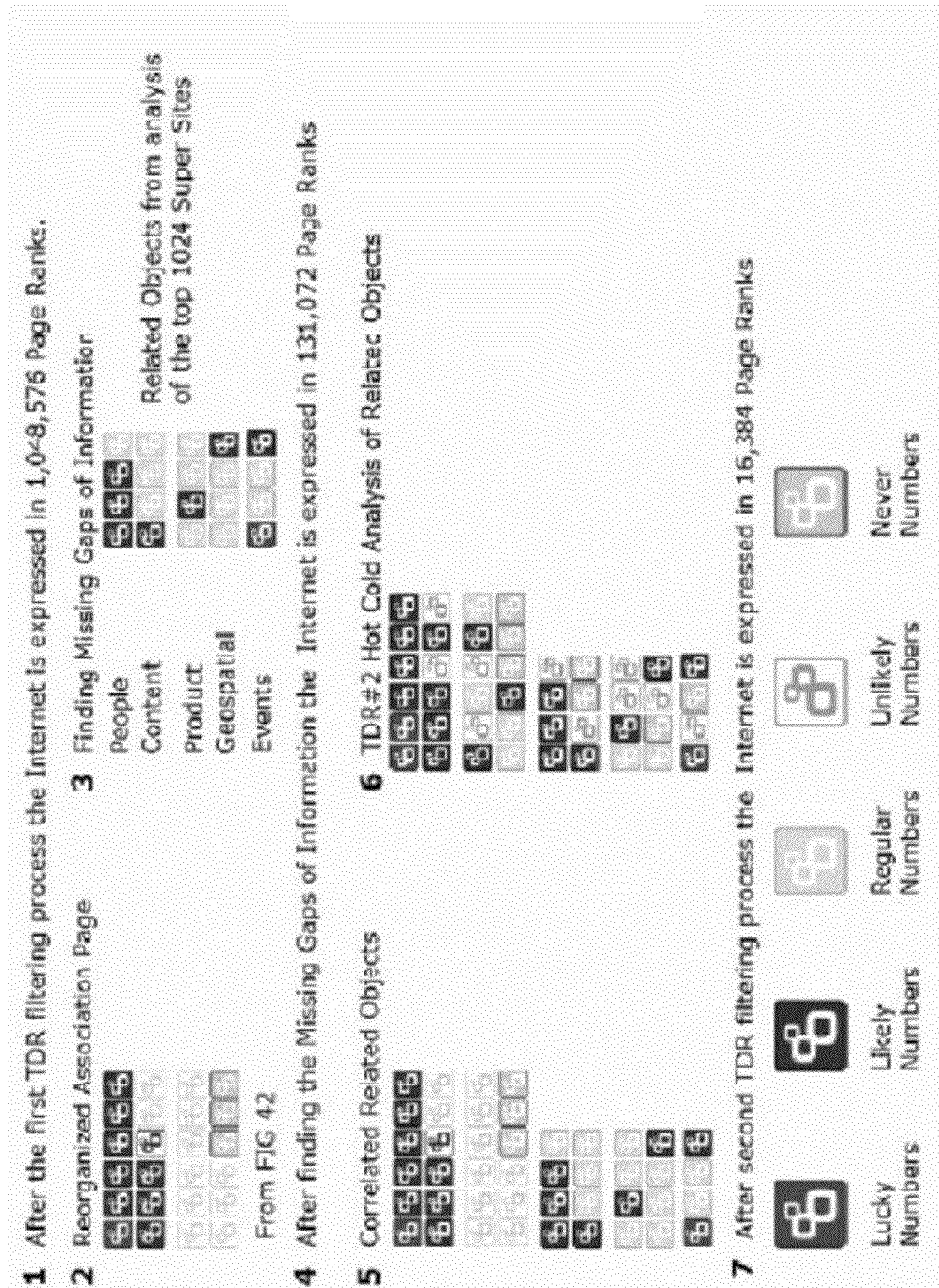
FIG. 48 presents an example illustrating FSD adding related Sites Objects.
Figure 49:
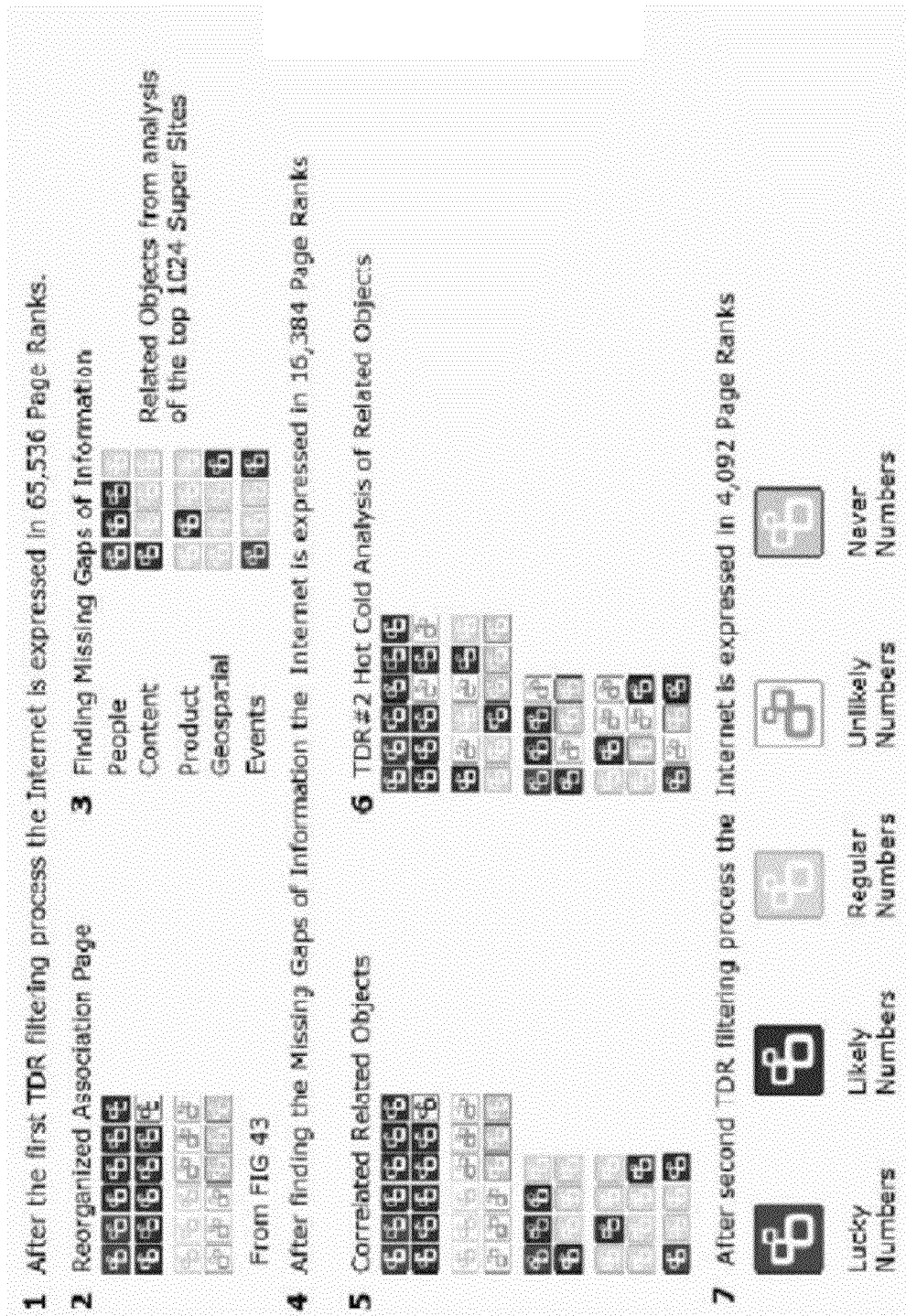
FIG. 49 presents an example illustrating SSD adding related Super Sites Objects.
Figure 51:
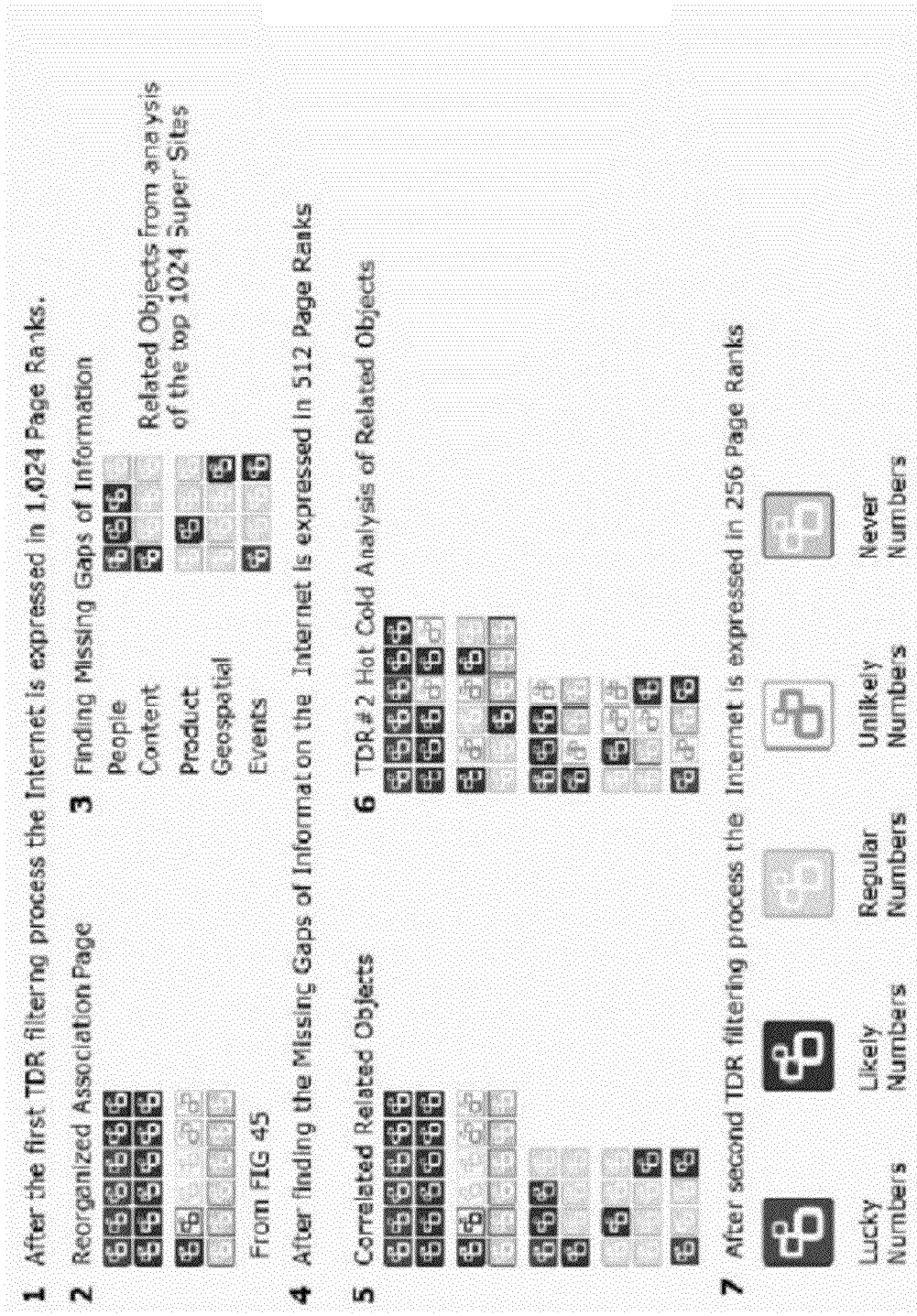
FIG. 51 presents an example illustrating QSD adding related Super Sites Objects.
Figure 52:
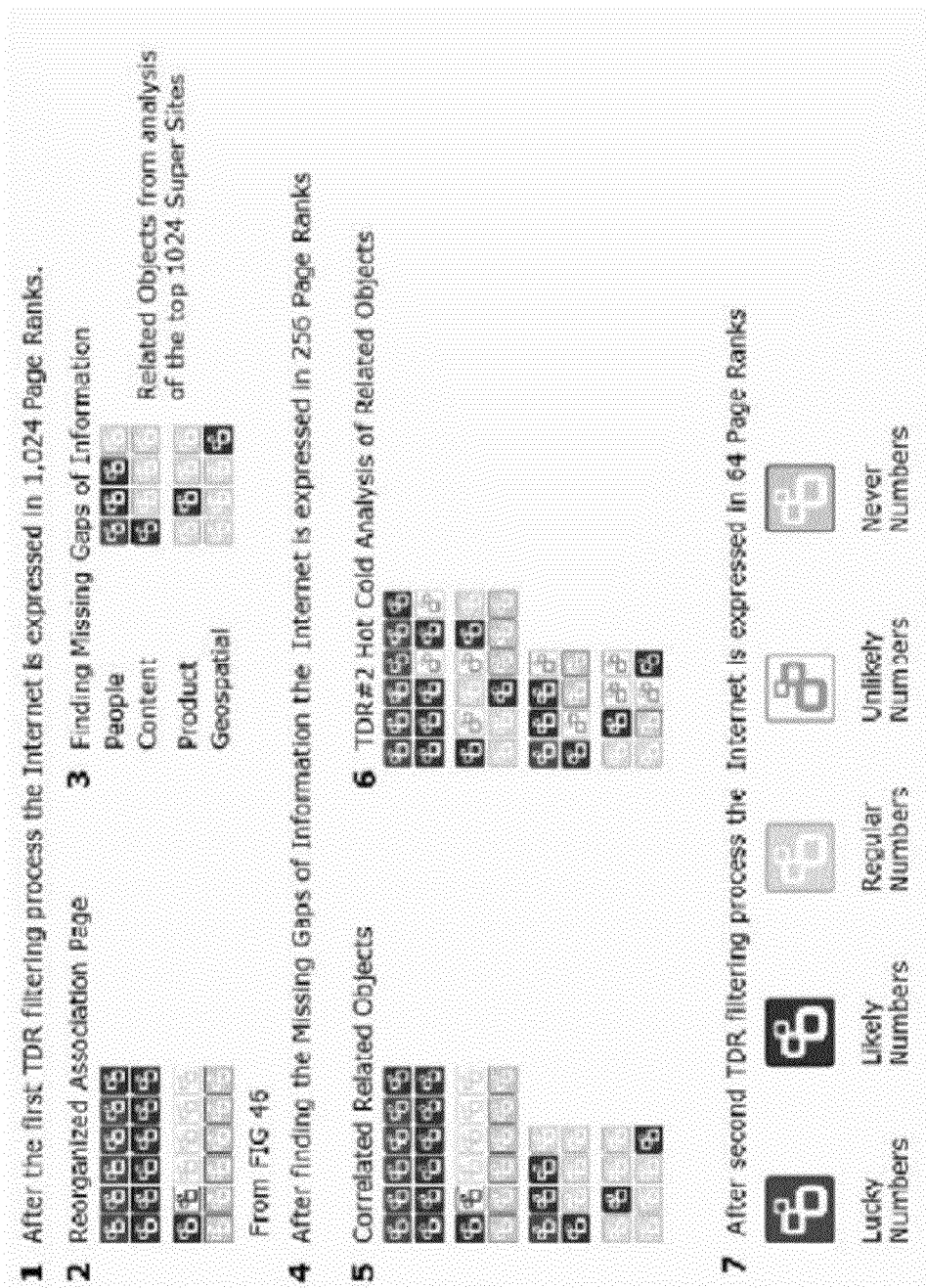
FIG. 52 presents an example illustrating PSD adding related Super Sites Objects.

FIG. 53:

HSD adding related Super Sites Objects; continuation to FIG. 47, apply rules of Relevance. (1) After the first TDR process the Mini Block has 1,024 web pages. (2) The "HIVE" reorganizes the Association Page. (3) The "HIVE" analyzes the specific Mini Block to find from the Super Sites the best 'Related Objects'. (4) After the "HIVE" finds the Missing Gaps of Information and evaluates the Mini Block content diluting it to 128 web pages.

(5) The "HIVE" then correlates the (1) Association Page and (3) 'Related Objects' Super Glyphs. (6) The "HIVE" performs the Hot & Cold analysis of the (5) correlated Objects. (7) Once the second TDR filtering is complete the relevant content of the Internet becomes a Mini Block having 16 web pages.

Likelihood Step #3

Figure 24:
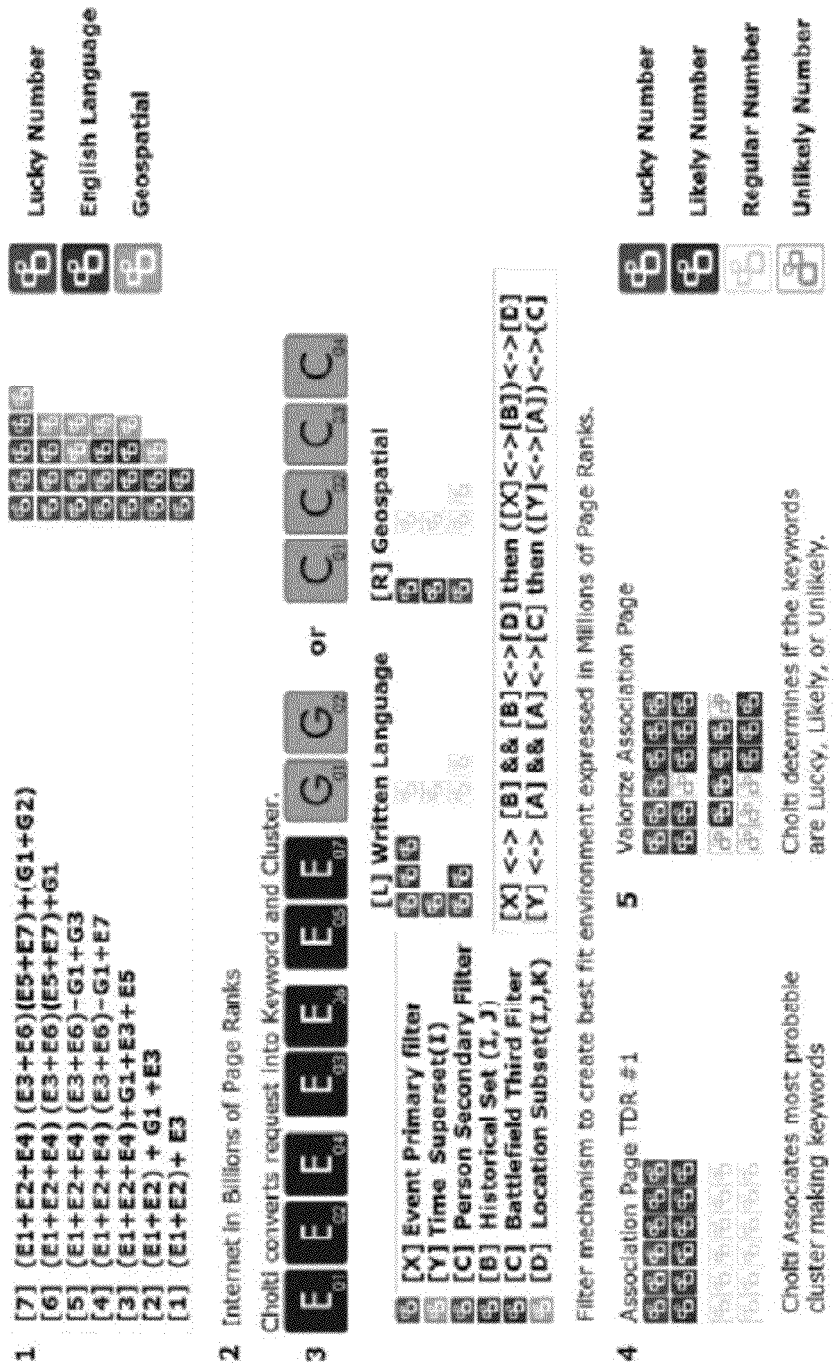
FIG. 24 presents an example representative of a Cholti Super Glyph Relationships.

FIG. 54:

Obtaining the Final Value; continuation of FIG. 24 and FIG. 31, apply rules of Likelihood that dilutes the valid environment based on the Likely and Unlikely Analysis. (1) From FIG. 31 a session of seven requests where the second TDR process creates a Sub Block of the Internet that is expressed in thousands of web pages. (2) The "HIVE" reorganizes the Relevance page. (3) The "HIVE" assigns the most probable objects within the Sub Block that are directly related to the 5 Lucky numbers identified in (2).

(4) Transforming the independent variables of each Managerial Hierarchical Relationship Indices into categories. The "HIVE" identifies the best-fit Mini Block diluting the environment to hundreds of web pages. (5) The "HIVE" matches/merges both the existing Super Glyphs from (1) and the relevant categories from (3) into Events. (6) The "HIVE" performs the Likely & Unlikely Analysis of Categories and Events that yields the best-fit Mini Block.

Figure 54:
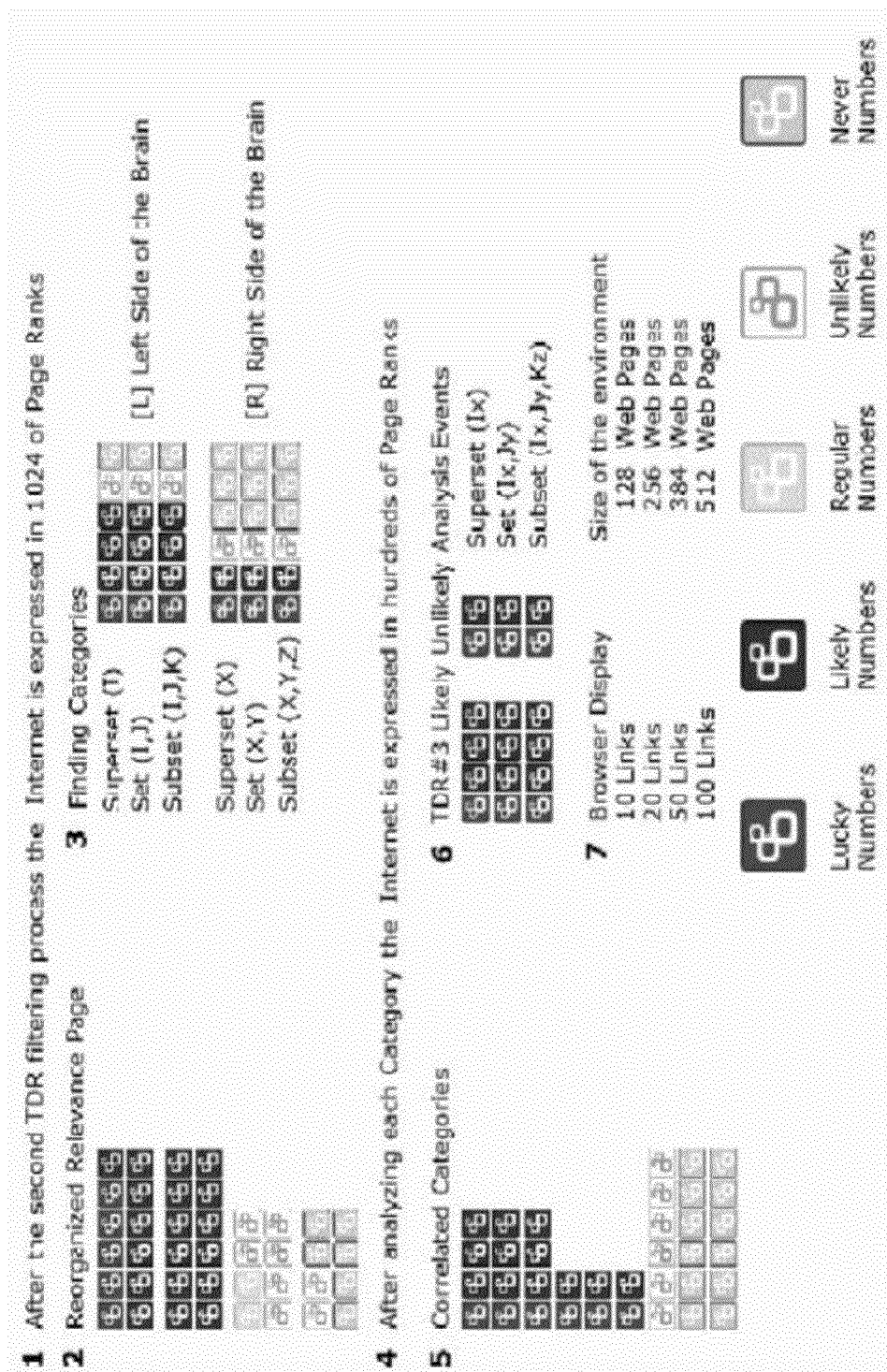
FIG. 54 presents an example illustrating steps for obtaining a final value.
Figure 55:
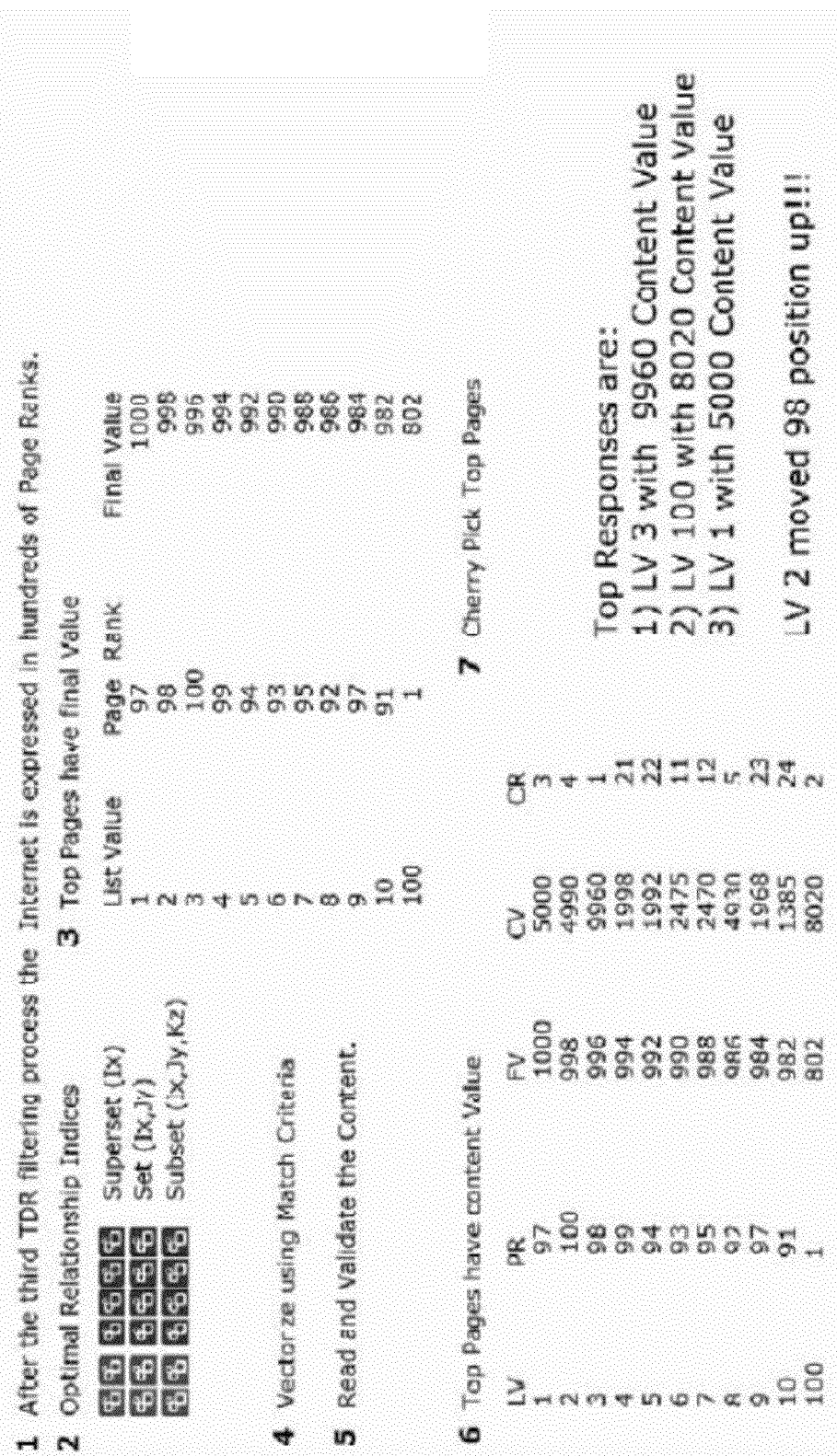
FIG. 55 presents an example illustrating steps for 'Cherry Picking' the top page!
Figure 56:
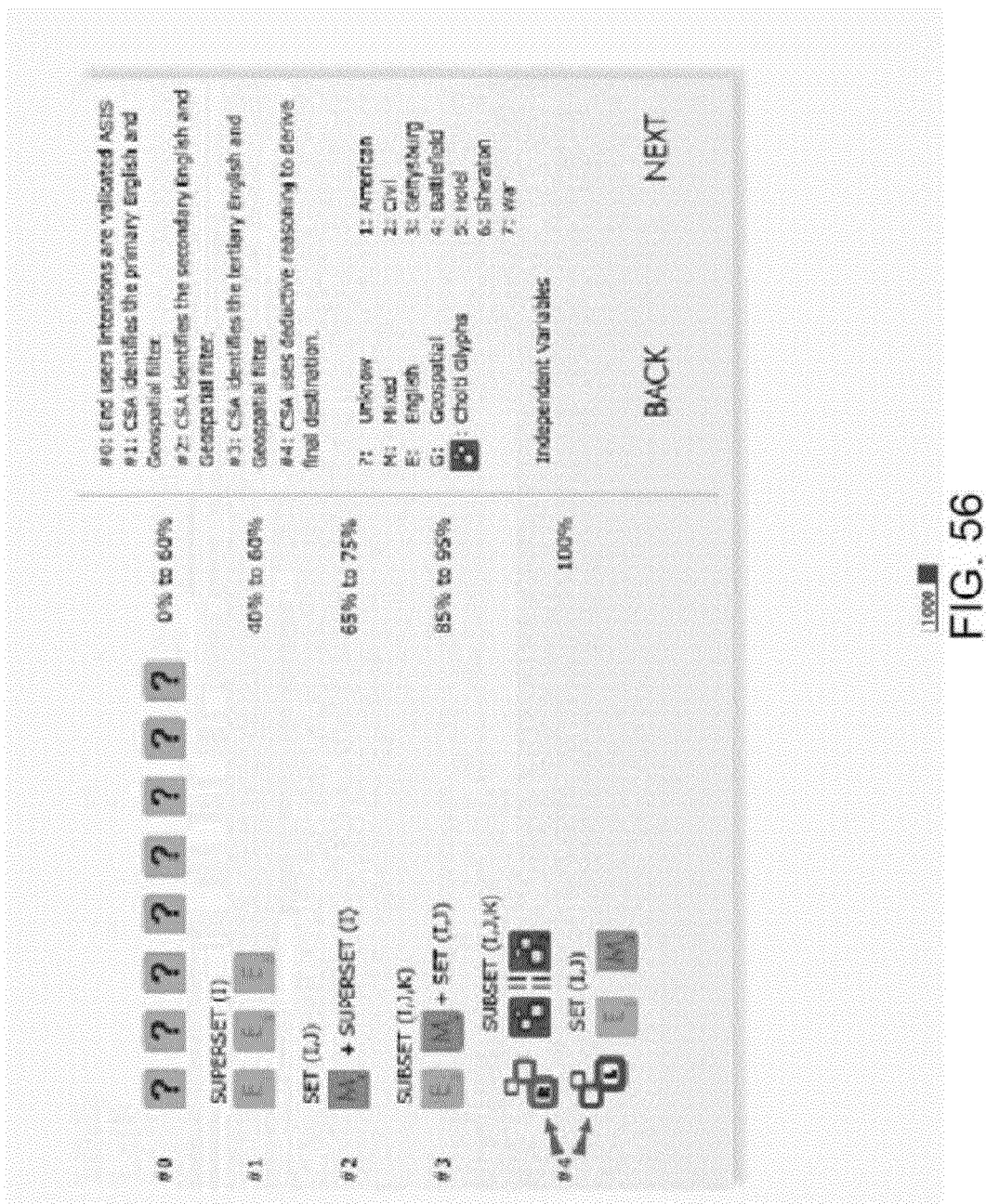
FIG. 56 presents an example illustrating steps for achieving Cholti Accuracy.
Figure 57:
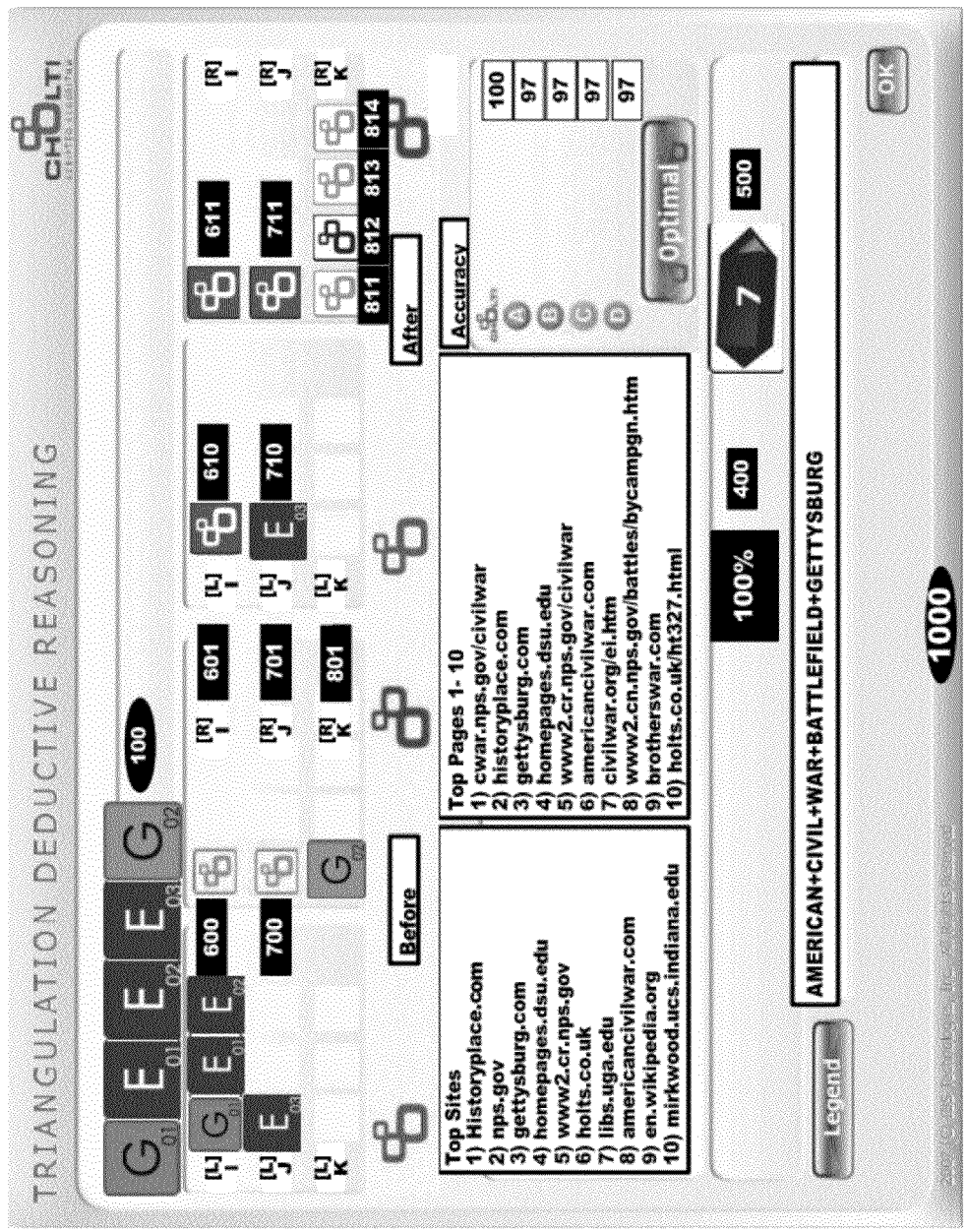
FIG. 57 presents an exemplary screen image illustrating a Cholti Deductive Search.

Content Value Final Step:

FIG. 55:

'Cherry Picking' the top Page!; continuation of FIG. 24, FIG. 31 and FIG. 54, the final process of "Cherry Picking" the optimal answer that will be rearward chained back to the end user based on the best content rating. (1) From FIG. 55 a session of seven requests where the third TDR process creates a Mini Block that is expressed in hundreds of web pages. The "HIVE" assigned the most likely category to each independent variable, and performs the process of matching/merging Left Brain categories with Right Brain categories or [L+R] events that are Optimal Relationship Indices.

"Boolean Algebra" Final Value:

(3) The "HIVE" assigns a "Boolean algebra" final value to each valid web page belonging to the Mini Block. (4) The "HIVE" vectors each web page based on the dynamic Super Glyph values of each event. (5) Taking nothing for granted the "HIVE" reads and validates the actual content of each web page in the Mini Block.

Triangulation Deductive Reasoning Content Value:

(6) Based on the measured content value of each web page weighted and adjusted by the dynamic value derived from the final optimal Relationship Indices to assign to each web page a content rating.

Content Value is King!:

(7) The "HIVE" selects the top pages that have the best content rating. In this example only web pages (3 and 100) have an exact match with the optimal Relationship Indices that are comprised of the dynamic Super Glyph values of each keyword and cluster contained in at least one request belonging to one session.

FIG. 56:

Cholti Accuracy; this diagram explains step by step the process Cholti Search Engine Optimizer performs to reach certitude 100% accuracy.

FIG. 57:

Cholti Deductive Reasoning Search; this is a diagram that illustrates the left side of the page (1000) with four requests belonging to a session. [1], [2], [3] and [4] use ABoolean algebra", and [1A],[2A], [3A] and [4A] use 'Deductive Reasoning'. This is a side by side comparison that highlights the comparative differences between 'Boolean algebra' and 'Deductive Reasoning'.

Figure 58:
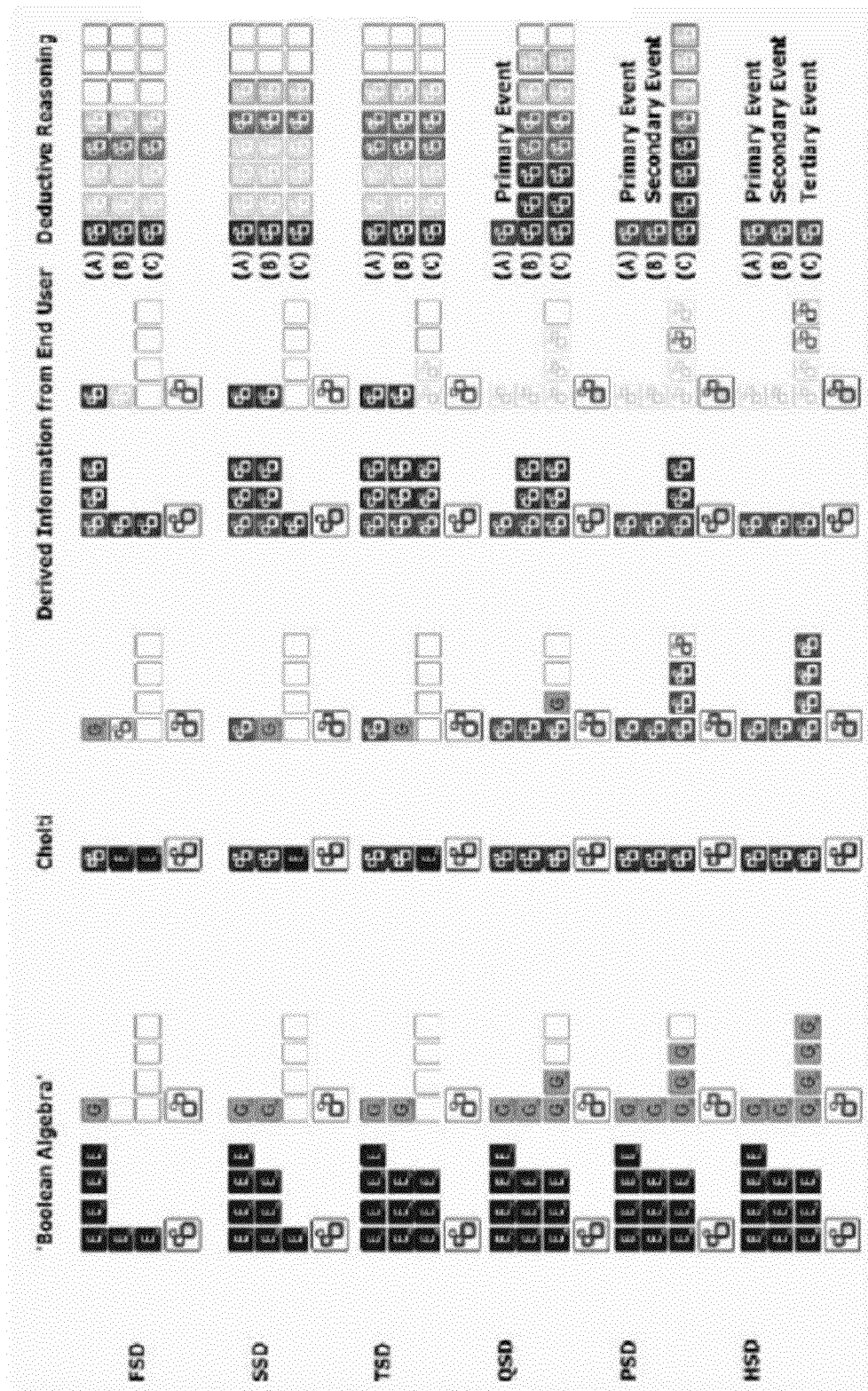
FIG. 58 presents a block matrix presenting a comparison of Z_Price Bitmaps (Artist Representation) of existing search processes.
Figure 59:
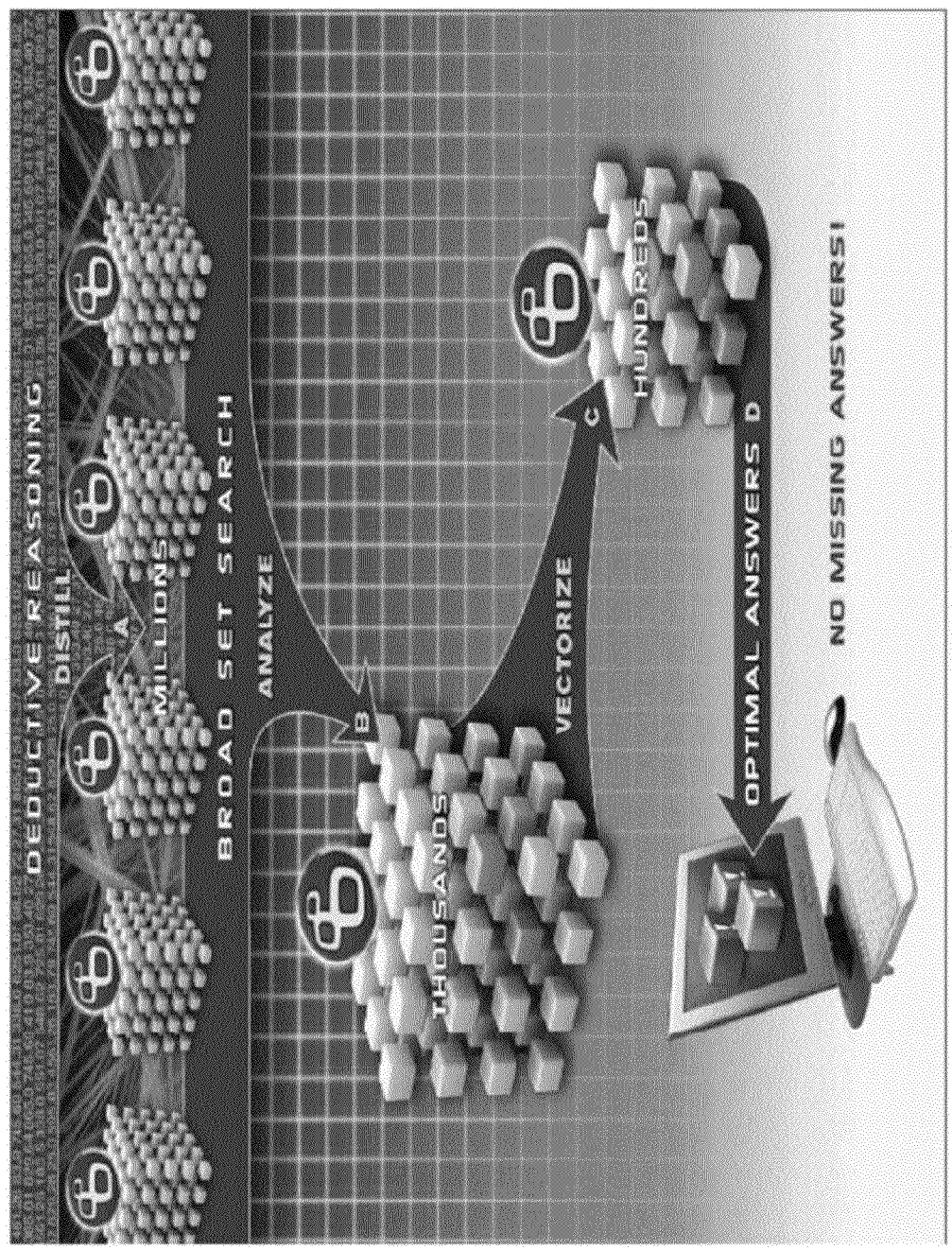
FIG. 59 presents an exemplary block diagram representative of a triangulation deductive reasoning search.
Figure 60:
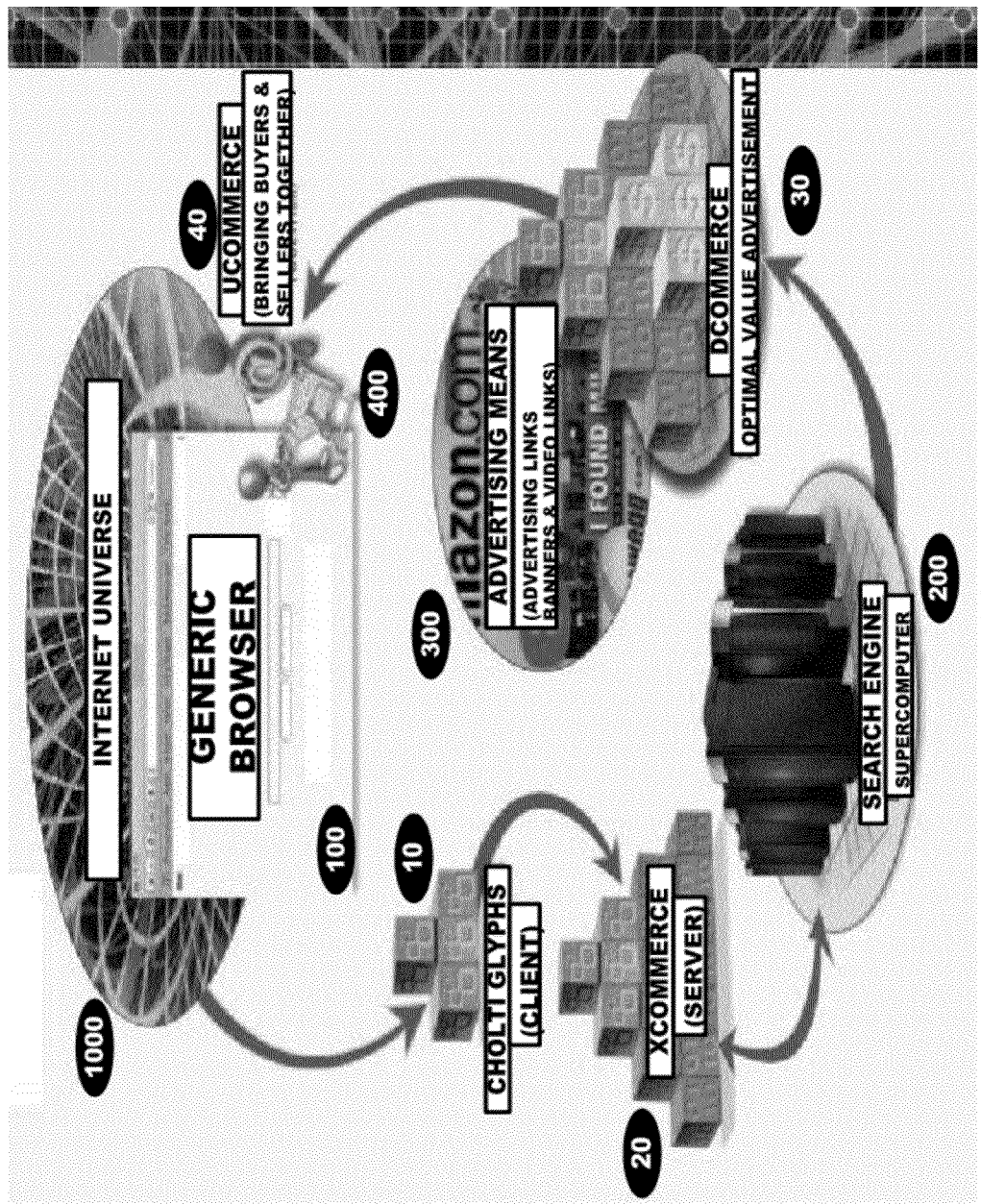
FIG. 60 presents an exemplary block diagram representative of a significant enhancement over current search engine technology.

FIG. 58 Z_Price Bitmaps (Artist Representation):

Existing Systems:

"Boolean algebra": shows a simplified overall arrangement of the different Basic Glyphs combinations based on the end user's typed independent variables from 1 to 6.

Cholti Search Engine Optimizer:

Cholti: shows a simplified overall arrangement of the different Improved Glyphs combinations based on the end user's typed independent variables from 1 to 6. The "HIVE" is able to expand the size of the collection of Super Glyphs related to a particular request by identifying missing gaps of information, and nesting directly related clusters and keywords.

Codex Search Pages:

Codex: shows an over simplified arrangement of the different combinations of Codex Pages based on the end user's typed independent variables from 1 to 6. The arrangement shows different types of end user's requests, and how the "HIVE" improves a request belonging to a session after following the three steps of Triangulation Deductive Reasoning: 1) Association, 2) Relevance and 3) Likelihood.

Comparative Analysis between "Boolean algebra", Cholti and Codex: "Boolean algebra" (existing systems) is efficient in total amount of Super Glyphs required to reach the final destination, and ineffective in creating the optimal environment size. Cholti is able to improve the accuracy of the "Boolean algebra" technologies by identifying missing gaps of information, directly related keywords.

Codex improves over "Boolean algebra" and Cholti by creating an optimal size environment, and does the three TDR steps and procedures 1) Association: Map independent variables to categories, 2) Relevance: Determines the relationships amongst independent variables and 3) Likelihood: Analyze the content of the optimal environment to forge an "idea fashioned pattern"*.

Idea Fashion Pattern "Cherry Picking":

The Codex mimics and simulates the end user's and thus is not just interested in matching Super Glyphs. The Codex distills, analyzes and measures idea fashion patterns that valorizes Super Glyphs based on their location arrangement within the actual content as human do when reading/scanning through web pages.

FIG. 59:

Triangulation Deductive Reasoning Search; a conceptual representation of the billions of web pages stored and evenly distributed for maximal efficiency belonging to the (1000) Internet environment. Cholti using 'Deductive Reasoning' simulates a plurality of concurrently working environments representing the best content of the Internet by using partial differential equations filters that figures out at least one (1) independent variable that serves (A) to distill and to create a plurality of concurrently working Blocks consisting of millions of web pages.

Plurality of Blocks Replace (U):

Each Block derived from the Managerial Hierarchical Relationship Indices replaces (1000) the Internet environment. The independent variables filters are comprised of common denominator keyword and cluster combinations.

Broad Set Search:

The end user finishes creates a request message and immediately a Broad Set Search is performed using partial differential equations filters to figuring out at least one (1) additional independent variable based on the end user's request. Cholti (B) analyzes and distills each of the web pages contained in (A) Block to create a Sub Block environment that is expressed in thousands of web pages.

Partial Differential Equations (Blocks, Sub Blocks and Mini Blocks):

Using the partial differential equations filters to solve for at least on 1 additional independent variable based on the end user's request. Cholti (C) vectors, analyzes and distills each of the web pages contained in (B) Sub Block to create a Mini Block environment that is expressed in hundreds of web pages.

Optimal Responses:

Triangulation Deductive Reasoning performs (A), (B), and (C), to identify, validate and verify the highest valued web pages. (D) The top (n) responses become output and are immediately sent to end user's terminal and displayed.

FIG. 60:

A significant enhancement over currently existing search engines: Existing Technologies (Before): the system comprising multiple concurrently subsystems that gather, scan, distill, update and transform the information of the Internet environment (1000). The Internet environment is comprised of billions of web pages and continues to grow geometrically.

(100) Generic Browser subsystem interacts with end user's to receive input in the form of keywords that in turn becomes a request message. The request message is forward chained to a (200) Search Engine subsystem uses eigenvectors valorization means based on quality, characteristic, positioning, and frequency of the keywords to derive using "Boolean algebra" the top (n) results that best fit match a particular request message and have the highest rank.

(300) Advertisement Means subsystem is comprised of advertiser=s links, banners, and corporate videos that are the lion share of revenue of search engine companies, which identify the corporate characteristics of the top results based on the request message to maximize media value and create the optimal advertisement.

Best Answers:

The best answers and the optimal advertisement are put together and become the response message that is rearward chained to the Generic Browser subsystem and then displayed as output.

Missed Answers:

The Generic Browser subsystem alternatively may have (400) link to Shopping Cart technologies. Unfortunately, Search engine subsystems leave missed answers by oversimplifying the search tasks bypassing the meticulous and resource intensive processes of actually identifying, validating and verifying the top (n) responses.

Enhanced Search Engine Technologies (After):

(10) Cholti in real time converts an end user's requests into Glyphs that are statistical objects of each keyword and cluster that belongs to a request and (20) XCommerce Supercomputer subsystem simulates an existing search engine.

Cholti and XCommerce Subsystems:

(10) Cholti subsystem creates the optimal Codex Page that best describes the end user's idea. (20) XCommerce subsystem for each Codex Page stores an optimal pre processed Z_Price Bitmap data structure, which has a plurality of web pages comprising the best fit environment after filtering the Internet by figuring out the independent variables in a partial differential equation search process.

Z_Price Bitmap:

(20) XCommerce, determines if it at least one Codex Page exists in its inventory that best represents the end user's request or search pattern as following:

a) If yes: XCommerce immediately responds with the optimal top (n) responses it has in its inventory. b) If no: XCommerce makes the appropriate search within its simulated virtually rendition of an existing search engine capacity it is mimicking by following the TDR rules of Association, Relevance and Likelihood to create a new Codex Pages with a Z_Price Bitmap data structure. The Codex Page is stored with top (n) responses as output. The output is sent and displayed to the end user.

Optimal Environment (10) Once Cholti has the optimal environment based on the top web pages included in the Z_Price Bitmap data structure does the process of reading and validating the content, and cherry picking the optimal responses based on the dynamic value of each Glyph statistical object.

DCommerce:

"Optimal Valued Advertisement": (30) DCommerce working in unison with (20) XCommerce using optimal value advertisement and Codex Page dynamic values to determine the best fit advertisement.

UCommerce Shopping Cart:

"Brings Buyers and Sellers Together": (40) UCommerce is the Shopping Cart means that brings buyers and sellers together, and helps the end user to get the best door to door product and service.

XCommerce Simulates and Improves Existing Systems:

(10), (20), (30) and (40) working together comprise the enhancement technology, that not only delivers the best (100) web browser and (200) search engine results, but also maximizes (300) advertisement revenues, and (400) shopping cart based revenues from the millions of end user's interacting with the search engine.

Thus (10) simulates* (100), (20) simulates* (200), (30) simulates* (300) and (40) simulates* (400). The search system enhancement simulates* and replicates each of the existing systems (100, 200, 300, 400) and incorporate their improvements by working in parallel, without requiring the elimination of existing systems.

Simulates*:

Can be defined as each search system enhancement subsystem gathers, distills, analyzes, transforms, organizes, plots, maps and renders each message and transaction belonging to the corresponding existing system subsystem it is mimicking.

Creating Z_Price Bitmaps

"Boolean Algebra":

Consists of the process to recreate the activities of existing search engines. The "HIVE" stores any valid request comprising of up to 3 Left Brain independent variables. Z_Price Bitmaps may have 1 Right Brain independent variable (X) as a parameter. All Z_Price Bitmap may also consist of directly related keywords and/or clusters combinations. (I), (J), (K) or (X) may be null. The filters are the basis a search pattern. All Z_Price Bitmap are grouped based on Significant Levels of Difference (1 to 4), Mass, and Left and Right Brain filters.

Single Z_Price Bitmaps:

Single keyword, or cluster that makes up a valid (I) independent variable that is the search basis for (U) or Internet environment.

Double Z_Price Bitmaps:

Single keyword, or clusters that makes up a valid (J) independent variable that is the search basis using the Block (I) environment.

Triple Z_Price Bitmaps:

Single keyword, or clusters that makes up a valid (K) independent variable that is the search basis using the Sub Block (I, J) environment.

The "HIVE" for each search basis stores a collection of directly related keywords and/or clusters.

Advanced and Improved Glyphs

Advanced and Improved Glyphs:

Is the process to transform a request into valid Super Glyphs. The "HIVE" stores any valid requests comprising of up to 3 Left Brain independent variables. Z_Price Bitmaps may have 1 Right Brain independent variable (X) as a parameter, and then (Y) can be found using 'Deductive Reasoning'.

Z_Price Bitmap Characteristics:

All Z_Price Bitmap may also consist of directly related keywords and/or clusters combinations. (I), (J), (K), (X) and (Y) may be null. The filters are the basis a search pattern. All Z_Price Bitmap are grouped based on Significant Levels of Difference (1 to 5), Mass, and Left and Right Brain filters.

Single Z_Price Bitmaps:

Single keyword, or cluster that makes up a valid (I) independent variable that is the search basis for (U) or the Internet environment.

Double Z_Price Bitmaps:

Single keyword, or clusters that makes up a valid (J) independent variable that is the search basis for the Block (I) environment.

Triple Z_Price Bitmaps:

Single keyword, or clusters that makes up a valid (K) independent variable that is the search basis for the Sub Block (I, J) environment.

The "HIVE" can adjust the search basis with Right Brain independent variables (X) and (Y) to weight Super Pages and Super Sites.

Codex Pages

Codex Pages:

Consists of a Super Glyphs equation that represents an 'idea fashioned' search pattern. The "HIVE" stores any plausible request comprising of up to three (3) categories and events. A category has one (1) independent variable, whereas an event has 2 directly related independent variables. Events have priority over categories. Z_Price Bitmaps may have one (1) Right Brain independent variable (X) as a parameter.

Applying Deductive Reasoning with Z_Price Bitmaps: the 'HIVE' may find additional Right Brain independent variable (Y) and (Z) as a parameters. Z_Price Bitmap may consist of directly related nested keywords and/or clusters combinations. (I), (J), (K), (X), (Y) and (Z) may be null. Filters are the search basis of a search pattern. Z_Price Bitmap are arranged based on Significant Level of Difference (1 to 6), Mass, and Filters.

Single Z_Price Bitmaps:

Left Brain independent variable (I) Super Glyph that is directly related to a category or event and is the search basis for the (U) sized environment.

Double Z_Price Bitmaps:

Left Brain independent variable (J) Super Glyph that is directly related to a category or event and is the search basis for Block (I).

Triple Z_Price Bitmaps:

Left Brain independent variable (K) Super Glyph that is directly related to a category or event and is the search basis for Sub Block (I, J).

The "HIVE" can adjust the search basis with Right Brain independent variables (X), (Y) and (Z) to weight Super Pages and Super Sites.

Synthesis of Related Subject Matter

XCommerce:

(Ref No. 11/584,941): Server Side Supercomputer

Is the server side supercomputer that simulates, standardizes and transforms the Internet into a plurality of concurrently working environment using a Managerial hierarchical method of indexing and searching web pages the following:

Managerial Hierarchical Relationship Indexing

1) Managerial Hierarchical Relationship Indexing:

A request is broken down into keywords and clusters, and then converted into a search pattern that optimally minimizes the quantity of valid and visible web pages with regards to a particular search.

Determining What is Relevant and Irrelevant:

2) Keyword and Cluster:

Serve as the basis of each Managerial Hierarchical Relationship Index to analyze and distill what is relevant and irrelevant. Irrelevant web pages are discarded completely from analysis.

Partition the Environment into Blocks

3) Blocks:

The environment is subdivided into a plurality of blocks that are arranged based on a three Managerial Hierarchical levels as follows:

a) The primary relationship index is the Superset or (I) comprising the visible domain for a search pattern.

b) The second relationship index the Set or (J) is subordinate to the primary relationship index includes all relevant web pages for a search pattern.

c) The third relationship index the Subset or (K) is subordinate to the secondary relationship index includes the most likely web page for a search pattern.

d) The Internet environment is distilled by applying the three (3) Managerial Hierarchical levels, and the visible web pages comprise the block environment.

4) Static Search Patterns:

The 'HIVE' determines if the search pattern already exists and if yes obtains the top (n) web pages from the databases.

5) Dynamic Search Patterns:

a) Distills the Internet using relationship indices to create optimal size block.

b) Uses remaining keywords and clusters to determine if they match against the content of the top (n) web page. When a match occurs, each web page value is dynamically adjusted by each keyword or cluster relative vector value.

c) Picks the top (n) web pages from the block environment.

New Search Pattern

6) New Search Pattern:

XCommerce stores new search pattern and its associate top (n) web pages into the database.

Display Top (n) Web Pages:

7) Send and display the top (n) web pages to the end user's terminal.

Cholti Search Engine Optimizer

Client Side Supercomputer as disclosed in parent application Ser. No. 12/146,420: Cholti is the client side of the Internet search engine method mimicking the function of the human brain by creating a language Left Brain equation and a geospatial Right Brain equation, for buffering between an Internet browser and a search engine supercomputer to interpret numerical and textual data and convert the interpreted data into statistical Glyph objects representing the mathematical equations used to obtain an optimal match in response to an end user search request. These are the main steps:

Analyzing, Interpreting and Parsing End User's Sessions

1) Analyzing End User's Sessions:

Gathering a plurality of consecutive end user search requests and then interactively interpreting and parsing each keyword to determine whether or not said keyword exists within a master keyword database and whether it matches any search pattern in the comprehensive database collection.

Validating and Verifying Keywords and Clusters a) Validating and Verifying Keywords and Clusters:

Validating each keyword and deriving a list of associated keywords and common known keyword clusters within database to yield an improved search pattern. Verifying each keyword in the request and determining whether or not, which keywords can function as a common denominator independent variable that can aid in reducing the size of the search environment.

Identifying Optimal Blocks b) Identifying Optimal Blocks:

Figuring out the impact of a given managerial hierarchical relationship to shrink the size of the environment into an optimal Block by parsing the search and then numerically qualifies the significance of a session.

"Boolean Algebra" and Deductive Reasoning Searches

2) Glyph Based Search:

Browser based search can be categorized into two different styles as follows:

a) Basic Glyphs:

Measures requests by using the hierarchical set of filters in the form of Basic Glyphs that best reflect existing "Boolean algebra' search engines.

b) Advanced Glyphs:

Reorganizing and improving the end user search request to create Advanced Glyphs to further distill the size of the search environment using existing search engine.

This is done by converting human keywords into a sequence of words or numbers using "Deductive Reasoning" and then probabilistically mapping Right Brain information, such as country, state, and zip code that yield an optimal hierarchical set.

Optimal Hierarchical Set

3) Optimal Hierarchical Set:

Is done by converting the end user's responses into vector components and then maps each response into Super Pages that include probabilities, vector values and calculated weights for each dynamic requests.

Transforming Super Pages into Super Sites a) Super Sites:

Associate, match and merge the informational content of each valid Super Pages of the Optimal Hierarchical Set into their parent Super Sites.

Using Quality to Improve Partitions b) Assign Quality Values:

Organize and distribute the environment into several concurrent quality partitions, labeled from lowest to highest, with the lowest representing confounded information and highest representing optimal site information based upon existing page ranking capacities. Each Super Site has a quality value, and each Super Pages has the quality value of their parent Super Site.

Integrating Corporate Data to each Super Page c) Corporate Data:

Mapping, plotting and rendering a plurality of existing information into an informational corporate managerial data structure that binds together any related information concerning a particular company.

Super Glyphs Vectors

4) Topology:

Plot, map and trace the Super Pages and Super Sites with the dynamic characteristics of each keyword and cluster as the end user continues an Internet search, thereby transforming them into statistical objects as follows:

a) Correlate a plurality of spatial environments into a single improved probabilistic environment.
b) Dynamically adjust the value of each keyword and cluster based on the end user pattern of behavior.
c) Disable identified Zero Cluster keywords or confounding elements of a search.
d) Determine common denominator words using rules of association.
e) De-emphasize unlikely usage patterns and words.
f) Maximizing keyword values by dynamically measuring the hot value or relevance of a keyword in a user search session based on usage patterns.
g) Minimizing keyword values by dynamically measuring the cold value irrelevancy of a keyword during a search session based on usage patterns.

Hot & Cold Analysis

5) Hot & Cold Filtering:

Dynamically reduce the environmental size by maximizing and minimizing keyword values, based upon usage patterns, then match/merge the top (n) responses into Super Site and Super Page objects that yields an optimal statistical Super Glyph equation by doing the following:

a) Filter statistical objects based upon significance quality levels or values.
b) Assign a corporate signature to each Super Site object.
c) Distill and weigh each Super Site through the use of precise geospatial dimensions using latitude and longitude coordinates.
d) Gather, analyze and distill the best response from each node to create a limited size collection of valid Super Pages that defines the best-fit dynamic Block.

Optimal Answer

6) Finding Optimal Answer:

Select top (n) responses from the best fit dynamic Block, wherein the best results of each hierarchical set are used to display a limited collection of valid Super Pages; commercializing each keyword and associating media value resources and priorities to Super Sites and Super Pages by doing the following:

a) Solve the optimal Super Glyph equation using deductive reasoning.
b) Translate the end user's Left Brain request into a single Super Glyph equation.
c) Decipher the Super Glyph equation to obtain information from any given language by using math in lieu of linguistics.
d) Consolidate all related and significant requests into a resultant environment that contains all of the dynamic hierarchical sets.
e) Store said newly-identified Super Glyph equation into the master database.
f) Display Optimal Answer: display to the end user's terminal the optimal top (n) responses in a prioritized order.

Display Pre Processed Optimal Responses

7) By Pass Redundant Requests:

a) Scan each request and determine whether it exists in the Super Glyph database, and thus having readily available and pre-processed the optimal response, requiring no further calculations, bypassing the usage of existing search engine capabilities.

OVERVIEW OF PRESENT INVENTION

Codex Search Patterns Definitions:

"HIVE" is a managerial hierarchical structure refers to a decentralized parallel clustered large-scale supercomputer consisting of a plurality of nodes that are specifically arranged in tiers.

Search Pattern is the conversion of at least one (1) relevant keyword and cluster to independent variables.

Browser are software that receives human input and sends the input as request message to a search engine, that in turn process the request, and forward chains the output response to the end user's terminal that is displayed as text, audio or video form.

Glyph is a database object that represents a keyword and cluster that stores all the static "HIVE" global variables.

Super Glyph is a dynamically statistical database object for each Glyph with personalized and dynamic statistics of the analysis of the end user's interactions.

Triangulation Deductive Reasoning or TDR:

The methodical analysis and rearranging of end user's keyword, adding missing gaps of information, and by inserting and expanding available keywords used in a session to find the final destination. Determining the best fit independent variables that best represents the smallest identifiable partition of the Internet and then transforming the valid content of each Site and web page into dynamical statistical database objects.

Valorizing the top dynamical statistical database objects to find and determine by using association, likelihood and relevancy guidelines additional independent variables that are used to distill and sub divided in real time the visible environment to a session.

Codex is a massive book that stores the billions of common denominator search patterns possessing a Super Glyph equation to derive optimal responses for static requests, and optimal sized environments for dynamic and personalized sessions consisting of two (2) or more consecutive requests.

Mass represents the overall net quality of a Search ranging from lowest to highest as follows:
a) Mass less searches are very vague with the lowest rate of accuracy, and the response has (2^30) or one billion web pages.
b) Lowest Mass searches have at least one (1) independent variable with a low rate of accuracy, and the response has (2^20) or one million web pages.
c) Average Mass searches have at least 2 independent variables with an average rate of accuracy, and the response has (2^10) or one thousand web pages.
d) High Mass searches are targeted with at least 3 independent variables with a highest rate of accuracy, and the response has (2^7) or one hundred web pages.
e) Highest Mass searches are deciphered with at least 4 independent variables with certitude, and the response has (2^0) or one web page.

Significant Levels of Difference are representation of the total number of relevant independent variables are available in a given Codex Page after analysis of end user's keywords and clusters and then finding additional independent variables through means of deductive reasoning. End user's sessions are capped at 4 independent variables, to achieve higher levels resource intensive data mining triggered by analysis of the correlated lowest identifiable common denominator environment.

Zero Significant Difference:
(U) the environment is mass-less, (X) is greater than 200 and the number of web pages is: (X!−(X−6)!)/6!.

First Significant Difference:
(FSD) the environment Mass is between 1 and 3, (X) ranges from 120 to 60 and the number of web pages is: (X!−(X−5)!)/5!.

Second Significant Difference:
(SSD) the environment Mass is between 3 and 5, (X) ranges from 60 to 40 and the number of web pages is: (X!−(X−4)!)/4!.

Third Significant Difference:
(TSD) the environment mass is between 5 and 6, (X) ranges from 40 to 30 and the number of web pages is: (X!−(X−3)!)/3!.

Fourth Significant Difference:
(QSD) the environment mass is between 6 and 6.5, (X) ranges from 30 to 25 and the number of web pages is: (X!−(X−2)!)/2!.

Fifth Significant Difference:
(PSD) the environment mass is between 6.5 and 6.95, (X) ranges from 25 to 15 and the number of web pages is: (X!−(X−1)!)/1!.

Sixth Significant Difference:
(HSD) the environment Mass is 7, and thus optimal and (X)=10 is (X!−(X−0)!)/0! or 1 web page.

[R] or Right Brain Conversions

Right Brain environmental independent variables are expressed as (X), (Y), and (Z), which are replaced with Quad, Pentane, and Hexane.

Partitioning the Environment

Internet (U) comprises an environment of 20 billions+ web pages.

Block, Sub Block and Mini Block

Block:

Is a common denominator environment that is based on at least one (1) search pattern. Each Block can be further subdivided into a Sub Block provided at least one (1) relevant search pattern exists. Each Sub Block can be further subdivided into a Mini Block provided at least one (1) relevant search pattern exists.

Element

An Element is the smallest identifiable partition of the Internet that the "HIVE" optimally derived from correlating, data mining and valorizing the top results.

Once the lowest subdivision of the Internet is found using Search Patterns and keyword combinations, a unique Codex Page is created, otherwise a Codex Page already exists with its corresponding Z_Price Bitmap collection of top (n) pages results.

Super Site is a database object converts each web page belonging to the lowest sub division of the Internet, after match/merging and then correlating all visible web pages belonging to an Internet Site, and then adds statistical characteristics that are used for deductive reasoning analysis of at least one (1) request belonging to a session.

Super Page is a database object that consists of each web page belonging to the lowest possible attainable sub division of the Internet, after all the relevant and visible Super Sites have been identified, and then adds statistical characteristics that are used for deductive reasoning analysis of least at 1 request belonging to a session.

Evolution of the Keyword

The environment contains a list of linguistic and geospatial keywords and clusters and then the "HIVE" converts the keywords into Glyph dynamic statistical objects.

Association

1) Using the rules of association each independent Glyph is associated to a category, e.g. person, historical event, product or related object.

Relevance and Likelihood

2) Using the rules relevance and 3) using rules of likelihood of each Glyph to the best valued categories permits the "HIVE" to correlate linguistic and geospatial related categories to expand the number of independent variables. When a Left Brain and Right Brain category are merged as one variable they become an Event. Once at least one (1) Event is found they become the primary and most significant Managerial Hierarchical Relationship Indices belonging to a best-fit search pattern.

Mimicking the Brain

A language based expert system method that mimics the brain to decipher at least one (1) end user's final destination by continuously at least one browser request by arranging keywords into Left Brain linguistic and Right Brain geospatial objects that helps create an optimal relationship index that partitions the environment by determining the best fit search pattern that is stored in a Codex that dynamically analyzes, valorizes, quantifies, qualifies, reorganizes, reformulates and interprets end user's intentions to identify the best way to find the final destination of a session.

Deciphering

The force behind the process of deciphering with certainty the best response is the "HIVE" ability to measure the available inventory contained in the smallest identifiable partition of the environment by using logic to make web pages from irrelevant to relevant, by using resource management that weights the quality and probability value that best matches the best fit search pattern, and then reads, locates and selects the highest level of satisfaction content.

The "HIVE" uses a method of 'deductive reasoning' that takes the smallest identifiable partition environment derived from the best fit search pattern identify the highest number of independent variables that serve as a common denominator that describes the end user's intentions as follows:

Hot and Cold Analysis

First:

Using the hot and cold trending valuation of each keyword belonging to at least one request in a session. For each request a search pattern is assigned that contains a managerial hierarchical relation index that corresponds to a stored Codex page that is a search pattern to make the first subdivision of the environment.

The "HIVE" measures the quality of the search pattern and checks in its inventory to determine if the optimal response is readily available. When the optimal response is readily available it immediately sends the top (n) responses to the end user, avoiding any search. The top (n) responses are contained in a pre processed Z_Price Bitmap inventory control database requiring no further calculation.

Association Using Set Theory

Second:

After each request the "HIVE" qualifies each keyword and reevaluates what is the newly derived best-fit search pattern. The keywords are transformed into Glyphs that possesses linguistic, geospatial and statistical dimensions that help emphasize what is valid. The "HIVE" inserts missing gaps of information and uses rules of association using Set Theory to assign to each Glyph category characteristics.

Once the most probable categories are known the "HIVE" adds a collection of probable keywords to help in perform the $2^{nd}$ sub division of the environment and checks in its inventory to determine if the optimal response is available to immediately send the top (n) responses to the end user. Block partitions have millions of valid web pages.

Relevancy Analysis

Third:

The "HIVE" adds the most relevant collection of Super Glyphs and then applies likely and unlikely analysis based on the best category characteristics to correlate the top information and determines if 2 categories can be match/merged into 1 event, which in turn expands the number of independent variables.

Once an event is found using the relevancy analysis the "HIVE" performs the $3^{rd}$ sub division of the environment and checks in its inventory to determine if the optimal response is readily available, and immediately send the top (n) responses to the end user. Sub Block partitions have thousands of valid web pages.

Likely and Unlikely Analysis

Fourth:

The "HIVE" adds the most relevant collection of Glyphs and then applies likelihood analysis based on the best category characteristics to correlate the top information and then determines if 2 categories can be match/merged into 1 event, which in turn expands the number of independent variables.

Once an event is found using the likelihood analysis the "HIVE" performs the final sub division of the environment and checks in its inventory to determine if the optimal response is readily available, and then immediately send the top (n) responses to the end user. Mini Block partitions have hundreds of valid web pages.

"Cherry Picking" Optimal Content Value

The "HIVE" confirms with the skeptic approach "Seeing is believing" to verify the best responses, and 'Cherry Picks' the top content value results are sent to the end user's browser. The Element partition has tens of web pages.

I claim:

1. An Internet search engine method mimicking the function of the human brain creating a language-based, left brain equation and a geospatial, right brain equation, for buffering between an Internet browser and a search engine supercomputer to interpret numerical and textual data and convert the interpreted data into statistical glyph objects representing the mathematical equation used to determine the optimal partition of the Internet; then finds and supplies missing gaps of information, dynamically valorizes, reorganizes, and hierarchically prioritizes the glyphs as a search pattern used to obtain an optimal match in response to an end user valid request and stores them into a codex that serves as knowledge and customer satisfaction inventory control encyclopedia of human ideas, the method comprising the steps of:

providing a word database comprising each recognized word and common denominator words respective to a specific language;

providing a glyph database with statistical and vector components for each recognized word;

providing a codex page comprising each recognized index relationship search patterns;

establishing a codex inventory control database comprising a series of comprehensive collection index relationship search patterns that are stored as codex pages;

establishing a quantitative hierarchical value for each of the words in the word database, wherein each word is related to a quantitative value between a lowest value and a highest value having a relationship where the lowest value is respective to the highest occurrence rate and the highest value is respective to the lowest occurrence rate;

establishing a set of predetermined semantic guidelines for the language;

establishing a webpage database comprising a plurality of searchable Internet web pages;

assigning a unique value to each searchable Internet web page;

parsing end user valid requests interpreting each word to determine if each word exists within the word database;

interpreting each word to determine if each word matches any data in the database;

converting each word into a linguistic glyph and probabilistically mapping geospatial information into a geospatial glyph;

standardizing and transforming each linguistic and geospatial glyph into vector components;

arranging, grouping and prioritizing each linguistic and geospatial glyph into a logical sequence of words and quantitative hierarchal values that yield an optimal hierarchical set;

validating each linguistic and geospatial glyph and deriving a list of associated words and common known words clusters within glyph database to yield search pattern;

arranging, reorganizing, and prioritizing linguistic glyphs using static vector values for requests and dynamic values for sessions to solve for the left brain equation;

processing the impact of a managerial hierarchical related group of language-based independent variables to create an equation that shrinks the size of the search environment by parsing each request and each session into index relationships;

verifying each linguistic and geospatial glyph and determining whether or not the glyph will function as an independent variable that can aid in reducing the size of the environment;

dynamically adjusting the value of each linguistic and geospatial glyph based on an end user pattern of behavior;

identifying and disabling zero clusters, confounding elements of a search;

determining common denominator words using rules of association and transitivity to determine relevant and irrelevant glyphs;

mapping and plotting each linguistic glyph that is recognized as an independent variables into index relationships using left brain analysis; then establishing a primary filter as a primary index relationship (I), a secondary filter as a second index relationship (J), and a tertiary filter as a third index relationship (K);

adding the vector value of each index relationship into a resultant linguistic vector value that determines a significance level;

using the resultant linguistic vector value to determine a smallest partition of the Internet that will serves as a point of origin for the search process;

comparing the resultant linguistic vector value against optimal mass limits to determine how many linguistic index relationship exist as follows:

deriving zero index relationships and using the Internet (U) as the environment and ranking each web page to the master index;

deriving one index relationship and subdividing the Internet using primary index relationship to create a block (I) as the visible environment and eliminating from calculation any web page not belonging to block (I);

deriving two index relationship and subdividing the Internet using primary and secondary index relationship to create a sub block (I, J) as the visible environment and eliminating from calculation any web page not belonging to sub block (I, J);

deriving three index relationship and subdividing the Internet using primary, secondary and tertiary index relationships to create a mini block (I, J, K) as the visible environment and eliminating from calculation any web page not belonging to mini block (I, J, K);

ranking for each partition each web page to a relative master index;

binding and mapping the block(I) into the Internet environment (U), the sub block (I, J) into the block (I), and the mini block (I, J, K) into the sub block (I, J);

hierarchically subordinating each relative master index to their parent relative master index and also subordinating the entire relative master index to the master index;

identifying a left brain linguistic based checkmate combination when three directly related linguistic index relationships (I, J, K) exists;

analyzing using right side of the brain to map and plot each recognized geospatial independent variables glyphs into index relationships and then establishing the primary filter as the primary index relationship (X), the secondary filter as the second index relationship (Y), and the tertiary filter as the third index relationship or (Z);

adding the vector value of each index relationship into a resultant geospatial vector value that determines the significance level;

using the resultant geospatial vector value to determine the smallest partition of the Internet that will serves as point of origin for the search process;

relevant glyphs become independent variables, whereas irrelevant glyphs de-emphasize web pages when determining the final equation;

comparing the resultant geospatial vector value against mass limits to determine how many linguistic index relationships exist;

deriving no index relationships and using the Internet (U) as the environment and ranking each web page to the master index;

deriving one index relationship and subdividing the Internet using primary index relationship to create a block (X) as the relevant environment and de-emphasizing from calculation any web page not belonging to block (X);

deriving two index relationship and subdividing the Internet using primary and secondary index relationship to create a sub block (X, Y) as the visible environment and de-emphasizing from calculation any web page not belonging to sub block (X, Y);

deriving a three index relationship and subdividing the Internet using primary, secondary and tertiary index relationships to create a mini block (X, Y, Z) as the visible environment and de-emphasizing from calculation any web page not belonging to mini block (X, Y, Z);

substituting (I) when null with (X), substituting (J) when null with (Y), substituting (K) when null with (Z);

identifying right brain checkmate combinations when three index relationships or (X, Y, Z) exists;

performing deductive reasoning by adding the index relationships of both sides of the brain to create a resultant equation vector value that determines the significance level;

using the resultant equation vector value to determine the smallest partition of the Internet that will serves as point of origin for the search process;

assigning each index relationship to glyphs relevant search category;

identifying the most relevant codex pages based on the index relationship and to obtain top (n) web pages of each category and their optimal inventory control data structure containing "related objects";

analyzing the 'related objects' to find missing gaps of information;

matching, mapping and mixing pair combinations of two categories against each other in order to determine direct relationships and relevancy between two categories;

emphasizing high probability categories combinations associated to the mathematical equation that yields the final destination;

de-emphasizing low probability categories combinations associated to the mathematical equation that yields the final destination;

integrating index relationships (I) and (X) into event (I!); and deriving the index relationships using the event (I!) to create element (I, J, K)!;

integrating index relationship (J) and (Y) into event (J!); and deriving the index relationships using the event (J!) to create element (I, J, K)!!;

identifying left and right brain checkmate combinations when six index relationships or (I, J, K, X, Y, Z) exists;

reading and confirming the content of top ranked valued (n) responses belonging to the optimal sized environment;

validating and verifying the best responses based on content value;

selecting the best fit element subdivision to create the optimal sized environment;

picking the best fit content and top ranked valued (n) responses from the optimal size environment as output;

sending and displaying output to end users terminal;

simulating for each codex page the optimal environment in real time and assigning a relative master index;

continuously scanning the environment and updating each codex page as each new web page is identified having a higher value than the lowest value stored web pages; associate the new web page to the codex page; disassociate the lowest valued web page to the codex page; storing and updating changes in real time to the codex pages;

continuously storing and updating in real time the at least one collection of top (n) web pages, and the top (n) sites geospatial information;

continuously storing and updating in real time relative master index belonging to each codex page;

determining at predefined time intervals the total number of web pages in the codex and for each codex page in its chain of command;

determining at predefined time intervals the total number of significant difference changes in the Internet and then revaluing each site that updated one of its top ranked (n) web pages;

purifying, mapping and plotting each element of the old master index into the new master index using the content value of the relative master index of the highest vector valued codex page;

continuously creating, storing, synchronizing and updating in real time the new master index that reflect the latest condition of the environment that is derived from the continuously detected significant changes and adjustments made to the codex; and purifying, transforming and updating new master index and in turn the codex and the entire chain of command of codex pages.

2. An Internet search engine method as recited in claim 1, wherein the collection of top (n) web pages has at least one relationship index that represents at least one independent variable as the calculation basis.

3. An Internet search engine method as recited in claim 1, the method further comprising the steps of:

referencing one collection of top (n) web pages to each codex page;

associating each codex page with index relationships that shrink the environment before any calculation is performed;

wherein each codex page has one collection of top (n) web pages measured at different mass combinations with the appropriate dynamic values of each independent variables belonging to each index relationship as they are calculated at the optimal mass limits;

associating each the codex page with specific geospatial dimensions;

estimating the impact of related, unrelated and irrelevant glyphs combinations that may exists while measuring the mass combinations values on each codex page; and grouping and associating each index relationship into one category and associating one collection of top (n) web pages for each category.

4. An Internet search engine method as recited in claim 1, the method further comprising the steps of:

representing a recognized index relationship search pattern that is stored in the codex.

5. An Internet search engine method as recited in claim 4, wherein each collection of top (n) web pages have additional related, unrelated and irrelevant glyphs that further adjust the calculation basis.

6. An Internet search engine method as recited in claim 4, wherein each collection of top (n) web pages based on the different mass combinations derived from matching and mixing the independent variables, related, unrelated and irrelevant glyphs combination are associated to their optimal inventory control data structure.

7. An Internet search engine method as recited in claim 4, wherein each optimal inventory control data structure contains 'related objects' glyphs belonging to the top (n) sites geospatial information, related content, product inventory, and people and their associated known related personal content.

8. An Internet search engine method as recited in claim 4, further comprises the step of:

probabilistically integrating one left side of the brain category that is directly related to one right side of the brain category into an event.

9. An Internet search engine method as recited in claim 8, further comprises the step of:

grouping and associating pairs of categories into events and associating one collection of top (n) web pages for each event.

10. An Internet search engine method as recited in claim 1, further comprise the step of:

continuously storing and updating in real time relative master index belonging to each Internet related managerial hierarchical index relationship partition.

11. An Internet search engine method as recited in claim 1, further comprises the step of:

purifying, mapping and plotting each element of the old master index into the new master index using the content value of the relative master index of the highest vector valued partition.

12. An Internet search engine method as recited in claim 1, further comprises the step of:

continuously creating, storing, synchronizing and updating in real time the new master index that reflect the latest condition of the environment that is derived from the continuously detected significant changes and adjustments made to the Internet's partitions.

13. An Internet search engine method as recited in claim 1, further comprises the step of:

purifying, transforming and updating new master index and in turn the entire content of the Internet (U) and all valid index relationships combinations.

* * * * *